United States Patent
Nishimura et al.

(12)

(10) Patent No.: US 6,279,982 B1
(45) Date of Patent: Aug. 28, 2001

(54) VEHICLE SEAT STORING DEVICE

(75) Inventors: Yoshiaki Nishimura; Kazunori Hashimoto; Naruaki Abe; Toru Iwamura, all of Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/304,097

(22) Filed: May 4, 1999

(30) Foreign Application Priority Data

May 13, 1998 (JP) .................................................. 10-130805
Aug. 31, 1998 (JP) .................................................. 10-246419

(51) Int. Cl.$^7$ ....................................................... B60N 2/36
(52) U.S. Cl. ..................................... 296/65.09; 296/65.14; 297/15
(58) Field of Search ........................ 296/65.1, 66, 65.13, 296/65.14, 65.09, 65.05; 297/15

(56) References Cited

U.S. PATENT DOCUMENTS 5,195,795 * 3/1993 Cannera et al. .................. 296/65.09
5,570,931 * 11/1996 Kargilis et al. ............... 296/65.13 X
5,662,368 * 9/1997 Ito et al. ........................ 296/65.09 X
5,839,773 * 11/1998 Ban et al. .......................... 296/65.09

FOREIGN PATENT DOCUMENTS

| 3-121939 | 5/1991 | (JP) . |
| 3-200444 | 9/1991 | (JP) . |
| 3-93233 | 9/1991 | (JP) . |
| 4-100927 | 9/1992 | (JP) . |
| 5-22164 | 3/1993 | (JP) . |
| 5-208633 | 8/1993 | (JP) . |
| 10-297542 | 11/1998 | (JP) . |

* cited by examiner

Primary Examiner—Joseph D. Pape
(74) Attorney, Agent, or Firm—Burns, Doane, Swecker & Mathis, LLP

(57) ABSTRACT

When a rear seat is moved forward, a front leg is swung forward around a roller arm. When the front leg of the rear seat is swung forward by a predetermined angle, a hook provided in the roller arm is detached from a round bar portion of a striker so that a roller is moved downward along a guide rail. Further, as the roller is moved downward along the guide rail, the front leg of the rear seat is swung forward around the roller arm. Therefore, a radius of rotation of the seat is reduced when the rear seat is moved to a position for storage on a vertical-front-side floor surface.

32 Claims, 41 Drawing Sheets

FIG. 8
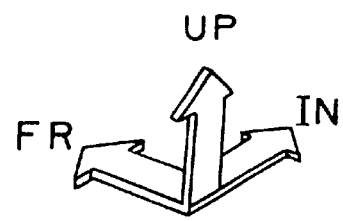
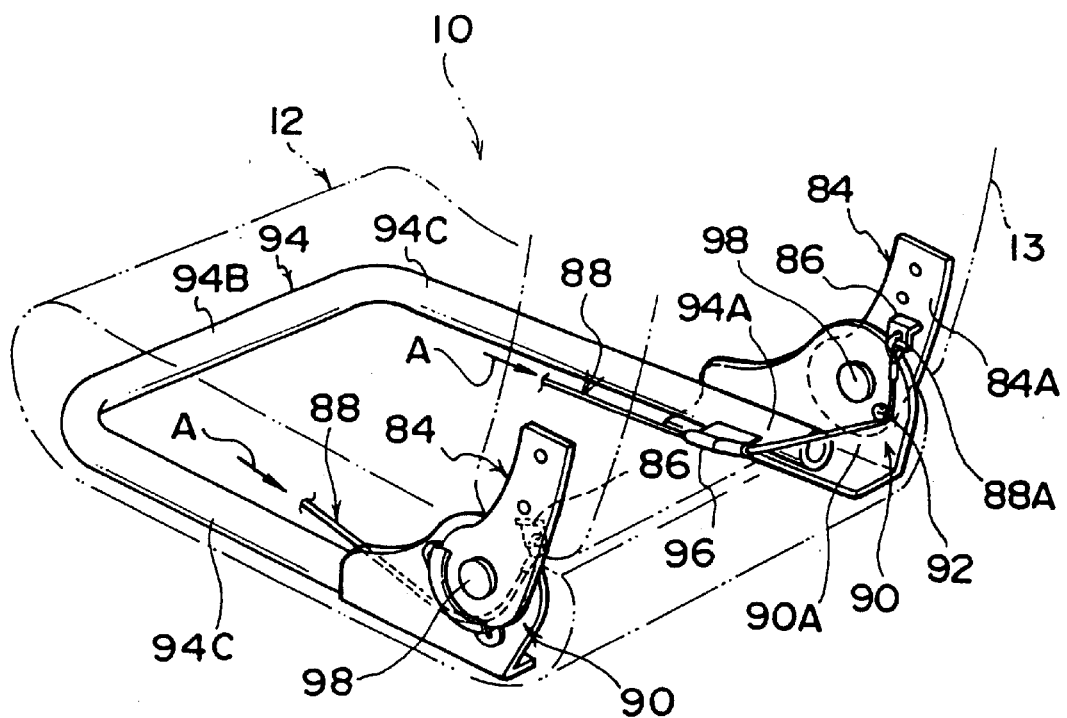

B-B sec

C-Csec

D-D sec

VEHICLE SEAT STORING DEVICE

BACKGROUND OF THE INVENTION

1. Field of the Invention

The present invention relates to a vehicle seat storing device, and in particular, to a vehicle seat storing device for, in a vehicle whose floor surface is stepped, storing a rear seat, which is disposed at the higher vehicle-rear-side floor surface, at the lower vehicle-front-side floor surface.

2. Description of the Related Art

A structure as shown in Japanese Patent Application Laid-Open (JP-A) No. 3-200444 is known as one conventional example of a vehicle seat storing device for, in a vehicle whose floor surface is stepped, storing, at the lower vehicle-front-side floor surface, a rear seat which is disposed at the higher vehicle-rear-side floor surface.

As shown in FIG. 24, in this vehicle seat storing device, when a seat back 300 is inclined fully forward and a rear seat 302 is then rotated forward (in the direction of an arrow V in FIG. 24), a lock means 304 locks a coupling of a seat cushion 306 and a front leg 308 so that the rear seat 302 is integrally rotated with the front leg 308 around a lower end pin 310 of the front leg 308 as a fulcrum.

Thereafter, as shown in FIG. 25, when a headrest 312 reaches a position below the seat cushion 322 of the front seat 320, a lock releasing means 314 releases the locked state of the lock means 304. As a result, if the front leg 308 is lowered as the rear seat 302 is rotated upward (in the direction of an arrow W in FIG. 25), the rear seat 302 can be stored on a front low floor surface 322.

However, in this vehicle seat storing device, since the rear seat 302 is integrally rotated with the front leg 308 around the lower end pin 310 of the front leg 308 as a fulcrum, the radius of rotation of the rear seat 302 at the time of storing is determined by the length of the front leg 308. Accordingly, this structure cannot be applied to a vehicle in which the radius of rotation of the rear seat at the location of storing is large and the space in the seat storing direction, e.g., the distance between the front seat 320 and the rear seat 302 is short.

Another conventional example of a floor structure for a vehicle in which a storage space is formed on a stepped floor surface is disclosed in Japanese Patent Application (JP-A) No. 10-297542.

As shown in FIG. 41, in the vehicle floor structure disclosed in the aforementioned JP-A No. 10-297542, a spacer 602 is provided at an outer surface of a bottom wall 600A of a tray 600, and abuts a spare tire 606 which is stored on a spare tire pan 604. A peripheral edge flange 600B, which is formed at an opening peripheral edge portion of the tray 600, is disposed so as to be spaced apart from the top of a rear floor 608 which is located around the spare tire pan 604. Accordingly, deflecting deformation of the peripheral edge flange 600B and the bottom wall 600A can be prevented, and vibration of the bottom wall 600A is suppressed. As a result, drumming can be prevented. Further, a floor board 610 for closing a top portion of the tray 600 is supported by a rack portion 612A formed at a floor frame 612. The floor board 610 and a top surface 614A of a floor trim 614, which are aligned so as to be flush with each other, and a rear surface 616A of a rear seat 616, which is turned over so as to be flat, form a so-called full flat floor surface.

However, in this vehicle floor structure, when the rear seat 616, whose vertical height is made larger by the seat back of the rear seat being turned over onto a seat cushion, is stored in a storing portion in which the tray 600B stored, the vertical height between the bottom wall 600A and the floor board 610, which is a storage space, must be at least a height equal to the sum of the thickness of the seat back and the thickness of the seat cushion. However, if the height between the bottom wall 600A and the floor board 610 is ensured on the basis of the total of the thickness of the seat cushion and the thickness of the seat back, the space above the floor board 610 becomes narrow.

SUMMARY OF THE INVENTION

In view of the above facts, it is an object of the present invention to provide a vehicle seat storing device in which the radius of rotation of a seat when storing the seat can be made smaller.

It is another object of the present invention to provide a vehicle floor structure in which the height of a floor board for covering a storing portion can be adjusted.

A first aspect of the present invention comprises a vehicle seat storing device for moving a seat from position for use in a vehicle body to a position for storage in a vehicle body, wherein the seat is moved between the position for use and the position for storage by a composite movement using a plurality of guide means.

Accordingly, when the seat is moved from the position for use to the position for storage, the seat is moved from the position for use to the position for storage along a predetermined moving path by a composite movement using the plurality of guide means, e.g., a composite movement of swinging and sliding movements. As a result, the radius of rotation of the seat at the time of storing can be reduced in comparison with a case in which the seat is guided from the position for use to the position for storage by one guide means, e.g., only the swinging movement of a link.

A second aspect of the present invention comprises a vehicle seat storing device for moving a seat from a position for use in a vehicle body to a position for storage in a vehicle body, wherein the seat is moved between the position for use and the position for storage by a continuous movement using a plurality of guide means.

Accordingly, when the seat is moved from the position for use to the position for storage, the seat is moved from the position for use to the position for storage along a predetermined moving path by a continuous movement using the plurality of guide means, e.g., a continuous movement consisting of swinging and sliding movements. As a result, the radius of rotation of the seat at the time of storing can be reduced in comparison with a case in which the seat is guided from the position for use to the position for storage by one guide means, e.g., only the swinging movement of a link.

A third aspect of the present invention comprises the vehicle seat storing device according to the first or second aspect of the present invention, wherein said guide means comprises a guide rail having one end detachably engaged with the seat and the other end swingably attached to the vehicle body; and moving means fixed to the seat which engages with said guide rail when the one end of said guide rail detaches from the seat, and moves the seat to the position for storage along said guide rail.

Accordingly, when the seat is stored, the seat is swung by the guide rail toward a position for storage direction with respect to the vehicle body. When one end of the guide rail is detached from the seat, the moving means fixed to the seat is engaged with the guide rail and moves the seat to the position for storage along the guide rail. As a result, the radius of rotation of the seat at its moving time can be reduced in comparison with a case in which the seat is guided from the position for use to the position for storage by only one link. Further, since the guide rail itself is swung, the guide rail is not exposed in a position where it becomes a hindrance in a state in which the seat is held in the position for use.

A fourth aspect of the present invention comprises a vehicle seat storing device wherein the seat storing device has a plurality of guide means connected to each other, and one end portion of the guide means among said plurality of guide means is connected to the seat, and the other end portion of the guide means among said plurality of guide means is connected to the vehicle body.

Accordingly, when the seat is moved from the position for use to the position for storage, the seat is guided to the position for storage by the plurality of guide means connected to each other. In this case, the radius of rotation of the seat at the time of storing can be reduced in comparison with a case in which the seat is guided from the position for use to the position for storage by only the swinging movement of one guide means.

A fifth aspect of the present invention comprises the vehicle seat storing device according to any of the first, second and fourth aspects of the present invention wherein, when one guide means having one end connected to a seat lower portion and the other end connected to another guide means is guided by a predetermined amount, separate guide means having one end connected to the other end of said one guide means can be operated.

Accordingly, in addition to the contents of any of the first, second and fourth aspects of the present invention, while the seat is moved by one of the guide means, the separate guide means is not operated until the seat is guided by a predetermined amount. As a result, the seat can be reliably moved along a predetermined moving path.

A sixth aspect of the present invention comprises the vehicle seat storing device according to any of the first, second and fourth aspects of the present invention, wherein the seat storing device is provided in a vehicle body structure having a step in an approximately horizontal direction; and the step of the vehicle body is constructed from an upper portion, a lower portion and a wall portion connecting the upper and lower portions and approximately extending in a vertical direction; and a connecting portion for connecting one guide means and separate guide means from among the plurality of guide means is engaged with said wall portion.

Accordingly, in addition to the contents of any of the first, second and fourth aspects of the present invention, the seat is moved from the position for use in the upper portion of the step to an intermediate position located between the upper and lower portions of the step by an operation of one guide means which has the connecting portion engaged with the wall portion as the center of the one guide means. Thereafter, the seat is moved from the intermediate position to the position for storage located in the lower portion of the step by an operation of the other guide means which has the connecting portion engaged with the wall portion as the center of the other guide means.

A seventh aspect of the present invention comprises the vehicle seat storing device according to any of the first, second and fourth aspects of the present invention wherein one of said guide means is by swinging means having one end connected to the seat, and another guide means is constructed from slide means engaged with the other end of said swinging means and connected to said swinging means such that the swinging means can be slid.

Accordingly, in addition to the contents of any of the first, second and fourth aspects of the present invention, when the seat is stored, the seat is swung from the position for use to the intermediate position along a moving path having a predetermined radius by the swinging means connected to the seat. Thereafter, the seat is slid by the slide means from the intermediate position along a predetermined moving path and is moved to another intermediate position or the position for storage. As a result, the radius of rotation of the seat at the time of moving can be reduced in comparison with a case in which the seat is guided by only one link from the position for use to the position for storage.

An eighth aspect of the present invention comprises the vehicle seat storing device according to any of the first to seventh aspects of the present invention, wherein the seat storing device has seat backside moving means for moving a seat backside downward in accordance with a lowering towards the front of a seat back.

Accordingly, in addition to the contents of any of the first to seventh aspects of the present invention, when the seat back is lowered forward in the movement of the seat from the position for use to the position for storage, the seat backside is moved downward in accordance with this frontwards lowering of the seat back. Therefore, for example, it is possible to prevent the seat backside from interfering with a lower rail of a front seat at the time of storaging so that operability of storing the seat is improved.

A ninth aspect of the present invention comprises the vehicle seat storing device according to any of the first to seventh aspects of the present invention wherein the seat storing device has seat pan front lowering means for moving a front portion of a seat pan downward in accordance with the lowering towards the front of a seat back.

Accordingly, in addition to the contents of any of the first to seventh aspects of the present invention, when the seat back is lowered forward in the movement of the seat from the position for use to the position for storage, the front portion of the seat pan is moved downward by the seat pan front lowering means in accordance with this lowering to the front of the seat back. Therefore, an upper surface of the seat back becomes flat at the time of storing.

A tenth aspect of the present invention comprises the vehicle seat storing device according to any of the first to seventh aspects of the present invention comprising: a seat raising handle for moving the seat to the position for storage; and rear leg lock releasing means for releasing a locked state of a rear leg of the seat to the vehicle body in accordance with a rotation of the seat raising handle to the position for use.

Accordingly, in addition to the contents of any of the first to seventh aspects of the present invention, when the handle for raising the seat is rotated to the position for use in the movement of the seat from the position for use to the position for storage, the lock between the rear leg of the seat and the vehicle body is released by the rear leg lock releasing means in accordance with this rotating operation so that a storage operation can be smoothly started.

An eleventh aspect of the present invention comprises the vehicle seat storing device according to any of the first to seventh aspects of the present invention, wherein the seat storing device has headrest angle adjusting means capable of changing the angle of a headrest with respect to a seat back by moving the seat to the position for storage.

Accordingly, in addition to the contents of any of the first to seventh aspects of the present invention, when the seat is moved from the position for use to the position for storage, the angle of the headrest with respect to the seat back can be changed by the headrest angle adjusting means. As a result, for example, it is possible to prevent a high load from being applied to the headrest when the headrest comes in contact with the floor in the position for storage. Therefore, it is not necessary to adjust the angle of the headrest in advance when storing so that the operability of storing the seat is improved.

A twelfth aspect of the present invention comprises the vehicle seat storing device according to any of the first to seventh aspects of the present invention wherein the seat storing device has headrest moving means for lowering the height of a headrest from a seat back in accordance with the lowering towards the front of the seat back.

Accordingly, in addition to the contents of any of the first to seventh aspects of the present invention, when the seat back is lowered (folded) forward while the seat is being moved from the position for use to the position for storage, the height of the headrest from the seat back is lowered by the headrest moving means. As a result, for example, it is possible to prevent the headrest from interfering with the seat back of a front seat at the storing time so that the operability of storing the seat is improved.

A thirteenth aspect of the present invention comprises a seat storing device for moving a seat from a position for use on an upper floor surface to a position for storage on a lower floor surface and storing the seat on a floor surface of a vehicle body having a step in an approximately horizontal direction, the seat storing device comprising: a floor board located above the lower floor surface and covering the seat in the position for storage and disposed in a predetermined position when the seat is located in the position for use; engaging means for holding the seat in the position for use to the vehicle body; and an interference member for interfering with said floor board when the seat is located in the position for use and said engaging means is released.

Thus, when the engaging means for engaging the seat with the vehicle body is released and the stored seat is returned from the position for storage to the position for use, the floor board interferes with the interference member and cannot be placed in the predetermined position if the engaging means remains released.

Accordingly, since the floor board is not placed at a predetermined position, it is possible to easily confirm a state in which the engaging means is released from the vehicle body.

In accordance with a fourteenth aspect of the present invention, there is provided a vehicle floor structure which comprises: an upper floor surface; a lower floor surface which is disposed so as to be spaced apart from the upper floor surface in the heightwise direction of a vehicle; a storing space which is formed by the lower floor surface and a wall portion which connects the upper floor surface and the lower floor surface, in a vehicle structure having the wall portion; and a floor board which covers the storing space, wherein the vehicle floor structure further comprises an adjusting mechanism which is able to adjust the distance between the floor board and the lower floor surface.

Accordingly, it is possible to adjust the distance between the floor board and the lower floor surface by the adjusting mechanism. As a result, it is possible to adjust the height of the floor board which covers the storing portion such that the floor surface can respond to various needs.

In accordance with a fifteenth aspect of the present invention, there is provided a vehicle floor structure according to the fourteenth aspect of the present invention, wherein the floor board is placed between vehicle structural members disposed parallel to each other.

In addition to the contents of the fourteenth aspect of the present invention, the floor board can be held at the vehicle body with a simple structure. Further, the region between the vehicle structural members can be made to be a storing space, and the storing space can be made wide.

In accordance with a sixteenth aspect of the present invention, there is provided a vehicle floor structure according to the fifteenth aspect of the present invention, wherein the floor board has leg portions at both ends thereof, and the leg portions are placed on the vehicle structural members.

Accordingly, in addition to the contents of the fifteenth aspect of the present invention, since the leg portions are placed on the vehicle structural members, the floor board can be held at the vehicle body more simply and reliably.

In accordance with the seventeenth aspect of the present invention, there is provided a vehicle floor structure according to any of the fourteenth to sixteenth aspects of the present invention, wherein the storing space is located to the front of and downward of a position where a seat is disposed.

Accordingly, in addition to the contents of the fourteenth to sixteenth aspects of the present invention, the height of a floor position, which corresponds to the position of a vehicle occupant's feet when the seat is in use, can be adjusted. Further, when the seat is stored, since the seat is stored beneath the floor board, a luggage space can be created above the floor board.

In accordance with an eighteenth aspect of the present invention, there is provided a vehicle floor structure according to any of the fourteenth to seventeenth aspects of the present invention, wherein the vehicle floor structure has storing means which guides the seat from a position for use to a position for storage.

In addition to the contents according to the fourteenth to seventeenth aspects of the present invention, the seat can be stored in the storing space more reliably and simply by the storing means.

In accordance with a nineteenth aspect of the present invention, there is provided a vehicle floor structure according to the eighteenth aspect of the present invention, wherein the storing means is formed by at least two links.

Accordingly, in addition to the contents of the eighteenth aspect of the present invention, since the seat is stored at least by the two links, it is possible to reduce the radius of rotation of the seat for storage thereof.

In accordance with a twentieth aspect of the present invention, there is provided a vehicle floor structure according to the nineteenth aspect of the present invention, wherein the storing means is formed by two links, and has a connecting portion, which connects the two links to each other, and has an engaging means, which engages the connecting portion with the vehicle body, wherein the connecting portion is disposed above the floor board.

In addition to the contents of the nineteenth aspect, since the connecting portion is disposed above the floor board, even when the floor board is placed at an ordinary placement position and the links, which connect the connecting portion and the seat, rotate forward in accordance with the movement of the seat, the connecting portion and the floor board do not interfere with each other.

BRIEF DESCRIPTION OF THE DRAWINGS

FIG. 8 is a perspective view showing one portion of a seat pan front lowering means in the a vehicle seat storing device in accordance with the first embodiment of the present invention seen diagonally from the back of the vehicle.

DESCRIPTION OF THE PREFERRED EMBODIMENTS

A vehicle seat storing device in a first embodiment of the present invention will next be described in accordance with FIGS. 1 to 16.

In these drawings, an arrow FR shows a forward direction of the vehicle and an arrow IN shows a vehicle width inward direction and an arrow UP shows an upward direction of the vehicle.

Figure 1:
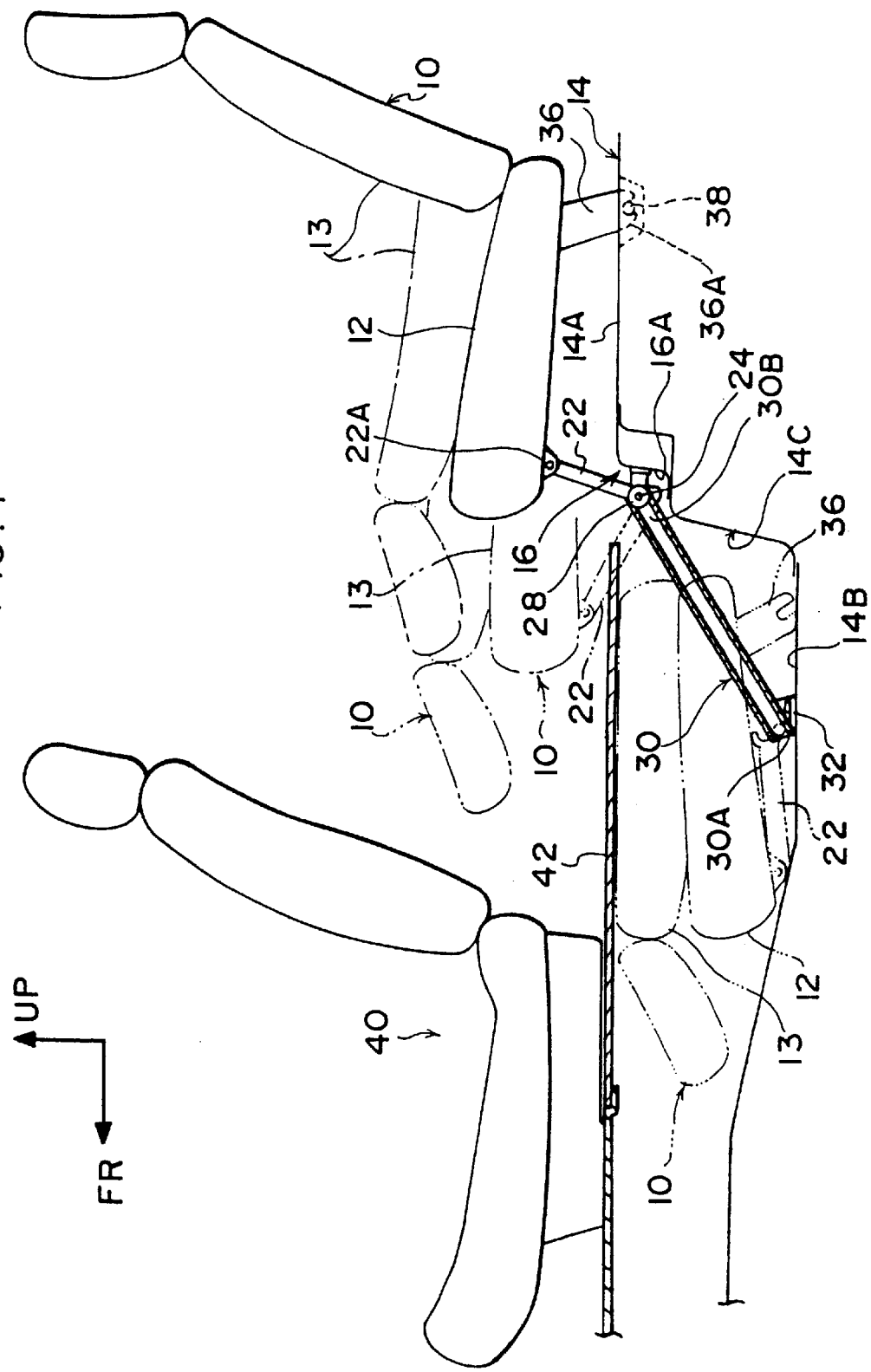
FIG. 1 is a schematic side view showing one portion of a vehicle seat storing device in accordance with a first embodiment of the present invention in cross section.

As shown in FIG. 1, in a rear seat 10 of the present embodiment, a seat back 13 is swingably attached to a rear end portion of a rear seat cushion 12. The seat back 13 can be swung between the state of use shown by the solid line and the folded-forward (front lowered) state shown by the one-dot chain line in FIG. 1. In a state of ordinary use, the rear seat cushion 12 is disposed on a vehicle-rear-side floor surface 14A which is the higher, one-step-up portion of a stepped floor 14 of the vehicle.

Figure 2:
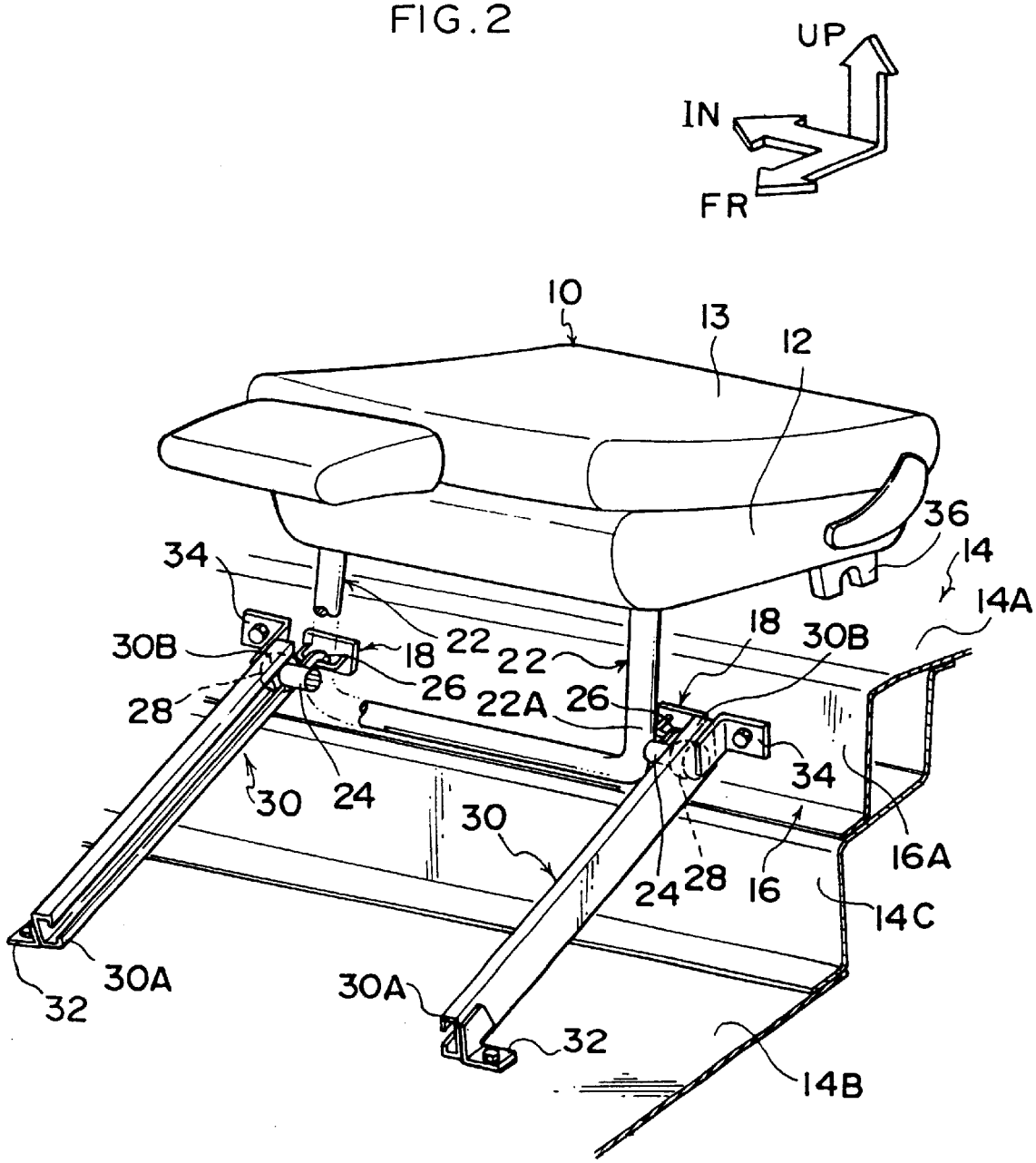
FIG. 2 is a perspective view showing the a vehicle seat storing device in accordance with the first embodiment of the present invention seen diagonally from the front of the vehicle.

As shown in FIG. 2, a vertical wall portion 14C approximately extending in a vertical direction is formed on the boundary between the vehicle-rear-side floor surface 14A a vehicle-front-side floor surface 14B. A step portion 16 is formed in an upper portion of this vertical wall portion 14C. A pair of left-hand and right-hand strikers 18 as lock members are fixed to a vertical wall portion 16A of the step portion 16.

Figure 3:
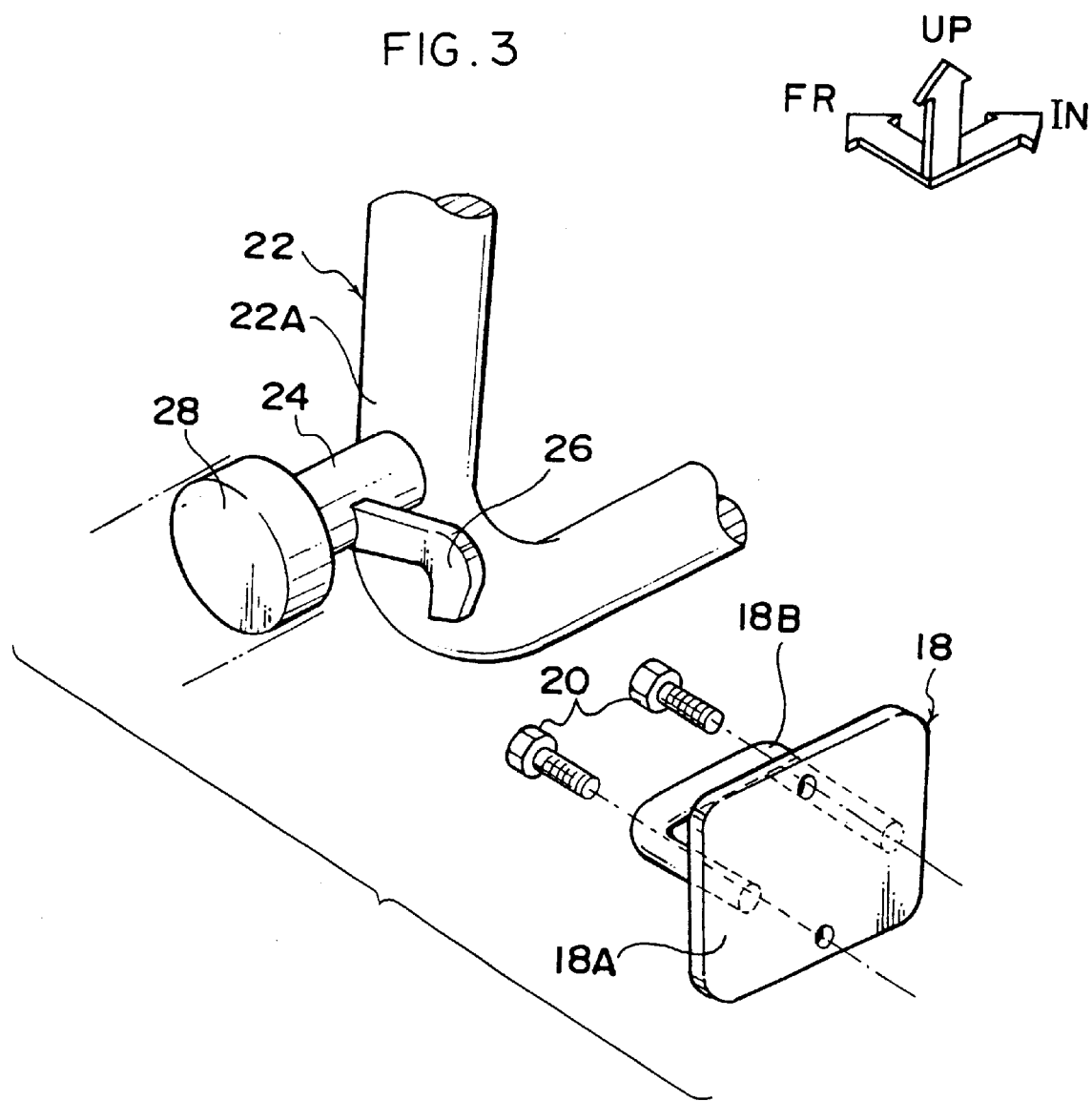
FIG. 3 is a perspective view showing a lock portion of a front leg of the a vehicle seat storing device in accordance with the first embodiment of the present invention seen diagonally from the back of the vehicle.

As shown in FIG. 3, an attaching portion 18A of each of the strikers 18 is formed in the shape of a rectangular plate and is fixed to the vertical wall portion 16A of the step portion 16 shown in FIG. 2 by a fixing member 20 such as a bolt, etc. Both ends of a round bar portion 18B bent in a U-shape are welded to the attaching portion 18A. A roller arm 24 is vertically disposed toward the exterior of the seat in the vicinity of a lower end of each of both side portions 22A of a front leg 22 in the rear seat 10. Each hook 26 is formed as a lock member projected in an L-shape toward a rear lower side from the roller arm 24. Each hook 26 can be detachably attached to the round bar portion 18B of each of the left-hand and right-hand strikers 18. A roller 28 is rotatably supported in an end tip portion of the roller arm 24. Further, in FIG. 1, the rear cushion 12 can be rotated with respect to the front leg 22 with a rotating shaft 22A as a center. A stopper may be arranged such that the rear cushion 12 is not rotated by an amount equal to or greater than a predetermined amount with respect to the front leg 22.

As shown in FIG. 2, a pair of left-hand and right-hand guide rails 30 are arranged in the step portion 16 and the floor surface 14B in a front portion of the vehicle. A front end portion 30A of each of the guide rails 30 is fixed to the floor surface 14B through a bracket 32. A rear end portion 30B of each of the guide rails 30 is fixed to the vertical wall portion 16A of the step portion 16 through a bracket 34. Left-hand and right-hand rollers 28 are movably supported by the respective guide rails 30.

An unillustrated well-known hook mechanism is arranged in a lower end portion 36A of each of a pair of left-hand and right-hand rear legs 36 arranged in the rear seat 10. The lower end portion 36A of the rear leg 36 is detachably attached to each of a pair of left-hand and right-hand strikers 38 (see FIG. 1) disposed on the vertical-rear-side floor surface 14A via the hook mechanism.

Accordingly, when the rear seat 10 is swung forward in a state in which the lower end portion 36A of the rear leg 36 of the rear seat 10 is detached from the striker 38, the front leg 22 of the rear seat 10 is swung forward around the roller arm 24. When the front leg 22 of the rear seat 10 is swung forward by a predetermined angle and reaches a position shown by the two-dotted chain line in FIG. 1, the hook 26 provided in the roller arm 24 is detached from the round bar portion 18B of each of the left-hand and right-hand strikers 18 so that the left-hand and right-hand rollers 28 move downward along the respective guide rails 30. Further, as the left-hand and right-hand rollers 28 move downward along the respective guide rails 30, the front leg 22 of the rear seat 10 swings further forward around the roller arm 24. Therefore, the rear seat 10 is moved to a state of storage shown by the three-dotted chain line in FIG. 1, i.e., onto the vertical-front-side floor surface 14B.

In the present first embodiment, a floor board 42 extending from a position below a front seat 40 in a rear direction of the vehicle can be provided above the rear seat 10 in the state of storage.

A seat backside moving means of the present first embodiment will next be explained in accordance with FIGS. 4 to 7.

Figure 6:
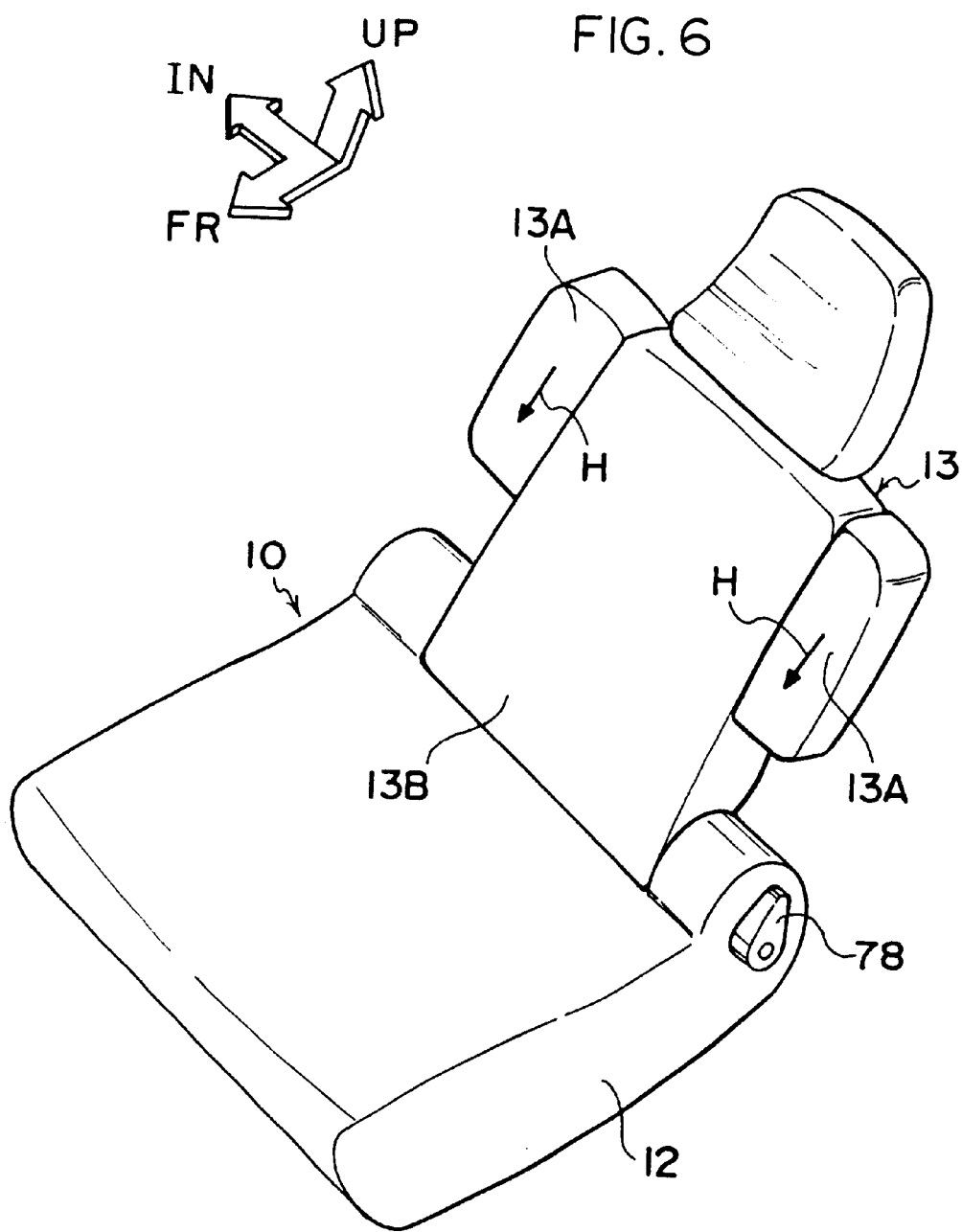
FIG. 6 is a perspective view showing a seat back in a state where the seat is being used in the a vehicle seat storing device in accordance with the first embodiment of the present invention seen diagonally from the front of the vehicle.

As shown in FIG. 6, in the present first embodiment, a shoulder portion 13A as a seat backside of the seat back 13 is disposed as a separate member with respect to a body portion 13B.

Figure 4:
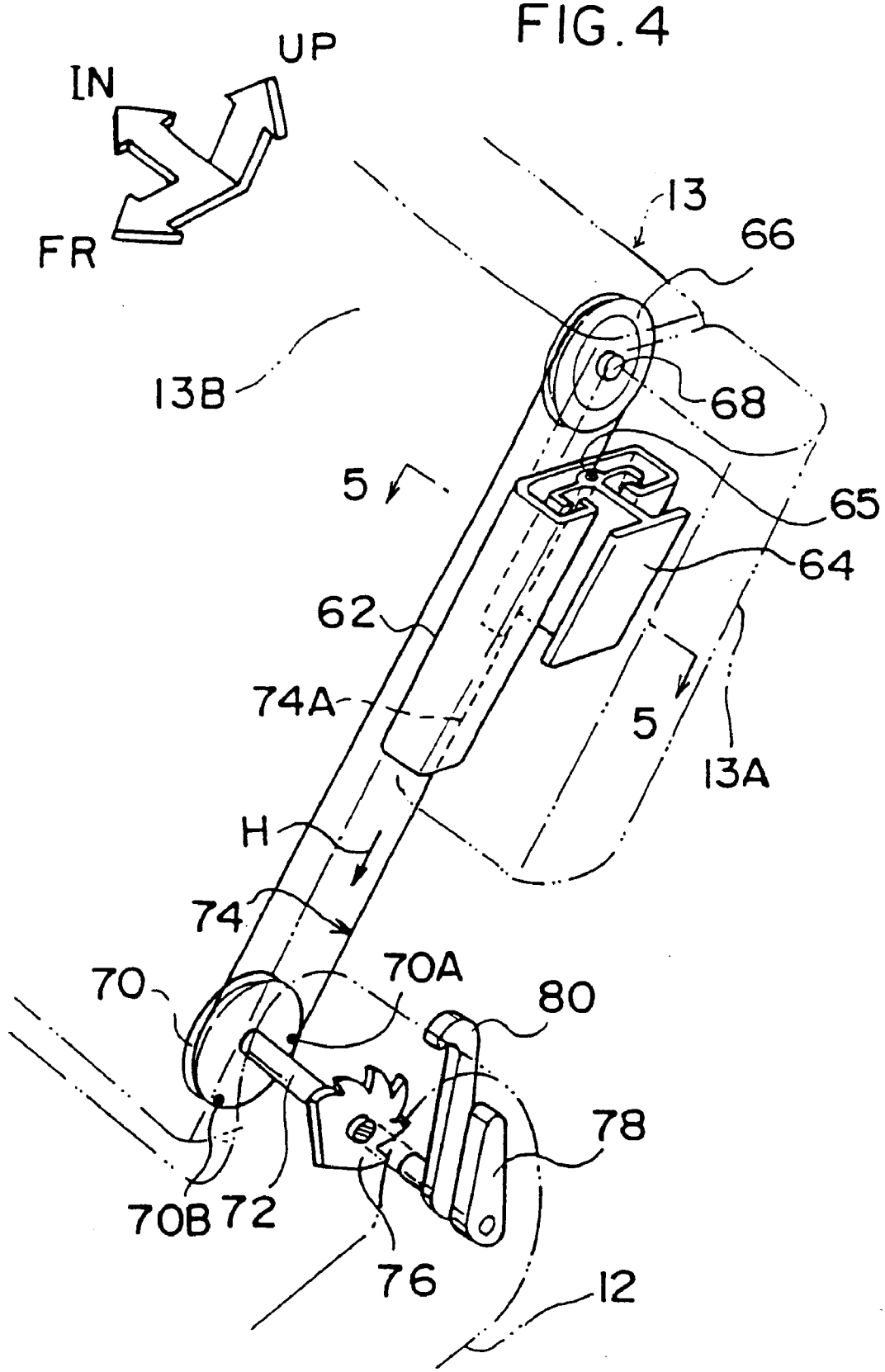
FIG. 4 is a perspective view showing a seat back moving means in the a vehicle seat storing device in accordance with the first embodiment of the present invention seen diagonally from the front of the vehicle.

As shown in FIG. 4, a rail 62 as a seat backside moving means extending in the height direction of the seat back 13 is disposed at both side portions of the body portion 13B of the seat back 13. A guide 64 as the seat backside moving means fixed to the shoulder portion 13A is slidably engaged with this rail 62. A pulley 66 as the seat backside moving means is disposed above the rail 62. This pulley 66 is rotatably attached to an unillustrated seat back frame by a shaft 68. A pulley 70 as the seat backside moving means is disposed below the rail 62. This pulley 70 is attached to the seat cushion 12 such that the pulley 70 cannot be rotated. A wire 74 as the seat backside moving means is wound around the pulleys 66 and 70. Both ends of the wire 74 are respectively fixed to circular circumferences 70A and 70B of the pulley 70.

Figure 5:
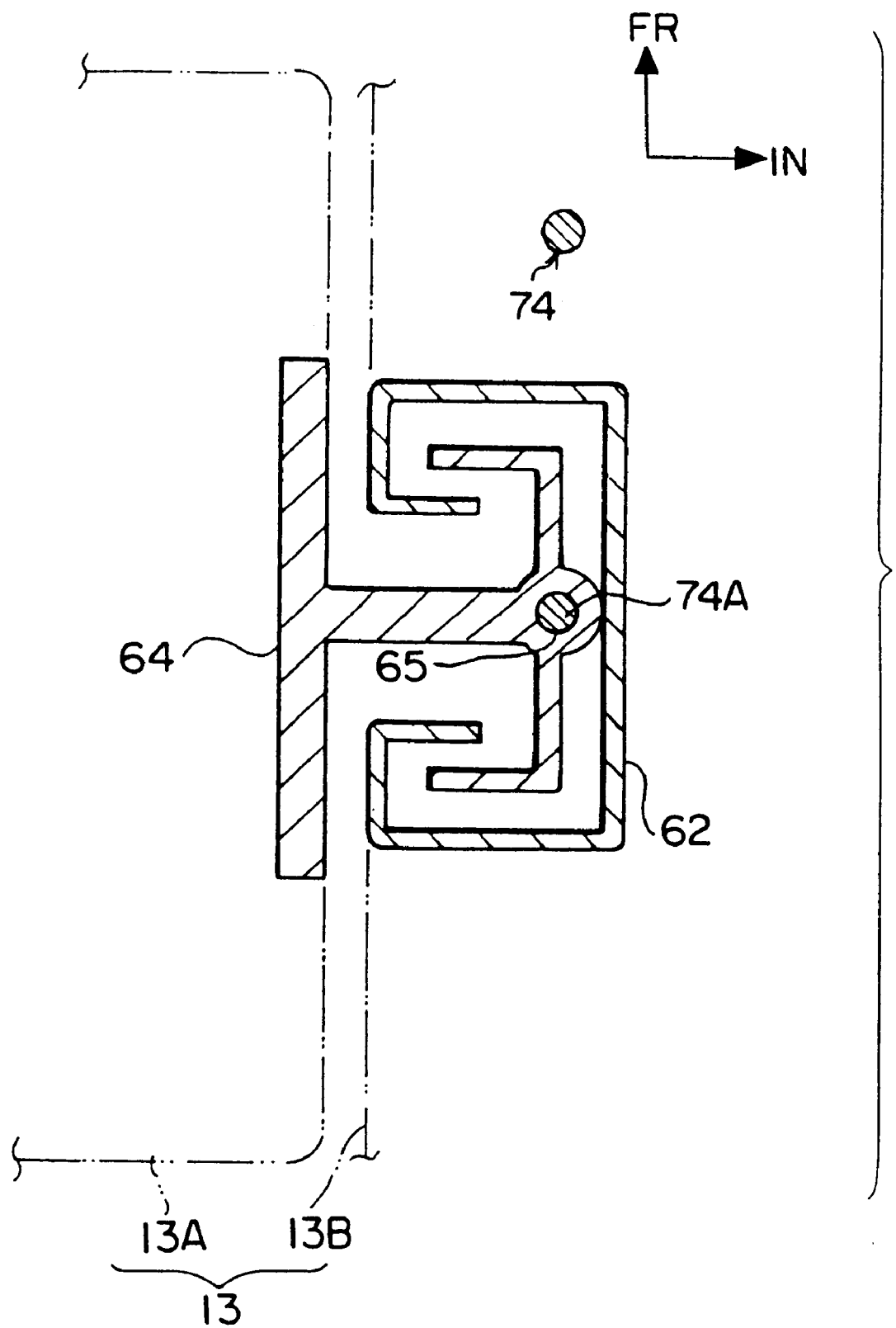
FIG. 5 is an enlarged sectional view taken along line 5—5 of FIG. 4.

As shown in FIG. 5, a wire 74A on a rear side in the longitudinal direction of the seat back 13 from the wires 74 stretched between the pulleys 66 and 70 is fixed onto the inner side of a hole 65 formed in the guide 64 by caulking, etc.

Figure 7:
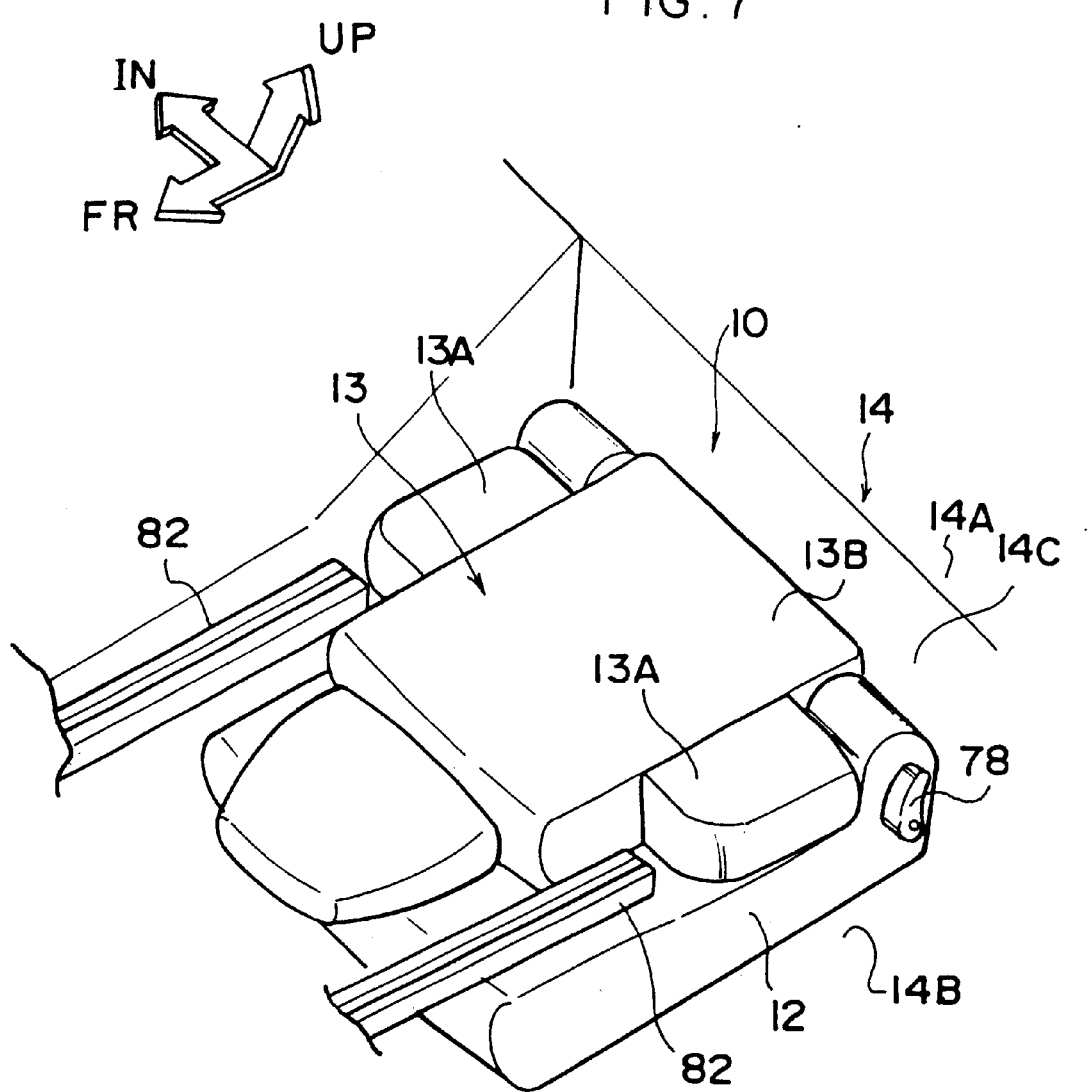
FIG. 7 is a perspective view showing a seat back in a state where the seat is stored in the a vehicle seat storing device in accordance with the first embodiment of the present invention seen diagonally from the front of the vehicle.

As shown in FIG. 4, a drive shaft 72 is formed as a swinging shaft in the longitudinal direction of the seat back 13 and is attached to the unillustrated seat back frame through the pulley 70. A swingable stopper 80 can be engaged with a latch 76 fixed to the drive shaft 72 by an operating knob 78. Accordingly, when the stopper 80 is swung backward by the operating knob 78 and the engagement of the stopper 80 and the latch 76 is released, the seat back 13 can be swung forward. When the seat back 13 is swung forward, a rear side 74A of the wire 74 is moved downward (in the direction of an arrow H in FIG. 4). As a result, the shoulder portion 13A is moved to a side of the pulley 70, i.e., a connecting portion side (in the direction of the arrow H in FIG. 4) of the seat back 13 and the seat cushion 12 together with the guide 64. As shown in FIG. 7, when the seat back 13 attains a lowered state on the seat cushion 12, the shoulder portion 13A reaches a position near a lower end of each of both side portions of the body portion 13B. When the rear seat 10 is stored in a position for storage, the shoulder portion 13A is located in a position where it dose not interfere with a slide lower rail 82 of a front seat 40.

A seat pan front lowering means in the present first embodiment will next be explained in accordance with FIGS. 8 and 9.

As shown in FIG. 8, in the present first embodiment, a rear end portion 88A of a wire 88 is fixed through a bracket 86 to a seat inside surface 84A of each of left-hand and right-hand plates 84 provided at both lower side portions of the seat back 13. An intermediate portion of the wire 88 reaches a forward position of the seat via a wire guide pulley 92 arranged on a seat inside surface 90A of each of left-hand and right-hand plates 90 provided at both rear side portions of the seat cushion 12, and a wire guide bracket 96 provided in the vicinity of each of left-hand and right-hand rear end portions 94A of a seat cushion frame 94.

The plate 84 can be swung with respect to the plate 90 in the longitudinal direction by an unillustrated reclining mechanism with a shaft 98. Accordingly, when the seat back 13 is lowered onto the seat cushion 12, the rear end portion 88A of the wire 88 is swung forward around the shaft 98 as a center together with the plate 84. Therefore, the intermediate portion of the wire 88 is moved in a backward direction of the seat (in the direction of an arrow A in FIG. 8) via the wire guide pulley 92 and the wire guide bracket 96.

Figure 9:
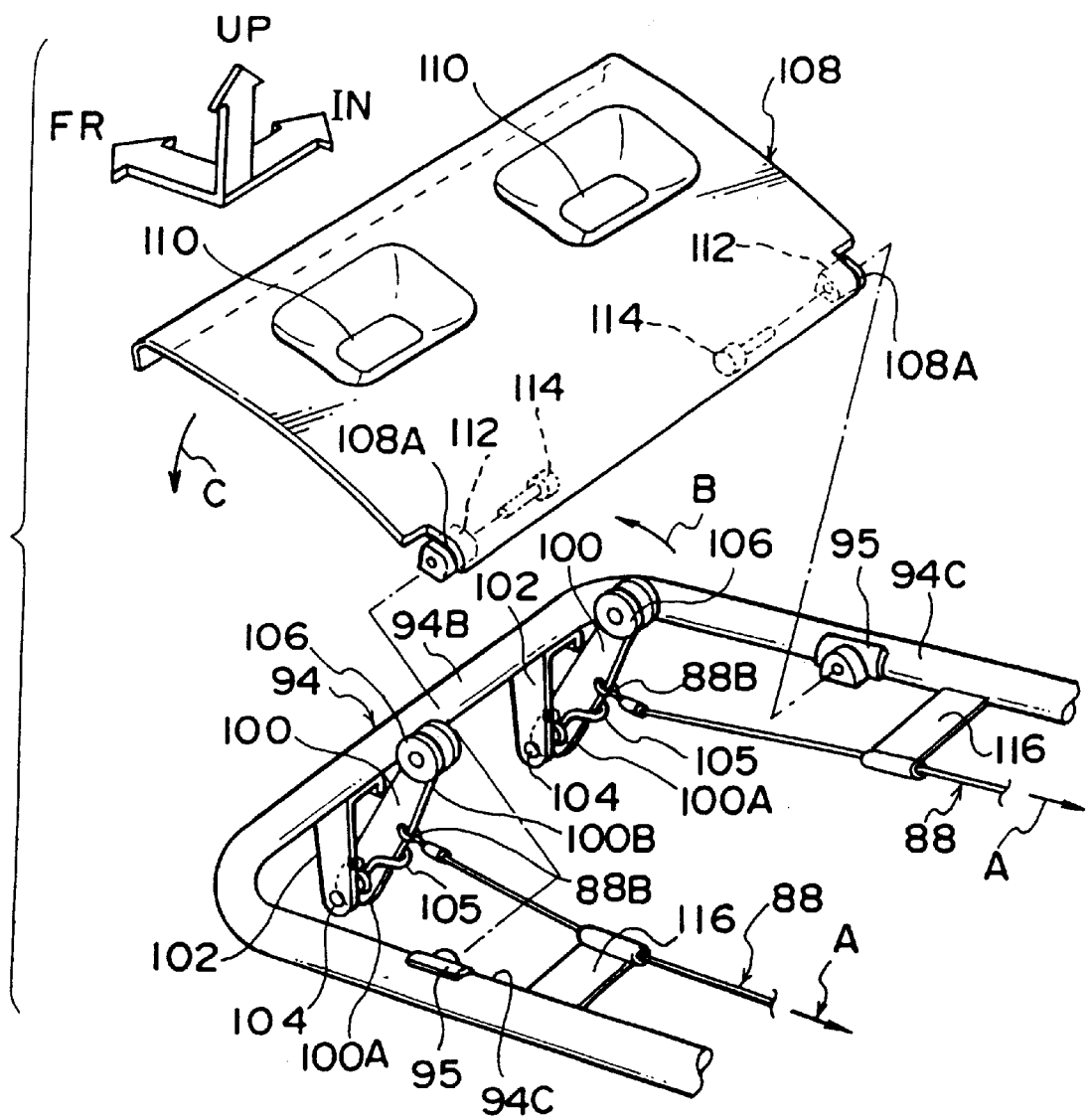
FIG. 9 is an exploded perspective view showing one portion of the seat pan front lowering means in the a vehicle seat storing device in accordance with the first embodiment of the present invention seen diagonally from the back of the vehicle.

As shown in FIG. 9, a front end portion 88B of each of the left-hand and right-hand wires 88 is connected to a longitudinal intermediate portion of each of links 100. A lower end portion 100A of each of these links 100 is swingably pivotally mounted by a shaft 104 to a lower end portion of a bracket 102 fixed to a portion near each of both end portions of a front portion 94B of the seat cushion frame 94. A spring 105 is wound around the shaft 104 and each of the links 100 is urged by this spring 105 forward (in the direction of an arrow B in FIG. 9) with the shaft 104.

A roller 106 is arranged in an upper end portion 100B of each link 100. The roller 106 supports a front portion of a seat pan 108 arranged above the front portion of the seat cushion frame 94 from below. A pair of left-hand and right-hand concave portions 110 are formed in the front portion of the seat pan 108 and are projected downward in a trapezoidal shape. The roller 106 comes in contact with the lower surface of a bottom portion of each of the concave portions 110. A bearing 112 is arranged in each of both rear end side portions 108A of the seat pan 108. The seat pan 108 is pivotally mounted by a shaft 114 inserted into this bearing 112 to a seat pan bracket 95 fixed to each of both side portions 94C of the seat cushion frame 94.

Accordingly, when the front end portion 88B of the wire 88 is moved backward (in the direction of the arrow A) and the roller 106 is moved backward together with the link 100 and is detached from the bottom portion of the concave portion 110, the seat pan 108 is swung downward (in the direction of an arrow C in FIG. 9) around the shaft 114. When the front end portion 88B of the wire 88 is moved forward (in the direction opposite to the direction of the arrow A) and the roller 106 is moved forward by the urging force of the spring 105 together with the link 100 and is returned to the bottom portion of the concave portion 110, the seat pan 108 is swung upward (in the direction opposite to the direction of the arrow C in FIG. 9) around the shaft 114. Reference numeral 116 in FIG. 9 designates a wire guide bracket.

A rear leg lock releasing means in the present first embodiment will next be explained in accordance with FIGS. 10 to 13.

Figure 11:
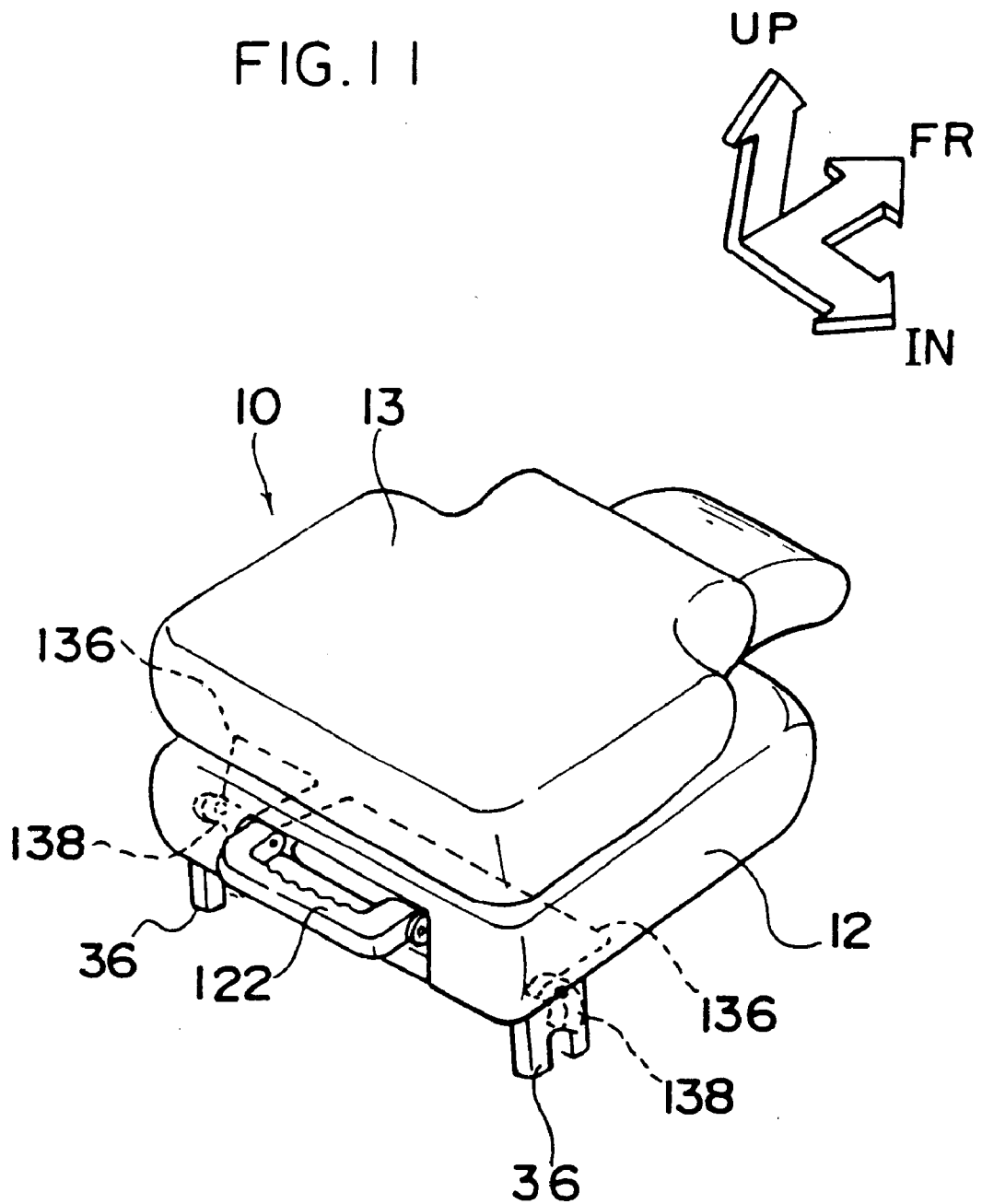
FIG. 11 is a perspective view showing a state where the rear leg lock releasing means is operated in the a vehicle seat storing device in accordance with the first embodiment of the present invention seen diagonally from the back of the vehicle.

As shown in FIG. 11, in the present embodiment, a lock releasing handle 122 is provided at the center of a rear portion of the seat cushion frame 120 and is also used as a handle for raising a seat.

Figure 10:
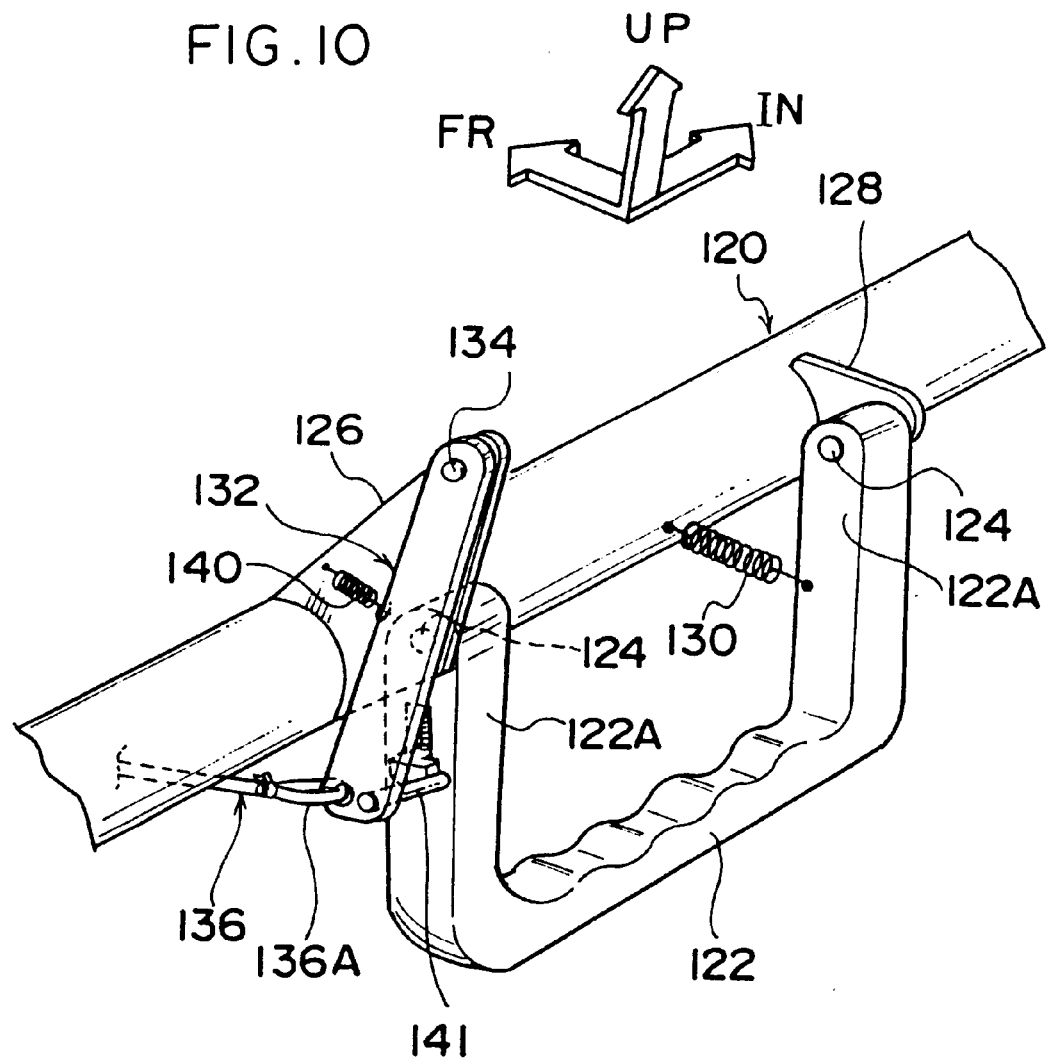
FIG. 10 is a perspective view showing one portion of a rear leg lock releasing means in the a vehicle seat storing device in accordance with the first embodiment of the present invention seen diagonally from the back of the vehicle.

As shown in FIG. 10, both end portions 122A of the lock releasing handle 122 are pivotally mounted by shafts 124 to brackets 126 and 128 fixed to the seat cushion frame 120. The lock releasing handle 122 is connected to the seat cushion frame 120 by a coil spring 130 and is urged in a position for storage (the position in FIG. 10) direction by the urging force of the coil spring 130.

An upper end portion of a link 132 is swingably pivotally mounted by a shaft 134 to an upper end portion of the bracket 126 in a longitudinal direction. One end portion 136A of a wire 136 is connected to a lower end portion of the link 132.

As shown in FIG. 11, the other end portion of the wire 136 is connected to a well-known lock mechanism 138 provided in the rear leg 36 of the rear seat 10. The lock mechanism 138 provided in the rear leg 36 of the rear seat 10 is released by moving the wire 136 so that the rear leg 36 is detached from an unillustrated striker provided on a floor surface in a rear portion of the vehicle.

As shown in FIG. 10, an intermediate portion of the link 132 is connected to the bracket 126 by a coil spring 140 and is urged forward by urging force of the coil spring 140. A pin 141 is vertically provided in a lower end portion of the link 132 facing towards the lock releasing handle 122.

Figure 12:
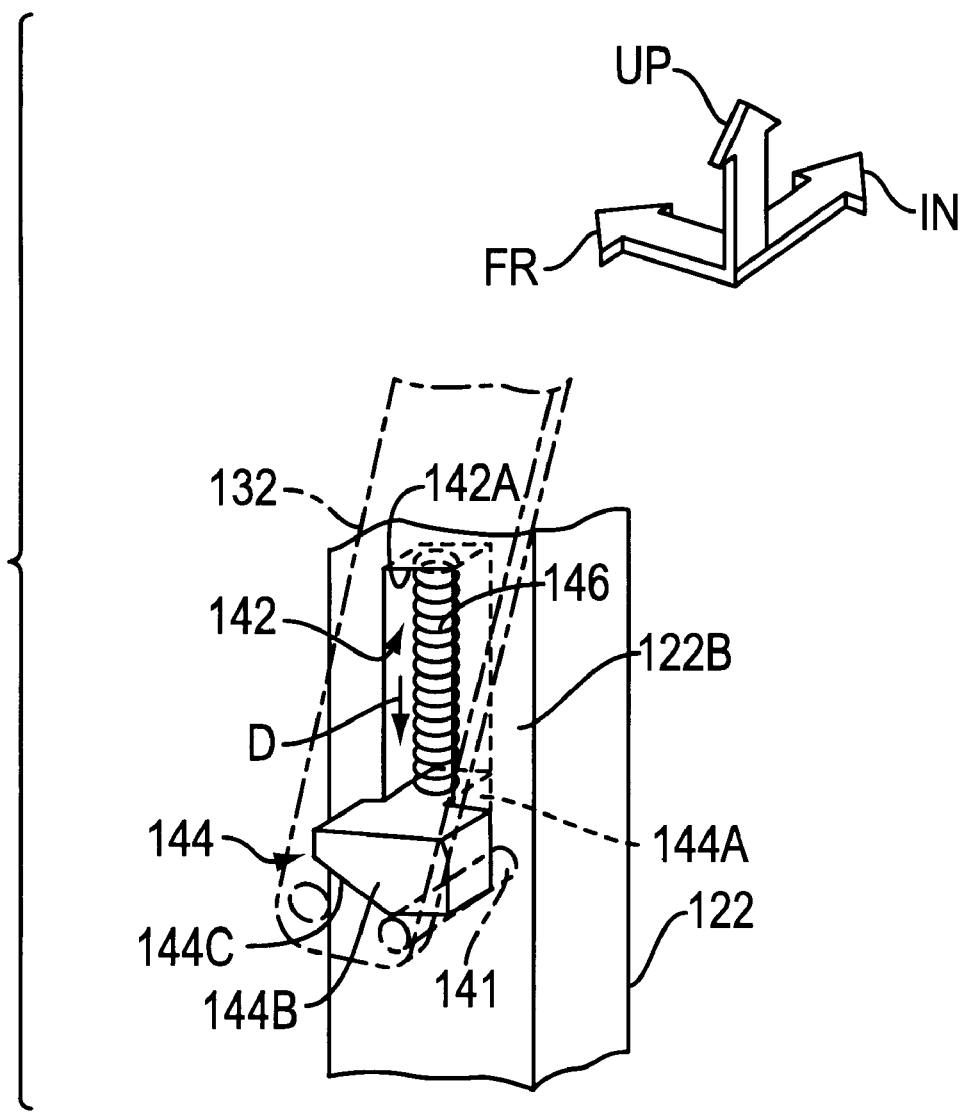
FIG. 12 is a perspective view showing one portion of the rear leg lock releasing means in the a vehicle seat storing device in accordance with the first embodiment of the present invention seen diagonally from the back of the vehicle.

As shown in FIG. 12, a concave portion 142 is formed on a side surface 122B of the lock releasing handle 122 and extends in a longitudinal direction of the side surface 122B. A leg portion 144A of a cam 144 is inserted into this concave portion 142. A coil spring 146 is inserted between this leg portion 144A and an upper wall portion 142A of the concave portion 142 and urges the cam 144 downward (in the direction of an arrow D in FIG. 12). A body portion 144B of the cam 144 projects from the concave portion 142 and has a trapezoidal shape having an inclining surface 144C in a front end lower portion of the cam 144 seen from its side.

Figure 13:
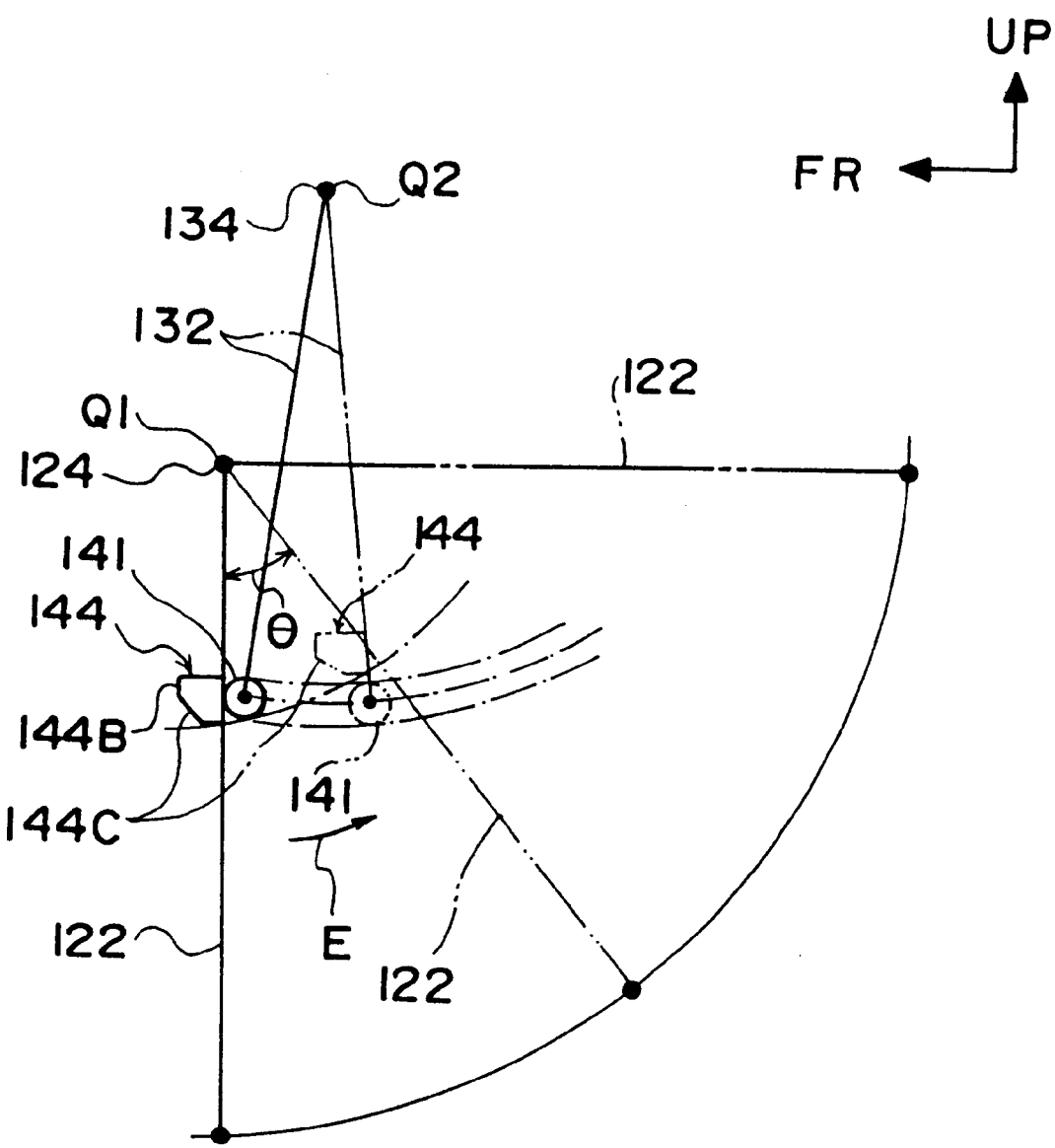
FIG. 13 is a view explaining an operation of the rear leg lock releasing means in the a vehicle seat storing device in accordance with the first embodiment of the present invention.

Accordingly, as shown in FIG. 13, when the lock releasing handle 122 is swung backward (in the direction of an arrow E in FIG. 13) around the shaft 124, the pin 141 coming in contact with a rear wall portion of the body portion 144B of the cam 144 is swung backward around the shaft 134 and the end portion 136A of the wire 136 is moved backward so that the lock mechanism 138 provided in the rear leg 36 of the rear seat 10 is released. Further, when the lock releasing handle 122 is swung backward (in the direction of the arrow E in FIG. 13) around the shaft 124, the engagement of the pin 141 and the body portion 144B of the cam 144 is released when the lock releasing handle 122 reaches a predetermined rotating angle θ since a rotating center Q1 of the body portion 144B of the cam 144 is different from a rotating center Q2 of the pin 141. Thus, the link 132 is returned to its original position by the urging force of the coil spring 140. When the lock releasing handle 122 is freed, the lock releasing handle 122 is returned to the position for storage (the position in FIG. 10) by the urging force of the coil spring 130. In this case, the pin 141 comes in contact with the inclining surface 144C of the body portion 144B of the cam 144 and the cam 144 is moved upward against the urging force of a coil spring 146 so that the pin 141 can ride across the body portion 144B of the cam 144.

A headrest angle adjusting means in the present first embodiment will next be explained in accordance with FIGS. 14 to 16.

Figure 14:
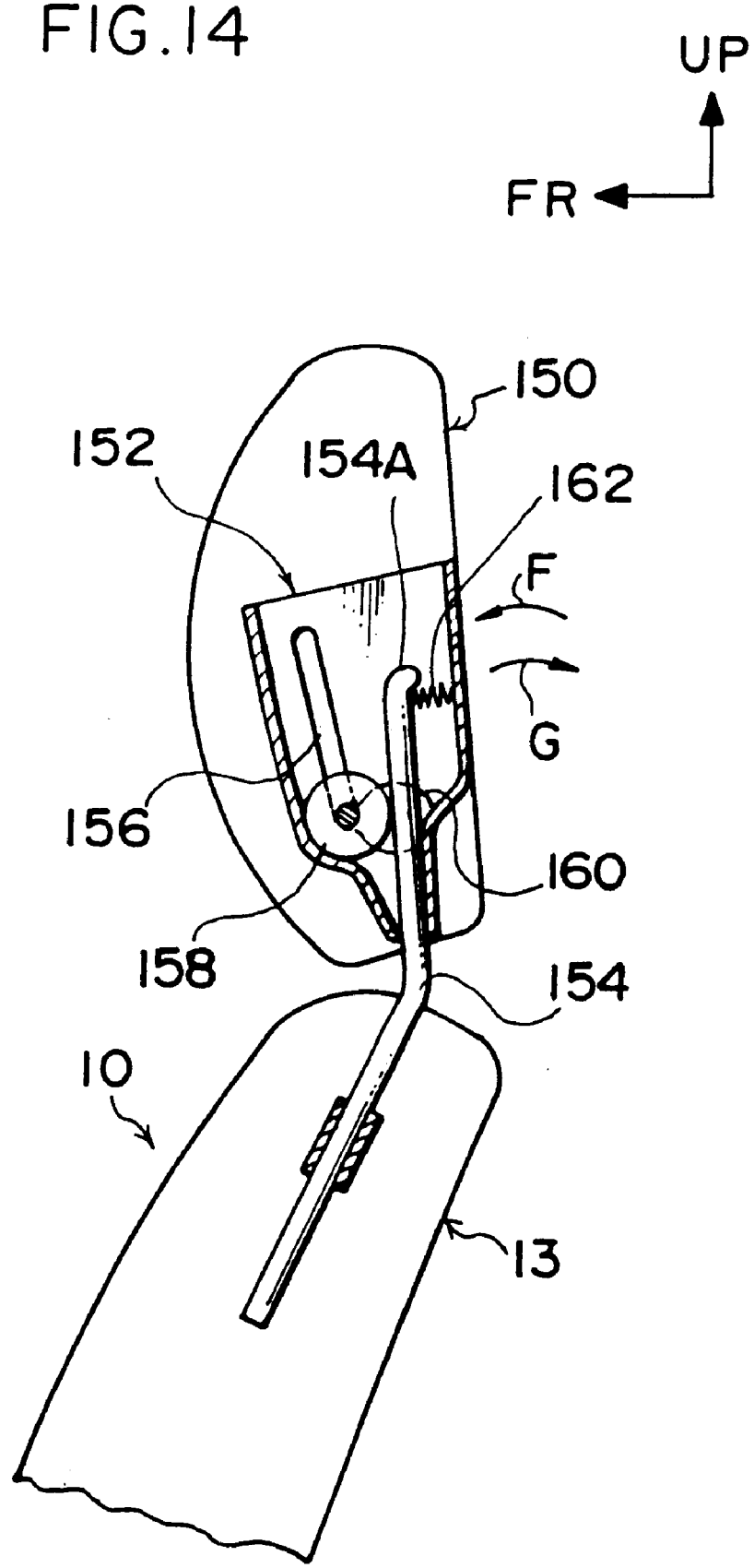
FIG. 14 is a side sectional view showing a headrest angle adjusting means in the a vehicle seat storing device in accordance with the first embodiment of the present invention.

As shown in FIG. 14, in the present first embodiment, a bracket 152 is provided within a headrest 150. This bracket 152 is swingably supported forward (in the direction of an arrow F in FIG. 14) and backward (in the direction of an arrow G in FIG. 14) by a stay 154 extending from the seat back 13.

Figure 15:
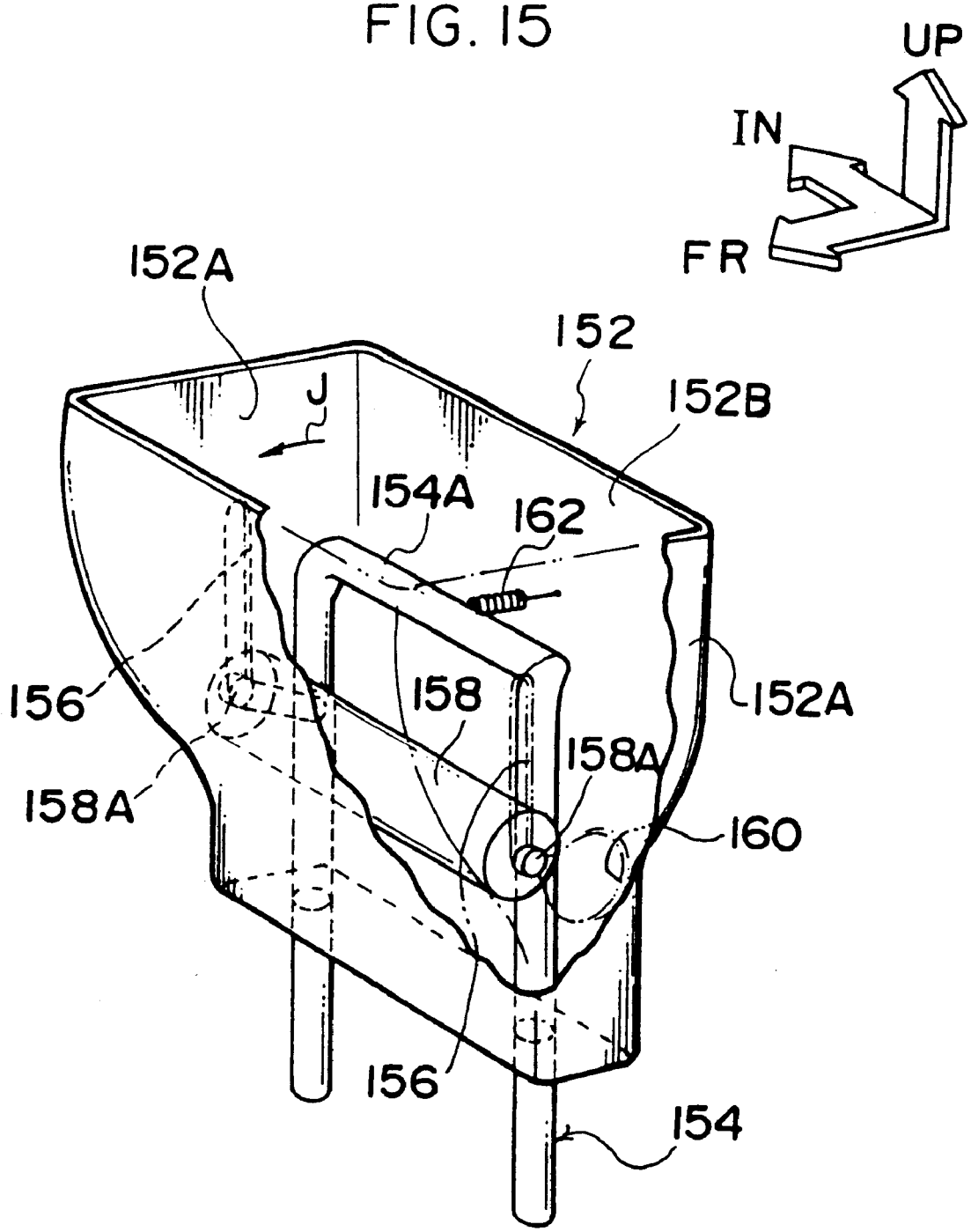
FIG. 15 is a perspective view showing the headrest angle adjusting means in the a vehicle seat storing device in accordance with the first embodiment of the present invention seen diagonally from the front of the vehicle.
Figure 16:
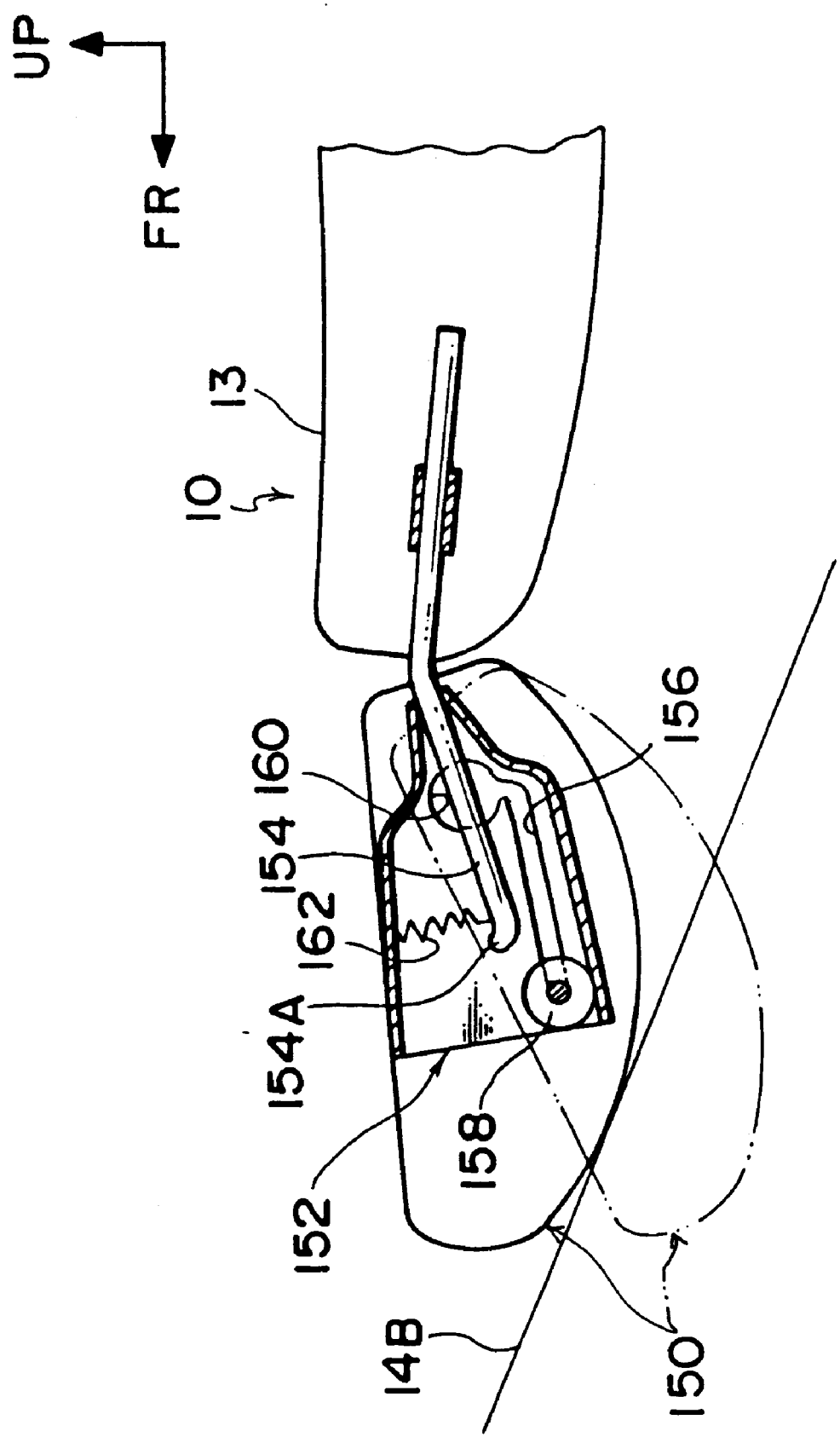
FIG. 16 is a side sectional view showing a state where the headrest angle adjusting means is stored in the a vehicle seat storing device in accordance with the first embodiment of the present invention.

As shown in FIG. 15, guide holes 156 extending in a height direction of the headrest are respectively formed in both side wall portions 152A of the bracket 152. A shaft portion 158A projecting to each of both end portions of a roller 158 is slidably inserted into each of these guide holes 156. A working hole 160 for attaching the roller 158 thereto is formed in a lower end portion of one guide hole 156. The stay 154 is assembled after the roller 158 is assembled. Thus, the roller 158 dose not fall out of the working hole 160 after the stay 154 is assembled.

An upper portion 154A of the stay 154 and a rear wall portion 152B of the bracket 152 are connected to each other by a coil spring 162. The bracket 152 is urged forward (in the direction of an arrow J in FIG. 15) by this coil spring,162 with respect to the stay 154.

Accordingly, in a state of ordinary use (in the raised state of the seat back 13), the roller 158 is moved downward by its own weight and comes in contact with the stay 154. As a result, an input from the headrest 150 can be transmitted to the stay 154 via the bracket 152 and the roller 158. When the seat back 13 is lowered during storage of the rear seat 10, the roller 158 is moved downward by its own weight on a front side along the guide hole 156 as shown in FIG. 16. When the roller 158 is detached from an upper portion 154A of the stay 154, the bracket 152 and the headrest 150 can be swung upward from a position shown by the two-dotted chain line in FIG. 16. Therefore, when the headrest 150 comes in contact with the vehicle-front-side floor surface 14B, the headrest 150 can be moved from the position shown by the two-dotted chain line in FIG. 16 to a position for storage shown by a solid line in FIG. 16.

When the seat back 13 is returned to its state of use position, the bracket 152 is swung forward (in the direction of the arrow J in FIG. 15) by this coil spring 162 with respect to the stay 154. Further, as shown in FIG. 14, the roller 158 is moved downward by its own weight and comes in contact with the stay 154. A portion of the stay 154 near its upper end portion 154A is curved in a backward direction of the vehicle such that no roller 158 is engaged with this upper end portion 154A.

An operation of the seat storing device of the present first embodiment will next be explained.

In the present first embodiment, as shown by a one-dotted chain line in FIG. 1, each of both lower end portions 36A of the rear leg 36 of the rear seat 10 is detached from the striker 38 in a state in which the seat back 13 is lowered forward onto the seat cushion 12. When the rear seat 10 is moved forward, the front leg 22 of the rear seat 10 is swung forward around the roller arm 24 as a center. When the front leg 22 of the rear seat 10 is swung forward by a predetermined angle and reaches the position shown by the two-dotted chain line in FIG. 1, the hook 26 provided in the roller arm 24 is disengaged from the round bar portion 18B of each of the left-hand and right-hand strikers 18, and the left-hand and right-hand rollers 28 are moved downward along the respective guide rails 30. Further, as the left-hand and right-hand rollers 28 are moved downward along the respective guide rails 30, the front leg 22 of the rear seat 10 is swung further forward around the roller arm 24. As a result, the rear seat 10 is moved to a storage state shown by the three-dotted chain line in FIG. 1, i.e., onto the vehicle-front-side floor surface 14B.

Figure 24:
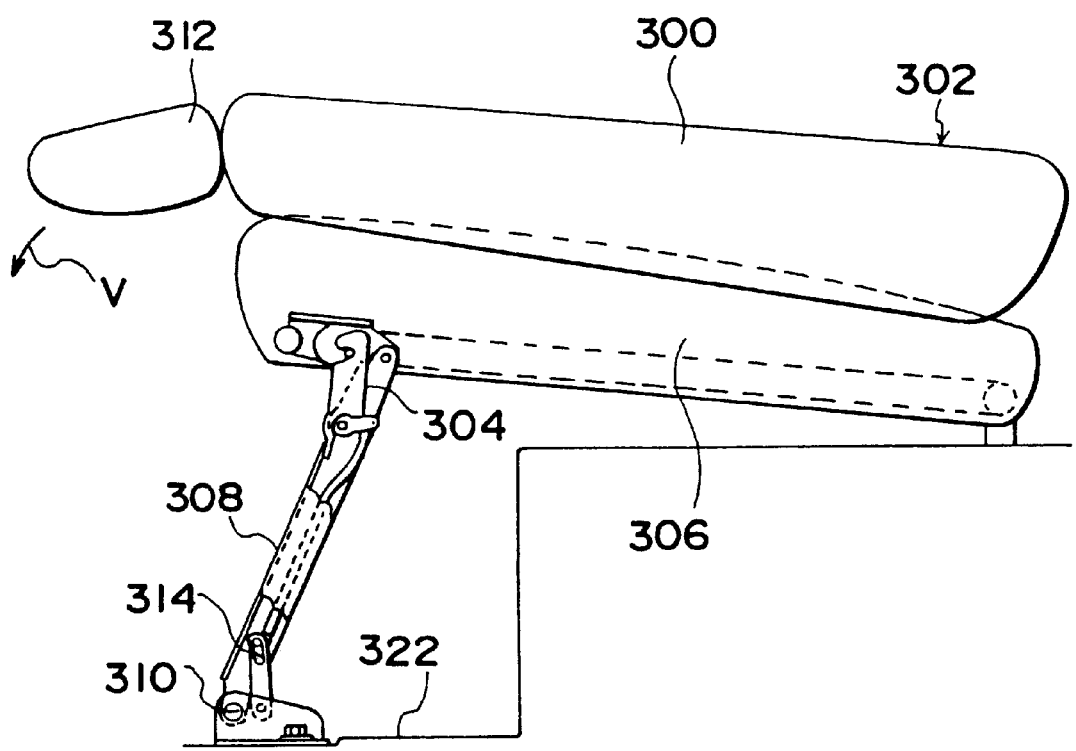
FIG. 24 is a schematic side view showing a state before storage of a vehicle seat storing device in accordance with a conventional embodiment.

Namely, in the present first embodiment, when the seat 10 is guided from the state of use position shown by the solid line in FIG. 1 to the position for storage shown by the three-dotted chain line, the seat 10 is moved between the state of use position and the position for storage by swinging using the front leg 22 and slide using the guide rails 30. As a result, as shown in FIG. 24, a radius of rotation of the seat at the time of storaging can be reduced in comparison with a construction for guiding the seat in a storage direction with respect to a vehicle body by only the swinging of the front leg.

Further, in this embodiment, when the rear seat 10 is swung in the storage direction, the slide of the front leg 22 is locked with respect to the guide rail 30 by the hook 26 and the striker 18 until an angle formed by the guide rail 30 and the front leg 22 reaches a predetermined value. Therefore, the rear seat 10 can be reliably swung in a desirable direction for storage with respect to the vehicle body. Namely, the rear seat 10 is moved to the position for storage by continuous movements of the front leg 22 and the guide rail 30. When the angle between the guide rail 30 and the front leg 22 reaches the predetermined value, a slide lock state is automatically released and the rear seat 10 is slid along the guide rail 30 in the direction for storage so that operability when storing is good. The front leg 22 may be slid with respect to the guide rail 30 before the angle between the guide rail 30 and the front leg 22 reaches the predetermined value. The rear seat 10 can be moved to the position for storage by a composite movement of the front leg 22 and the guide rail 30.

In the present first embodiment, as shown in FIG. 4, when the seat back 13 is swung forward in a state in which the stopper 80 is swung backward by operating the operating knob 78 and the engagement of the stopper 80 and the latch 76 is released, the rear side wire 74A is moved onto a side of the pulley 70 (in the direction of an arrow H in FIG. 4). As a result, the shoulder portion 13A is moved onto the side of the pulley 70 (in the direction of the arrow H in FIG. 4) together with the guide 64. As shown in FIG. 7, when the seat back 13 attains a front lowered state on the seat cushion 12, the shoulder portion 13A reaches a position near a lower end of each of both side portions of the body portion 13B.

As a result, when the rear seat 10 is stored in the position for storage, the shoulder portion 13A does not interfere with the slide lower rail 82 of the front seat 40.

In the present first embodiment, as shown in FIG. 8, when the seat back 13 is lowered forward onto the seat cushion 12, a rear end portion 88A of the wire 88 is swung forward around a shaft 98 together with the plate 84. Therefore, an intermediate portion of the wire 88 is moved in a backward direction of the seat (in the direction of an arrow A in FIG. 8) through the wire guide pulley 92 and the wire guide bracket 96. As a result, as shown in FIG. 9, a front end portion 88B of the wire 88 is moved backward (in the direction of the arrow A) and the roller 106 is moved backward together with the link 100. When the roller 106 is disengaged from a bottom portion of the concave portion 110, the seat pan 108 is swung downward (in the direction of an arrow C in FIG. 9) around the shaft 114. Accordingly, when the seat back 13 is lowered forward onto the seat cushion 12, the height of the seat back 13 on its rear side, i.e., the height of the rear seat 10 can be lowered so that storability is improved. When the seat back 13 is raised, the front end portion 88B of the wire 88 is moved forward (in a direction opposite to the direction of the arrow A). The roller 106 is moved forward by the urging force of the spring 105 together with the link 100 and is returned to the bottom portion of the concave portion 110. The seat pan 108 is swung upward (in a direction opposite to the direction of the arrow c in FIG. 9) around the shaft 114 In the present first embodiment, as shown in FIG. 13, when the lock releasing handle 122 is swung backward (in the direction of an arrow E in FIG. 13) around the shaft 124, the pin 141 coming in contact with a rear wall portion of the body portion 144B of the cam 144 is swung backward around the shaft 134, and an end portion 136A of the wire 136 is moved backward. As a result, the lock mechanism 138 provided in the rear leg 36 of the rear seat 10 is released so that the operation of storing the rear seat 10 can be smoothly started.

Further, when the lock releasing handle 122 is swung backward (in the direction of the arrow E in FIG. 13) around the shaft 124, the engagement of the body portion 144B of the cam 144 and the pin 141 is released when the lock releasing handle 122 reaches a predetermined rotating angle θ since the center of rotation Q1 of the body portion 144B of the cam 144 is different from the center of rotation Q2 of the pin 141. Thus, the lock releasing handle 122 is returned to its original position by the urging force of the coil spring 140. When the lock releasing handle 122 is freed, the lock releasing handle 122 is returned to its position for storage (a position shown in FIG. 10) by the urging force of the coil spring 130. In this case, the pin 141 can ride across the body portion 144B of the cam 144 since the pin 141 comes in contact with an inclining surface 144C of the body portion 144B of the cam 144 and the cam 144 is moved upward against the urging force of the coil spring 146.

In the present first embodiment, as shown in FIG. 14, the roller 158 is moved downward by its own weight and comes in contact with the stay 154 in a state of ordinary use (a state where the back seat 13 is raised up). As a result, an input from the headrest 150 can be transmitted to the stay 154 through the bracket 152 and the roller 158. When the seat back 13 is lowered forward during storage of the rear seat 10, the roller 158 is moved downward on a front side along the guide hole 156 by its own weight as shown in FIG. 16. When the roller 158 is disengaged from a lower portion of the stay 154, each of the bracket 152 and the headrest 150 can be swung upward from a position shown by the two-dotted chain line in FIG. 16. As a result, when the headrest 150 is pressed against the vehicle-front-side floor surface 14B, the headrest 150 is moved from the position shown by the two-dotted chain line in FIG. 16 to a position for storage shown by a solid line in FIG. 16. Therefore, the headrest 150 can be reliably stored irrespective of the angle of the headrest 150 during use.

When the seat back 13 is returned to its position for use, the bracket 152 is swung forward (in the direction of an arrow J in FIG. 15) with respect to the stay 154 by a coil spring 162 of this seat back 13. Further, as shown in FIG. 14, the roller 158 is moved downward by its own weight and comes in contact with the stay 154.

A headrest angle adjusting means according to a second embodiment of the a vehicle seat storing device of the present invention will next be explained in accordance with FIGS. 17 to 19.

The same members as in the first embodiment are designated by the same reference numerals and their explanations are omitted here.

Figure 17:
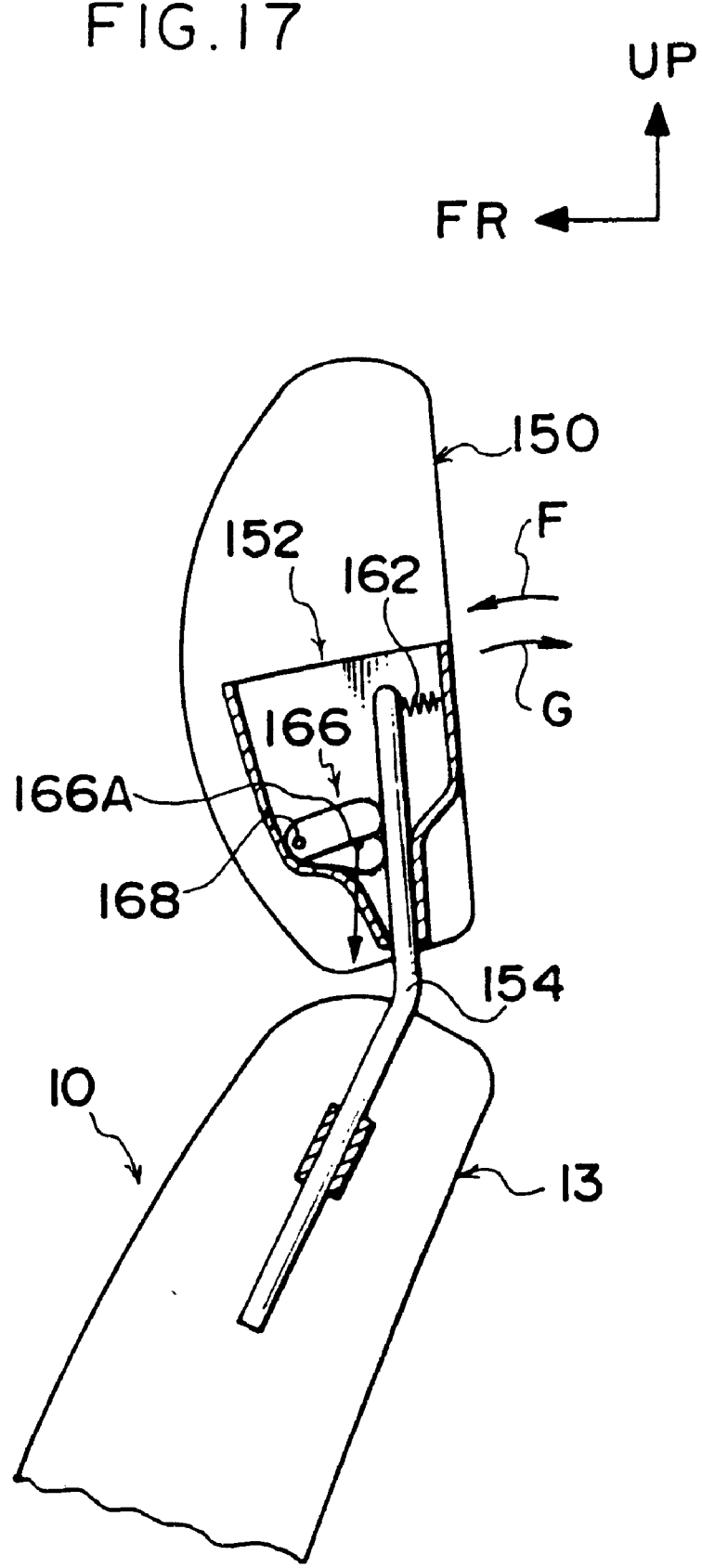
FIG. 17 is a side sectional view showing a headrest angle adjusting means in a vehicle seat storing device in accordance with a second embodiment of the present invention.

As shown in FIG. 17, a bracket 152 is provided within the headrest 150 in the present second embodiment. This bracket 152 is swingably supported forward (in the direction of an arrow F in FIG. 17) and backward (in the direction of an arrow G in FIG. 17) by a stay 154 extending from the seat back 13.

Figure 18:
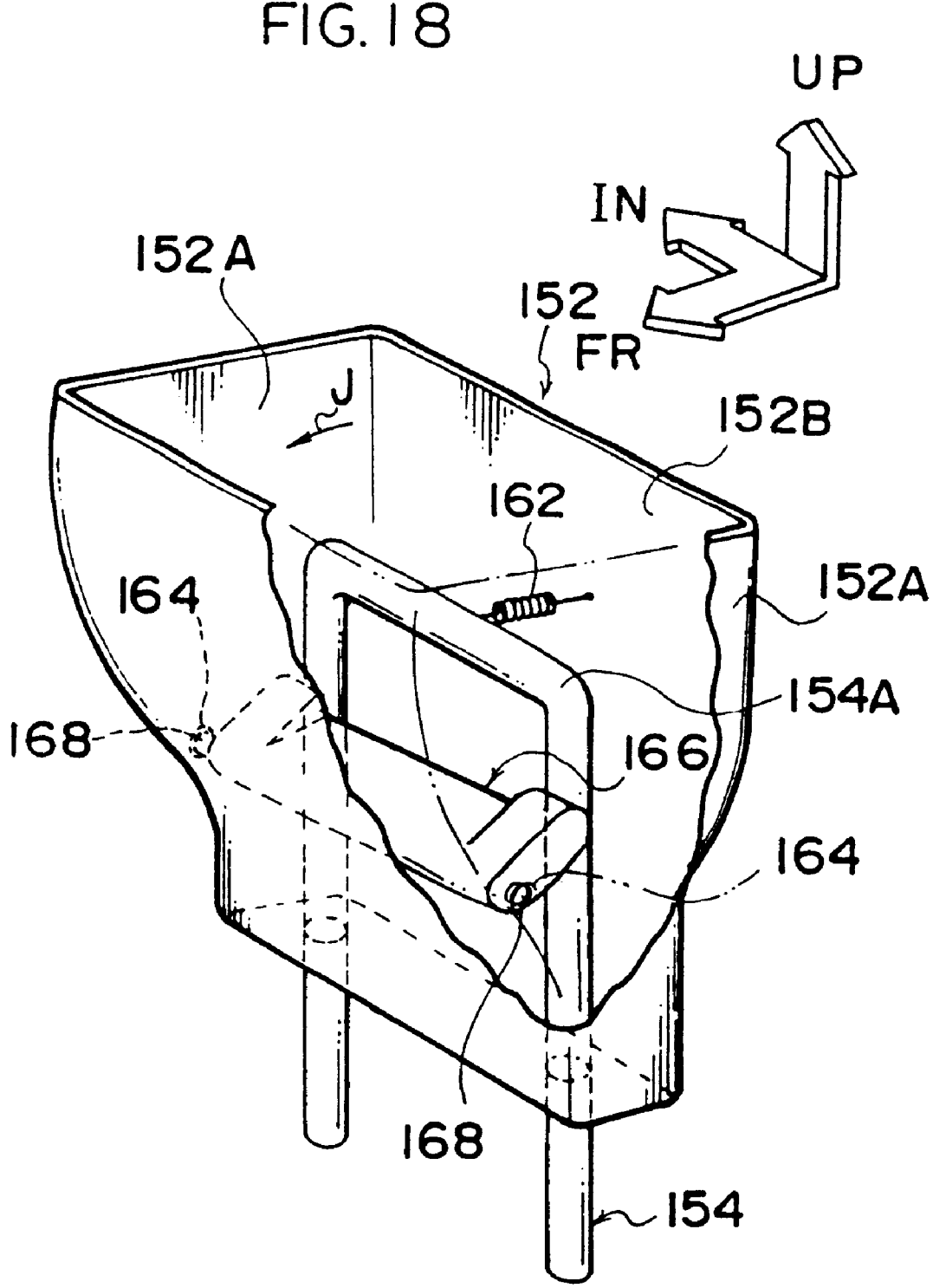
FIG. 18 is a perspective view showing the headrest angle adjusting means in the a vehicle seat storing device in accordance with the second embodiment of the present invention seen diagonally from the front of the vehicle.

As shown in FIG. 18, a hole 164 is formed in each of both side wall portions 152A of the bracket 152. A shaft 168 projecting to both end portions of a pawl 166 is rotatably inserted into this hole 164.

Accordingly, as shown in FIG. 17, a center of gravity 166A of the pawl 166 is located behind a shaft 168 as a rotating shaft in a state of ordinary use (a state where the seat back 13 is raised up). Therefore, the pawl 166 is lowered backward by its own weight and comes in contact with the stay 154. As a result, an input from a headrest 150 can be transmitted to the stay 154 through the bracket 152 and the pawl 166.

Figure 19:
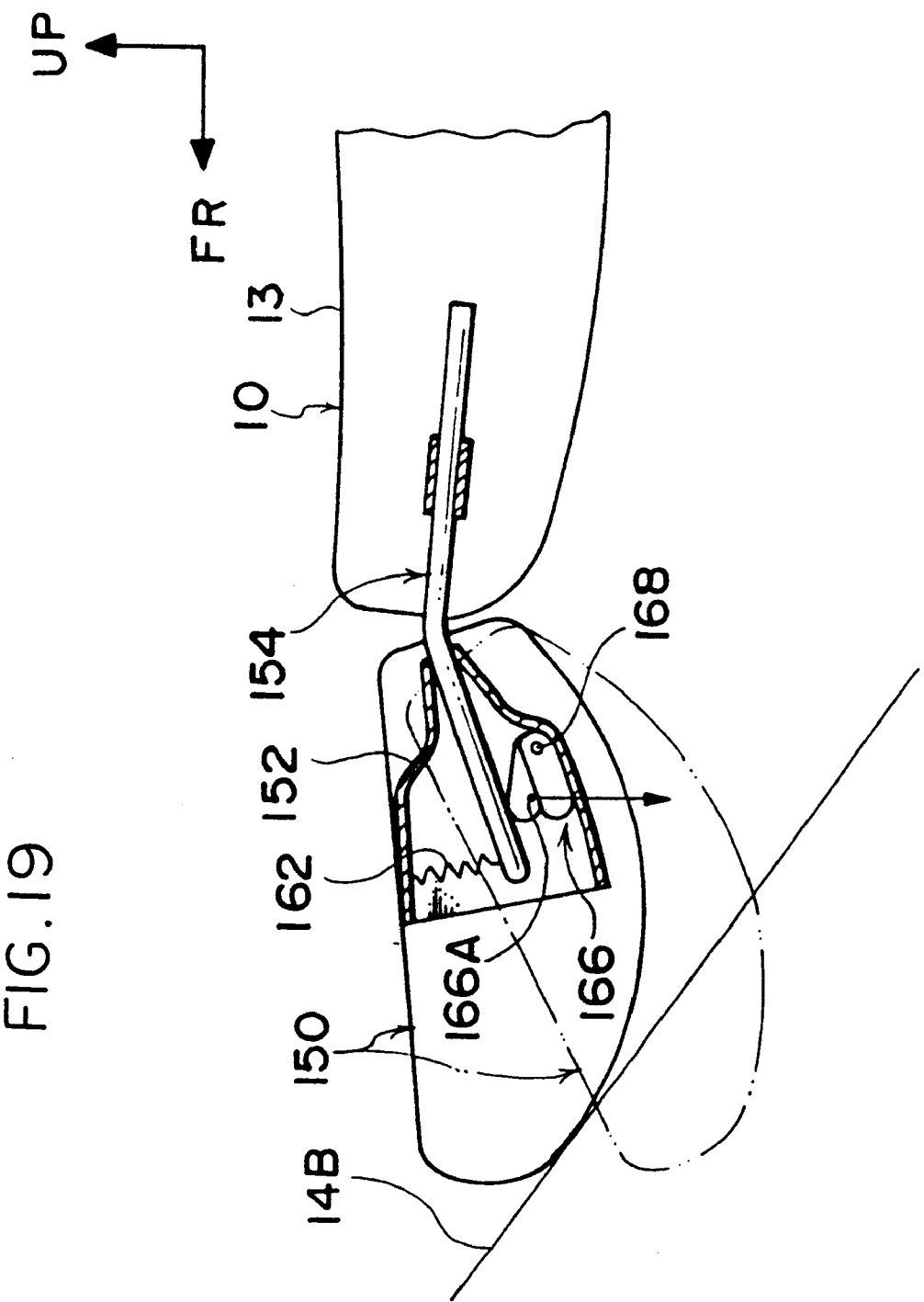
FIG. 19 is a side sectional view showing a state where the headrest angle adjusting means is stored in the a vehicle seat storing device in accordance with the second embodiment of the present invention.

When the seat back 13 is lowered forward during storage of the rear seat 10, the center of gravity 166A of the pawl 166 is located forward from the shaft 168 as a rotating shaft as shown in FIG. 19 so that the pawl 166 is lowered forward by its own weight. As a result, the bracket 152 and the headrest 150 can be swung upward. When the headrest 150 is pressed against a vehicle-front-side floor surface 14B in a front portion of the vehicle, the headrest 150 can be moved from a position shown by a two-dotted chain line in FIG. 19 to a position for storage shown by a solid line in FIG. 19.

When the seat back 13 is returned to its position for use, the bracket 152 is swung forward (in the direction of an arrow J in FIG. 18) with respect to the stay 154 by a coil spring 162 of the seat back 13. As shown in FIG. 17, the pawl 166 is lowered backward by its own weight and comes in contact with the stay 154.

The operation of the seat storing device in the present second embodiment will next be explained.

In the present second embodiment, as shown in FIG. 17, the center of gravity 166A of the pawl 166 is located behind the shaft 168 as a rotating shaft in the state of ordinary use (the state where the seat back 13 is raised up). Therefore, the pawl 166 is lowered backward by its own weight and comes in contact with the stay 154. As a result, an input from the headrest 150 can be transmitted to the stay 154 via the bracket 152 and the pawl 166.

When the seat back 13 is lowered forward during storage of the rear seat 10, the center of gravity 166A of the pawl 166 is located forward from the shaft 168 as a rotating shaft as shown in FIG. 19 so that the pawl 166 is lowered forward by its own weight. As a result, the bracket 152 and the headrest 150 can be swung upward. The headrest 150 is moved from the position shown by a two-dotted chain line in FIG. 19 to the position for storage shown by a solid line in FIG. 19 even when the headrest 150 comes in contact with the vehicle-front-side floor surface 14B. Therefore, the headrest 150 can be reliably stored irrespective of the angle of the headrest 150 during use.

When the seat back 13 is returned to the position for use, the bracket 152 is swung forward (in the direction of the arrow J in FIG. 18) with respect to the stay 154 by the coil spring 162 of the seat back 13. As shown in FIG. 17, the pawl 166 is lowered backward by its own weight and comes in contact with the stay 154.

A headrest moving means according to a third embodiment of the a vehicle seat storing device of the present invention will next be explained in accordance with FIGS. 20 and 21.

The same members as in the first embodiment are designated by the same reference numerals and their explanations are omitted here.

Figure 20:
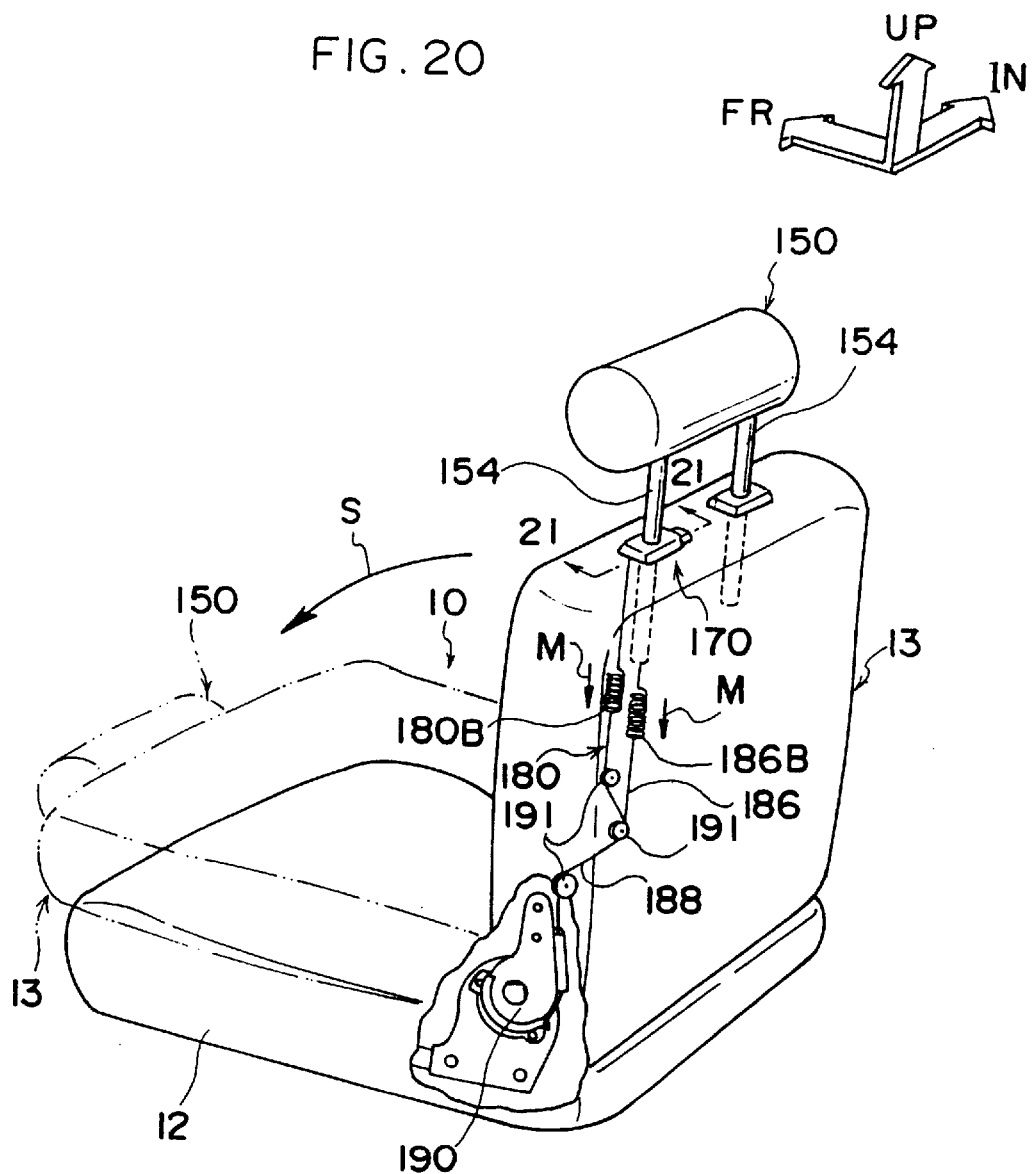
FIG. 20 is a perspective view showing a headrest moving means in a vehicle seat storing device in accordance with a third embodiment of the present invention seen diagonally from the back of the vehicle.

As shown in FIG. 20, in the present third embodiment, a stay 154 of the headrest 150 is inserted into a headrest lock device 170 provided in an upper portion of the seat back 13.

Figure 21:
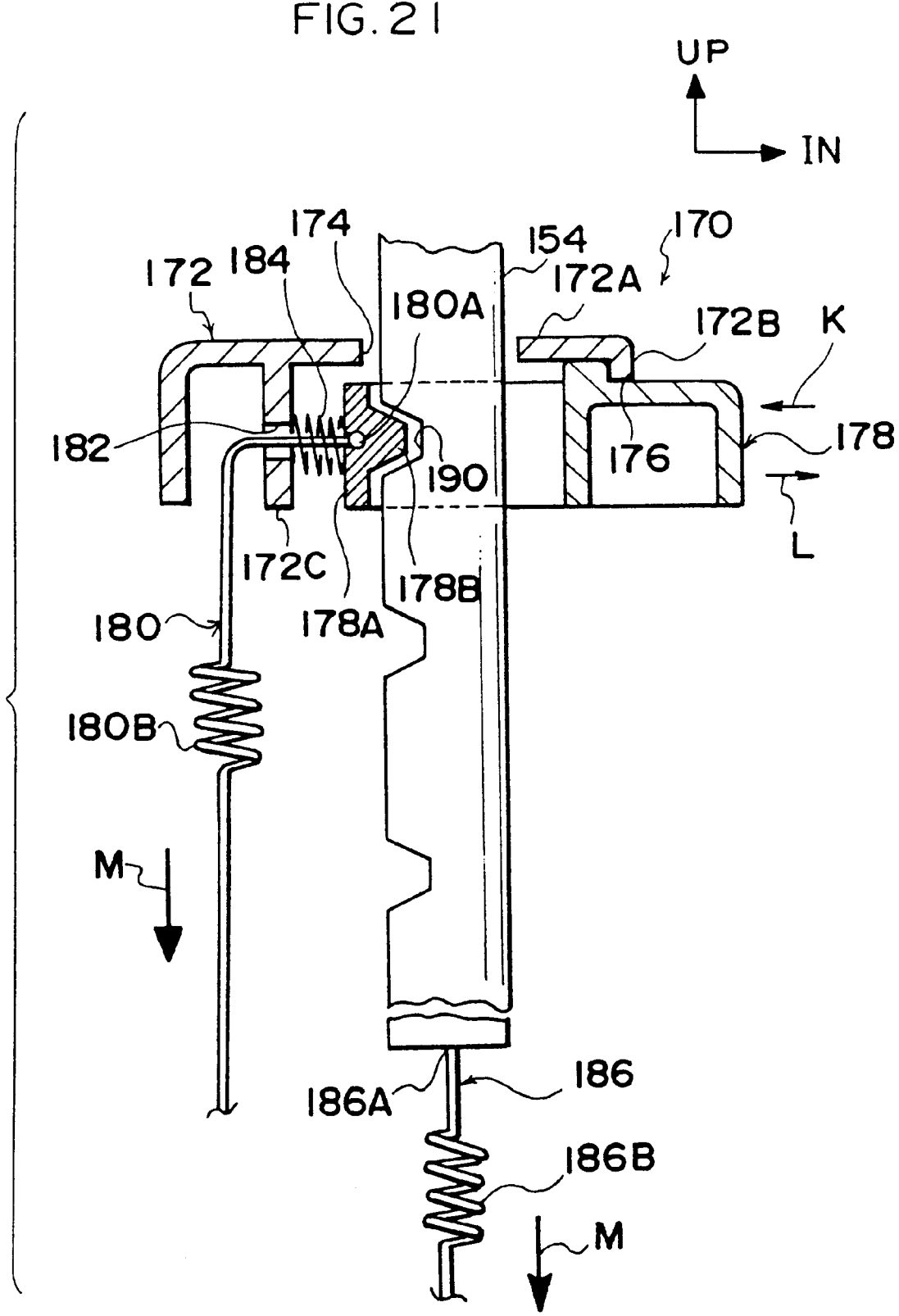
FIG. 21 is an enlarged sectional view taken along line 21—21 of FIG. 20.

As shown in FIG. 21, a hole 174 for inserting the stay 154 thereinto is formed in an upper wall portion 172A of a base 172 of the headrest lock device 170. A flange 176 is formed in a side wall portion 172B of the base 172. A lock releasing button 178 is swingably supported by this flange 176 inward (in the direction of an arrow K in FIG. 21) and outward (in the direction of an arrow L in FIG. 21) from the base 172.

One end portion 180A of a wire 180 is fixed to an inside end portion 178A of the lock releasing button 178. An intermediate portion of the wire 180 passes through a hole 182 of a guide portion 172C formed on an inner side of the base 172. A coil spring 184 is inserted in an outer circumferential portion of the intermediate portion of the wire 180 between the guide portion 172C and the lock releasing button 178 so that the lock releasing button 178 is urged outward (in the direction of the arrow L in FIG. 21) from the base 172. A convex portion 178B is formed in the inside end portion 178A of the lock releasing button 178 and can be engaged with a plurality of lock grooves 190 formed at predetermined intervals in the stay 154. One end portion 186A of the wire 186 is fixed to a lower end portion of the stay 154 of the headrest 150.

As shown in FIG. 20, the other end portion of the wire 180 and the other end portion of the wire 186 are connected to one wire 188. This wire 188 is connected to a seat back adjuster 190 through a guide means 191 such as a pulley, etc. As a result, when the seat back 13 is lowered forward, the wire 188 connected to the seat back adjuster 190 is wound up and each of the wires 180 and 186 is pulled downward (in the direction of an arrow M in FIG. 20).

As shown in FIG. 21, an expansion portion 180B is formed in the intermediate portion of the wire 180, and an expansion portion 186B is formed in an intermediate portion of the wire 186. Therefore, the wire 180 is moved in the direction of the arrow M and the lock releasing button 178 is moved in the direction of the arrow K against the urging force of the coil spring 184. The convex portion 178B of the lock releasing button 178 is pulled out of a lock groove 190 of the stay 154. The wire 186 is moved in the direction of the arrow M and lowers the stay 154.

The operation of the seat storing device of the present third embodiment will next be explained.

In the present third embodiment, when the seat back 13 is lowered forward as shown by an arrow S in FIG. 20, the wire 188 connected to the seat back adjuster 190 is wound up and each of the wires 180 and 186 is pulled downward (in the direction of the arrow M in FIG. 20). As a result, the wire 180 is moved in the direction of the arrow M and the lock releasing button 178 is moved in the direction of the arrow K in FIG. 21 against the urging force of the coil spring 184. The convex portion 178B of the lock releasing button 178 is pulled out of the lock groove 190 of the stay 154. The wire 186 is moved in the direction of the arrow M and lowers the stay 154. Therefore, as shown by a two-dotted chain line in FIG. 20, the headrest 150 is located in a position approaching the seat back 13 so that the headrest 150 can be reliably stored irrespective of the position of the headrest 150 during use.

A vehicle seat storing device in accordance with a fourth embodiment of the present invention will next be explained in accordance with FIG. 22.

The same members as in the first embodiment are designated by the same reference numerals and their explanations are omitted here.

Figure 22:
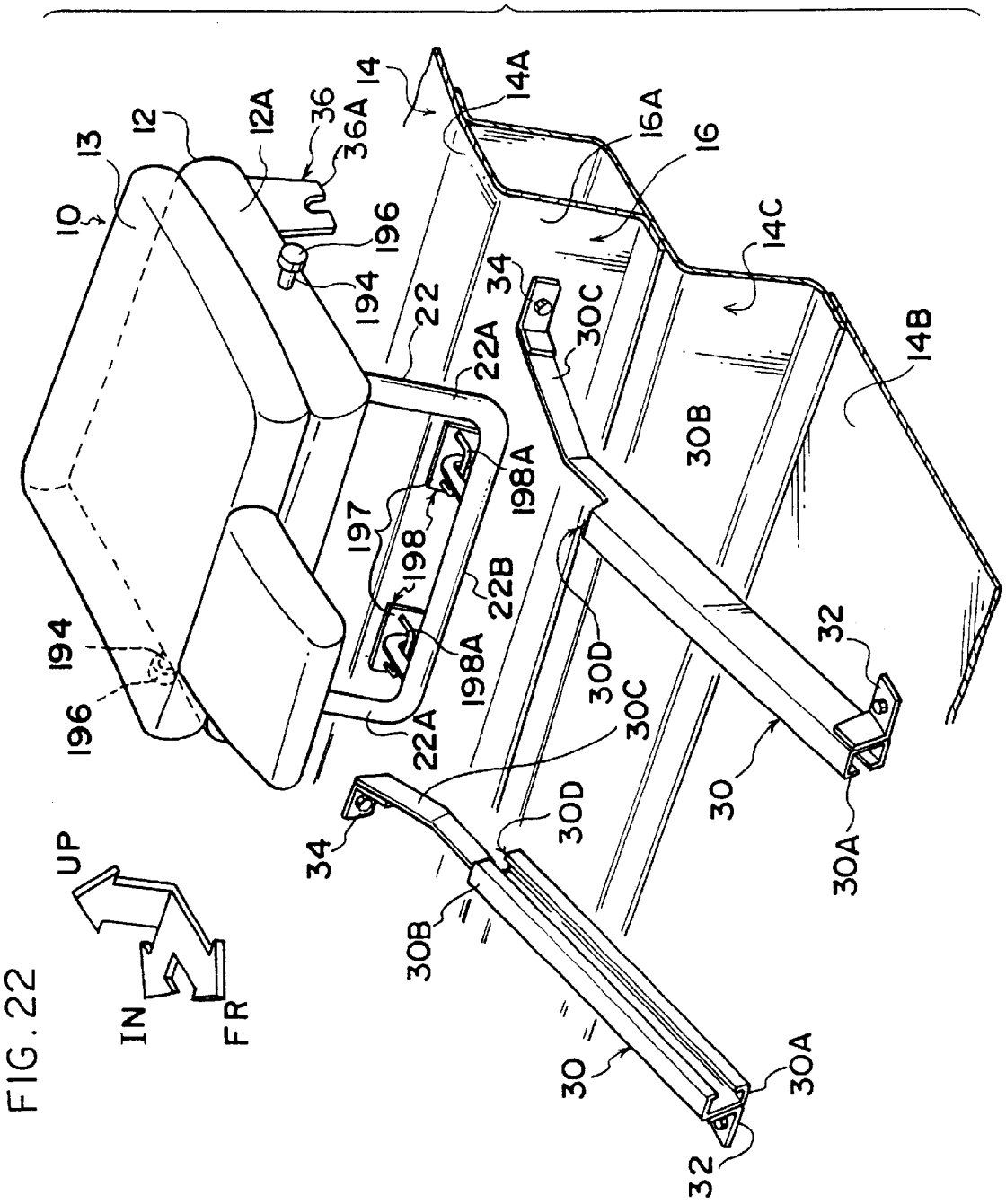
FIG. 22 is a perspective view showing a vehicle seat storing device in accordance with a fourth embodiment of the present invention seen diagonally from the front of the vehicle.

As shown in FIG. 22, a roller arm 194 is formed in an intermediate portion of each of both side wall portions 12A of a seat cushion 12 in the present fourth embodiment. An extending portion 30C extending backward in the vehicle is formed in a rear end portion 30B of each guide rail 30. An opening portion 30D is formed in a front end portion of the extending portion 30C. When a front leg 22 of a rear seat 10 is swung forward and the rear seat 10 is swung by a predetermined angle in the direction of storage, each of left-hand and right-hand guide rollers 196 as moving means each provided at an end tip of the roller arm 194 enters the interior of each guide rail 30 from the opening portion 30D.

A hook 197 is formed toward the seat exterior in the vicinity of each of both end portions of a lower portion 22B of the front leg 22. The hook 197 is formed as a seat supporting member projecting toward a rear lower side in an L-shape. Each hook 197 is detachably attached to a round bar portion 198A of each of a pair of left-hand and right-hand strikers 198 as seat supporting members provided in a longitudinal wall portion 16A of a step portion 16.

The operation of the seat storing device of the present fourth embodiment will next be explained.

In the present fourth embodiment, as shown in FIG. 22, when the rear seat 10 is moved forward in a state in which each of both lower end portions 36A of a rear leg 36 of the rear seat 10 is disengaged from an unillustrated striker, the front leg 22 of the rear seat 10 is swung forward around the round bar portion 198A of the striker 198. When the front leg 22 of the rear seat 10 is swung forward by a predetermined angle and reaches a predetermined position, the hook 197 provided in the front leg 22 is disengaged from the round bar portion 198A of each of the left-hand and right-hand strikers 198. A guide roller 196 provided in the roller arm 194 enters the interior of the guide rail 30 from the opening portion 30D and is moved downward along the guide rail 30. Further, as each of the left-hand and right-hand guide rollers 196 is moved downward along each guide rail 30, the front leg 22 of the rear seat 10 is swung backward around an upper end of this front leg 22. The rear seat 10 is moved onto the vehicle-front-side floor surface 14B. Accordingly, as shown in FIG. 24, the radius of rotation of the seat at the time of storing can be reduced in comparison with a construction for guiding the seat in a direction for storage with respect to a vehicle body by only swinging the front leg.

A vehicle seat storing device in accordance with a fifth embodiment of the present invention will next be explained in accordance with FIG. 23.

The same members as in the first embodiment are designated by the same reference numerals and their explanations are omitted here.

Figure 23:
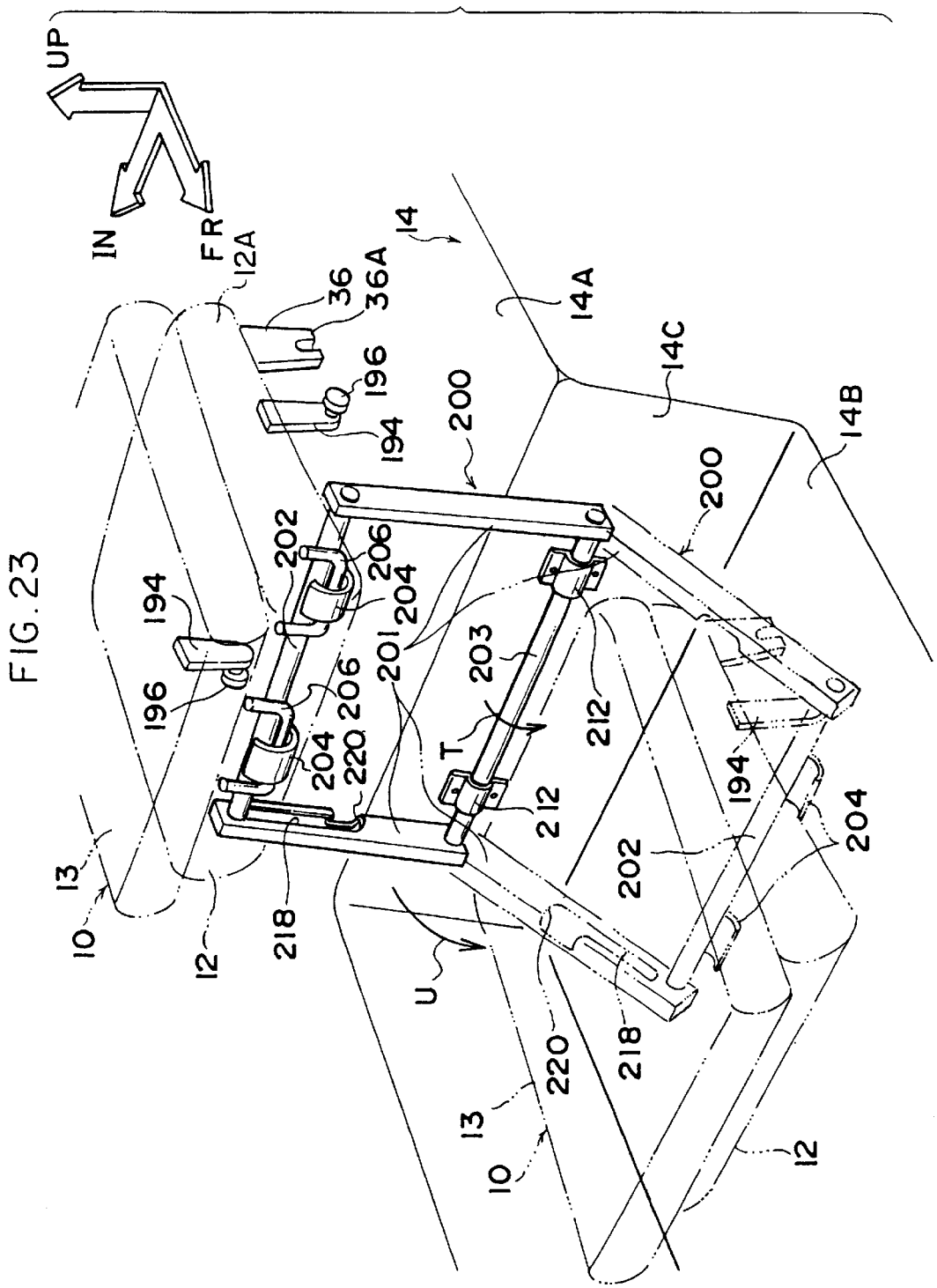
FIG. 23 is a perspective view showing a vehicle seat storing device in accordance with a fifth embodiment of the present invention seen diagonally from the front of the vehicle.

As shown in FIG. 23, in the present fifth embodiment, a roller arm 194 extends downward from an intermediate portion of each of both side wall portions 12A of a seat cushion 12. A guide roller 196 is supported on a seat outside surface of the roller arm 194 in its lower end portion.

A front leg 200 of the rear seat 10 is formed by a pair of left-hand and right-hand guide rails 201 and two shafts 202 and 203 for connecting both end portions of these guide rails 201 to each other. The shaft 203 is pivotally supported by a pair of left-hand and right-hand bearings 212 formed in an intermediate portion of a longitudinal floor wall portion 14C in its vertical direction. The shaft 202 can be swung to a position for ordinary use shown by a solid line in FIG. 23 and a position for storage shown by a two-dotted chain line.

A hook 204 having an arc shape in section is provided as a seat supporting member in the vicinity of each of both end portions of the shaft 202 of the front leg 200. A striker 206 as a seat supporting member having a U-shape is engaged with this hook 204. The striker 206 is provided in a front end lower portion of the seat cushion 12. A slit 218 is formed in each of the inside portions of the pair of left-hand and right-hand guide rails 201. The slit 218 reaches a central portion of each of the guide rails 201 from its end portion fixed to the shaft 202. An end portion of the slit 218 is connected to a notch 220 formed in the central portion of each guide rail 201 in its longitudinal direction.

Accordingly, when the front leg 200 of the rear seat 10 is swung forward (in the direction of an arrow T in FIG. 23) and the rear seat 10 is moved by a predetermined amount in the direction for storage, the engagement of the striker 206 and the hook 204 provided in the shaft 202 is released and the guide roller 196 enters the interior of each guide rail 201 from an opening portion 220. As a result, the front leg 200 is swung forward (in the direction of an arrow U in FIG. 23) and each hook 204 comes in contact with a vehicle-front-side floor surface 14B. Further, the guide roller 196 is moved downward along each guide rail 201 so that the rear seat 10 can be moved to the position for storage shown by a two-dotted chain line in FIG. 23.

The operation of the seat storing device of the present embodiment will next be explained.

In the present fifth embodiment, as shown in FIG. 23, when the rear seat 10 is moved in a forward direction in a state in which each of both lower end portions 36A of a rear leg 36 of the rear seat 10 is disengaged from an unillustrated striker, the front leg 200 of the rear seat 10 is swung forward (in the direction of the arrow T in FIG. 23) around a shaft 203. When the front leg 200 of the rear seat 10 is swung forward by a predetermined angle and reaches a predetermined angle, the hook 204 provided in the shaft 202 is disengaged from the striker 206 of the rear seat 10 and the guide roller 196 provided in the roller arm 194 enters the interior of the guide rail 201 from the notch 220 and is moved downward along the slit 218. Further, as each of the left-hand and right-hand guide rollers 196 is moved downward along the slit 218 of each guide rail 201, the front leg 200 of the rear seat 10 is swung forward (in the direction of the arrow U in FIG. 23) around the shaft 203. The rear seat 10 is moved onto the vehicle-front-side floor surface 14B. Accordingly, as shown in FIG. 24, the radius of rotation of the seat when storing can be reduced in comparison with a construction for guiding the seat in a direction for storage with respect to a vehicle body by only swinging the front leg.

Further, in the present fifth embodiment, the guide rail 201 itself constituting the front leg 200 is swung. Therefore, in a state in which the rear seat 10 is held in a position for use, the guide rail is not exposed to a position at which the guide rail becomes a hindrance.

A vehicle seat storing device in accordance with a sixth embodiment of the present invention will next be explained in accordance with FIGS. 26 to 32B.

The same members as in the first embodiment are designated by the same reference numerals and their explanations are omitted here.

Figure 27:
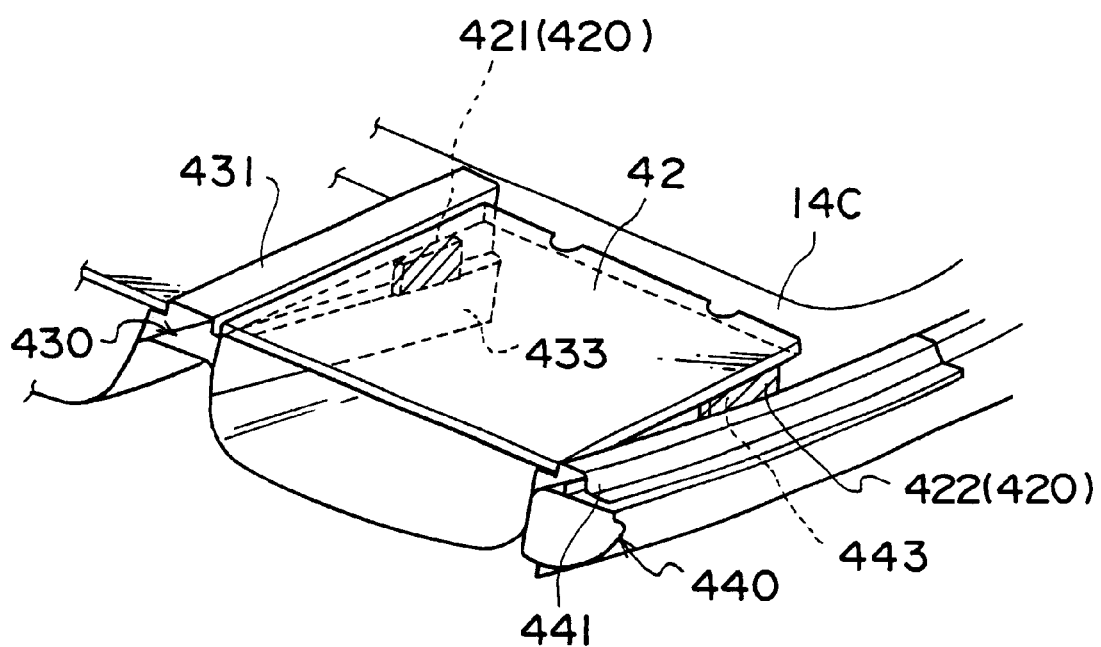
FIG. 27 is a perspective view showing an example of a floor board being used during seat storage in accordance with the sixth embodiment of the present invention.

A detachable floor board 42 is provided above a vehicle-front-side floor surface 14B. As shown in FIG. 27, the floor board 42 is supported by a garnish 431 provided on a tunnel 430 and a scuff plate 441 arranged on a locker 440.

Figure 26:
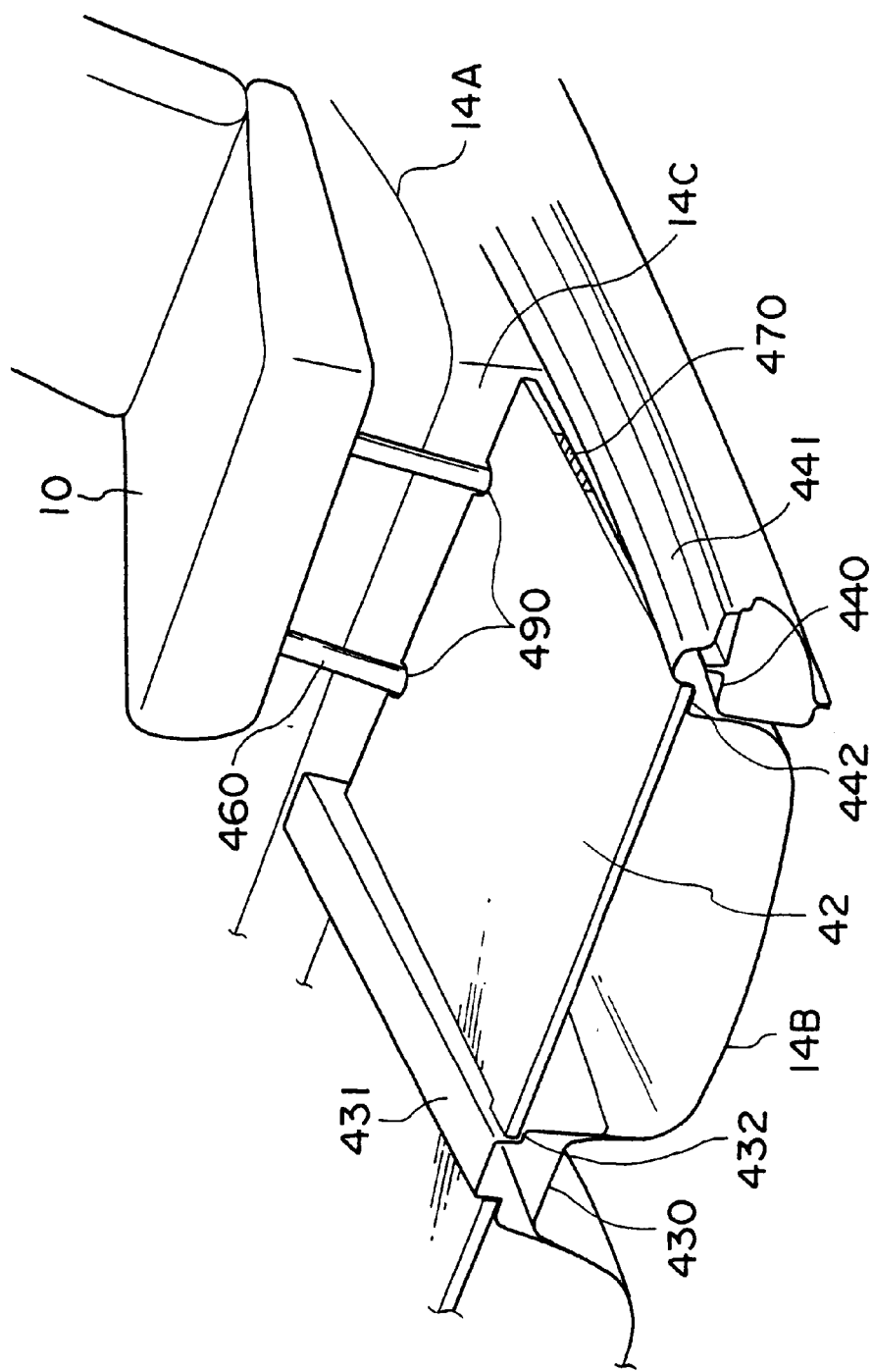
FIG. 26 is a perspective view showing the area surrounding a caution plate in a sixth embodiment of the present invention.

As shown in FIG. 26, the floor board 42 is disposed on step portions 432, 442 formed in the garnish 431 and the scuff plate 441. A rear end portion of the floor board 42 in a longitudinal direction of the vehicle has a notch 490 in an end portion interfering with a front leg 460 of a rear seat 10 and comes in contact with a longitudinal wall portion 14C.

For example, a caution plate 470 is formed by sticking a colored plate on a side surface of each of both end portions of the floor board 42 in a vehicle traverse direction.

The caution plate 470 may be provided only on an outer side of the floor board 42 in the vehicle width direction. Further, the caution plate 470 is not limited to the floor board 42, but may be provided in one of the garnish 431 and the scuff plate 441.

As shown in FIG. 27, a spacer 420 constructed from an inner spacer 421 and an outer spacer 422 is attached to each of both end portions of the floor board 42 on its rear surface in the vehicle traverse direction. The spacer 420 is pivotally attached to each of these end portions by a hinge 450 so as to perform a switching operation from a folded state shown in FIG. 5 to a raised state shown in FIG. 7.

As shown in FIG. 27, concave portions 433, 443 engaged with the respective spacers 420 are formed in the garnish 431 and the scuff plate 441. The inner spacer 421 and the garnish 431 can be engaged with each other. The outer spacer 422 and the scuff plate 441 can be engaged with each other.

Figure 29:
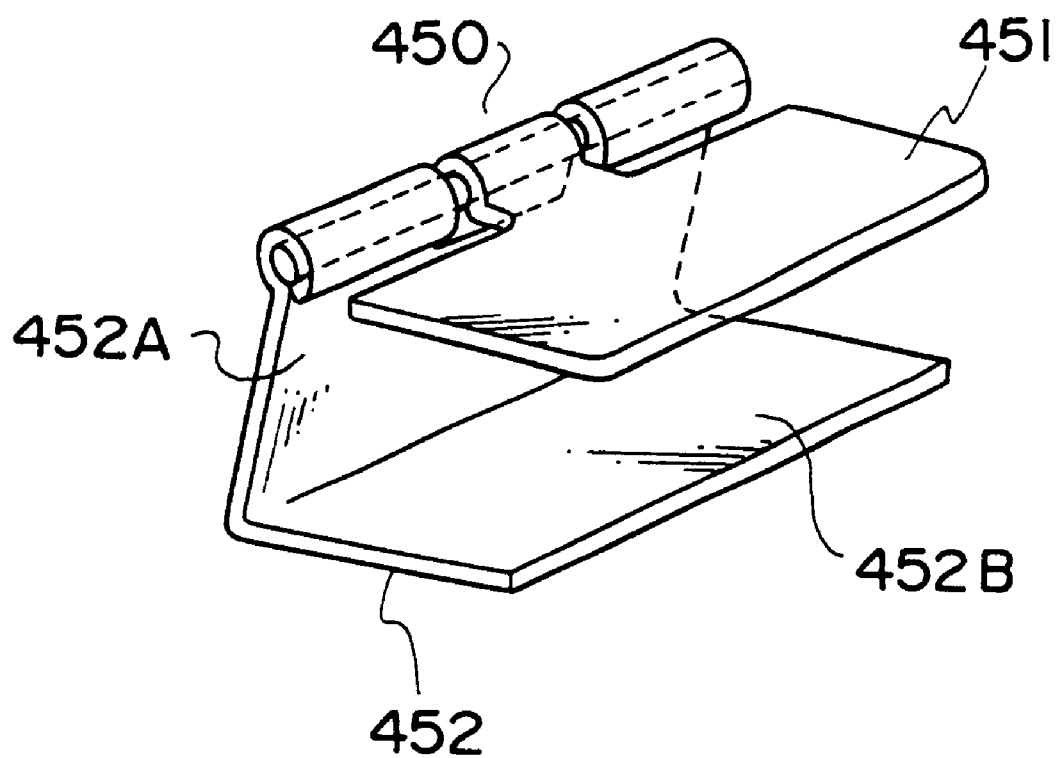
FIG. 29 is a detailed perspective view showing a hinge for pivotally mounting a spacer to the floor board in accordance with the sixth embodiment of the present invention.
Figure 30A:
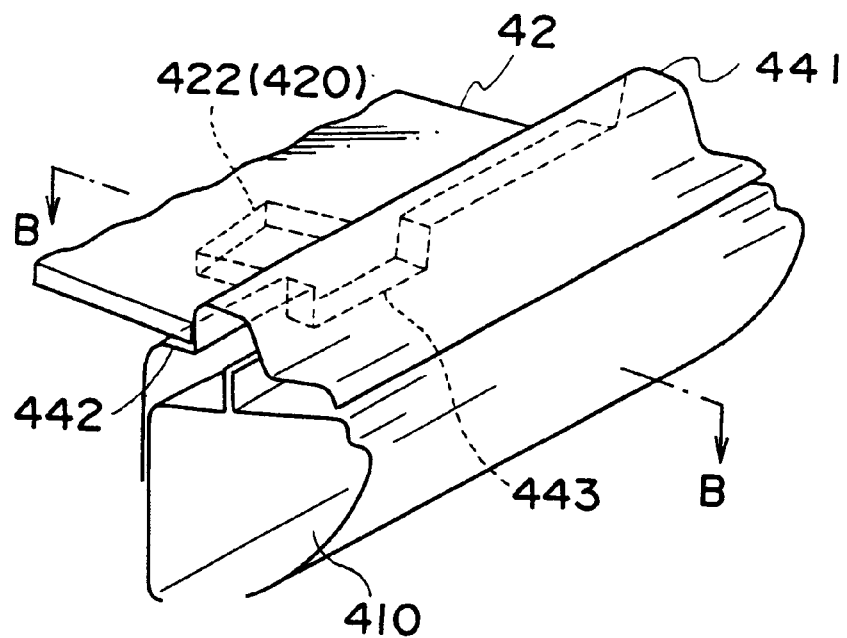
FIG. 30A is a perspective view showing the spacer when a seat in accordance with the sixth embodiment of the present invention is located in a position for use.
Figure 30B:
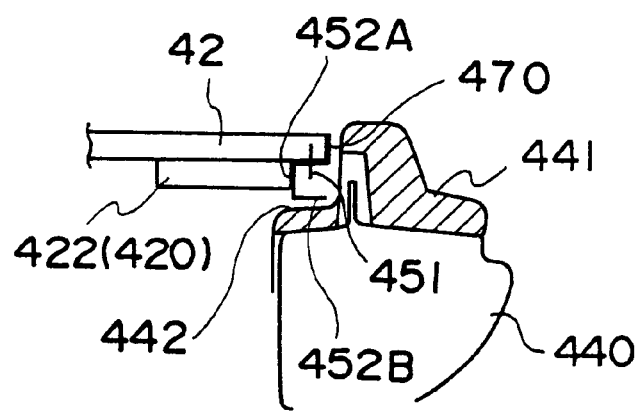
FIG. 30B is a cross-sectional view showing the spacer when the seat in accordance with the sixth embodiment of the present invention is located in the position for use.

As shown in FIG. 29, the hinge 450 is formed by a hinge upper 451 and a hinge lower 452 and is approximately formed in a U-shape since the hinge lower 452 is approximately formed in an L-shape formed by a first surface 452A and a second surface 452B. As shown in FIG. 30B, the hinge upper 451 is fixed to the floor board 42 and the first surface 452A of the hinge lower 452 pivotally mounted to the hinge upper 451 is fixed to the spacer 420.

When the spacer 420 is raised, the first surface 452A of the hinge lower 452 is overlapped with the hinge upper 451 and the second surface 452B covers a side surface of the floor board 42. In this case, positions of the spacer 420 and the caution plate 470 correspond to each other such that the caution plate 470 is covered with the second surface 452B.

Figure 25:
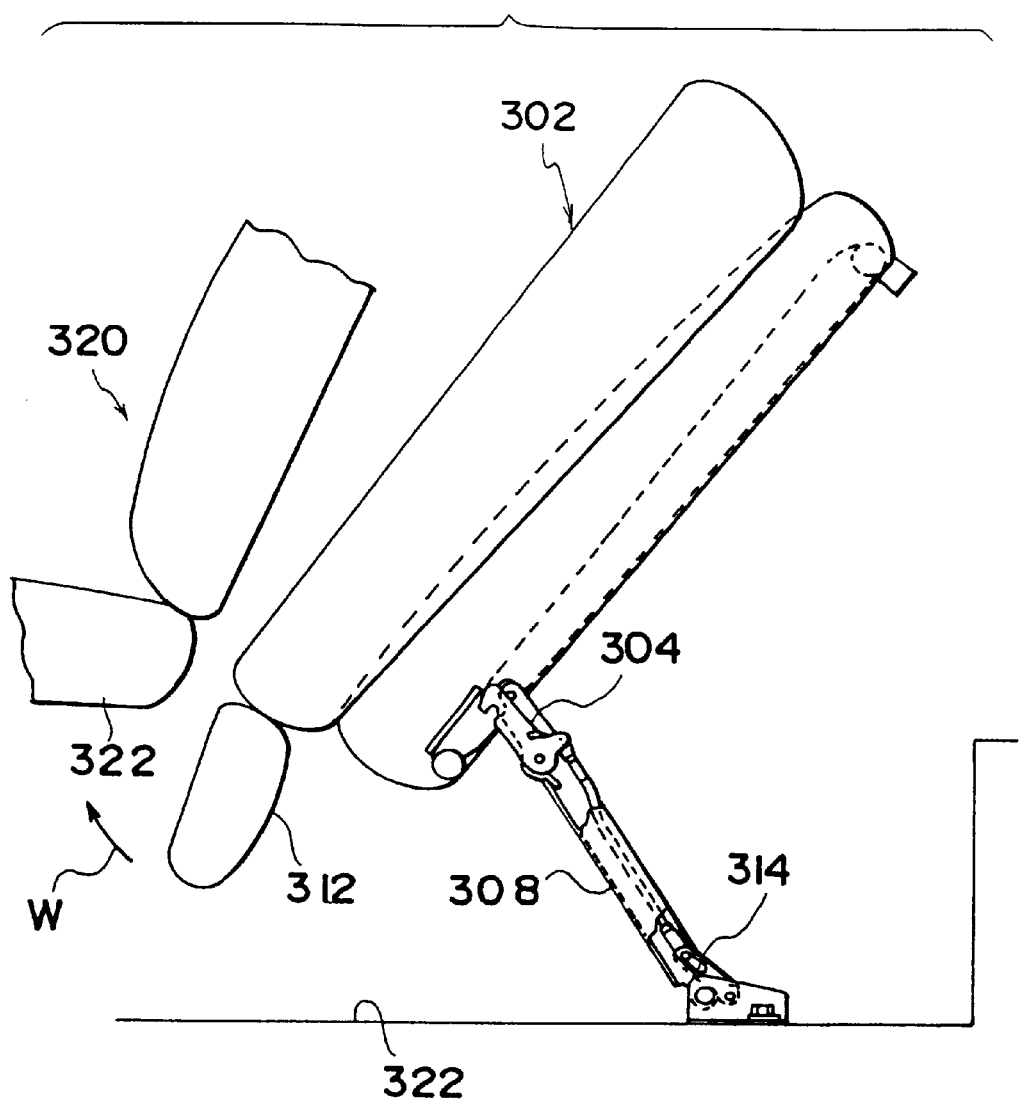
FIG. 25 is a schematic side view showing an intermediate state during storage of the a vehicle seat storing device in accordance with a conventional embodiment.

Similar to FIGS. 24 and 25 showing conventional examples, a front leg 460 of the rear seat is formed by a first link 461 and a second link 462. A hook 412 is provided in a connecting portion 463 for connecting the first link 461 and the second link 462 to each other.

The hook 412 is engaged with a striker 411. Similar to FIG. 1 showing the first embodiment, a rear leg 36 of the rear seat is engaged with a floor surface 72 in a rear portion of the vehicle by a striker 38.

Further, a projection 480 is formed in the first link 461 in a position corresponding to a height of the floor board 42 and is projected forward in the longitudinal direction of the vehicle. For example, the projection 480 is formed in a shape capable of interfering with the floor board 42 when the front leg 460 of the rear seat is located in a position shown by a broken line in FIG. 28B, i.e., forward from a position shown by a solid line in FIG. 28B.

The operation of the seat storing device of the present sixth embodiment will next be explained.

In the present sixth embodiment, when the rear seat is stored, a lock 440 is released by rotating the first link 461 in a state in which a lower end portion 36A of the rear leg 36 of the rear seat 10 is disengaged from the striker 38 (see FIG. 1). The rear seat 10 is stored on the vehicle-front-side floor surface 14B by swinging each of the first link 461 and the second link 462 as the storing operation of the rear seat 10 is performed.

The stored rear seat 10 is covered with the floor board 42. As shown in FIG. 27, the inner spacer 421 is engaged with a concave portion 433 of the garnish 431 and the outer spacer 422 is engaged with a concave portion 443 of the scuff plate 441.

Therefore, the floor board 42 is inclined upward from a forward direction of the vehicle to its backward direction and a continuous floor is formed by the floor board 42 and a vehicle-rear-side floor surface 14A.

Figure 28A:
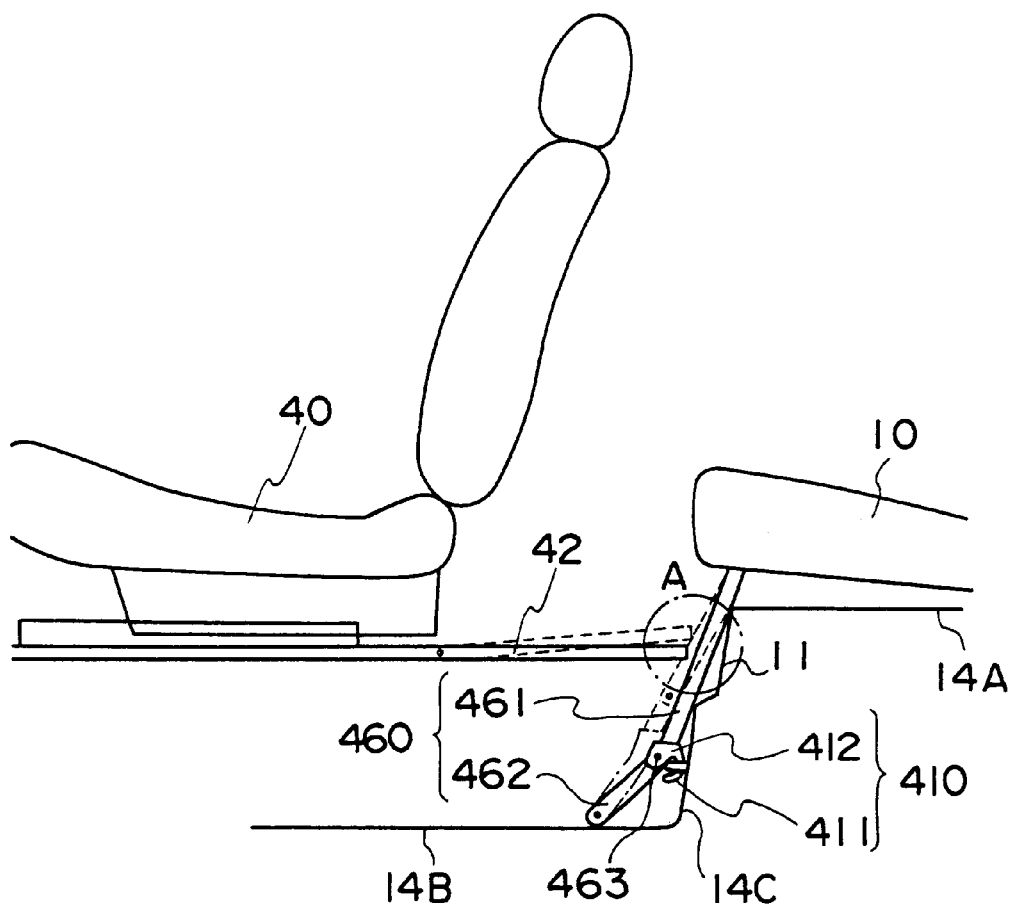
FIG. 28A is a side view showing an example of an interference member in use in accordance with the sixth embodiment of the present invention.

When the rear seat 10 is returned from its position for storage to a position for use on the vehicle-rear-side floor surface 14A, the hook 412 and the striker 411 are engaged with each other and the front leg 460 of the rear seat is fixed to the vertical wall surface 14C as shown by a solid line in FIG. 28A when the first link 461 and the second link 462 are respectively swung.

As shown in FIG. 5, the spacer 420 is folded and the floor board 42 is placed on the step portions 432 and 442.

In this case, if the striker 411 and the hook 412 are not engaged with each other, the hook 412 interferes with the striker 411 and a lock 410 is pushed out forward. Therefore, as shown by a one-dotted chain line in FIG. 28B, the placed floor board 42 interferes with the projection 480.

Figure 28B:
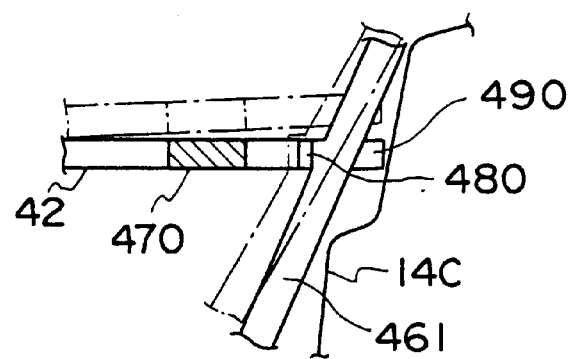
FIG. 28B is a detailed view showing the example of the interference member in use in accordance with the sixth embodiment of the present invention.

Accordingly, the floor board 42 is not placed in a position shown by a solid line in FIG. 28B and remains pushed out in an upwards direction.

Figure 31A:
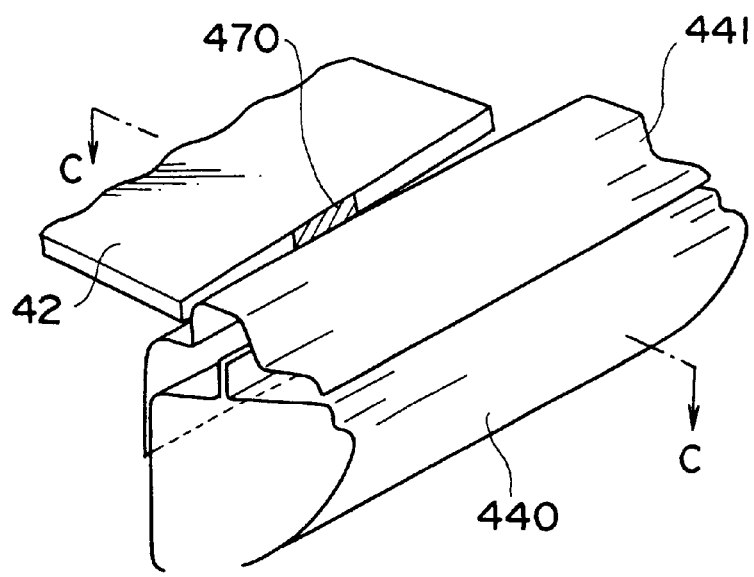
FIG. 31A is a perspective view showing the caution plate when an engaging means in accordance with the sixth embodiment of the present invention is in a disengaged state.
Figure 31B:
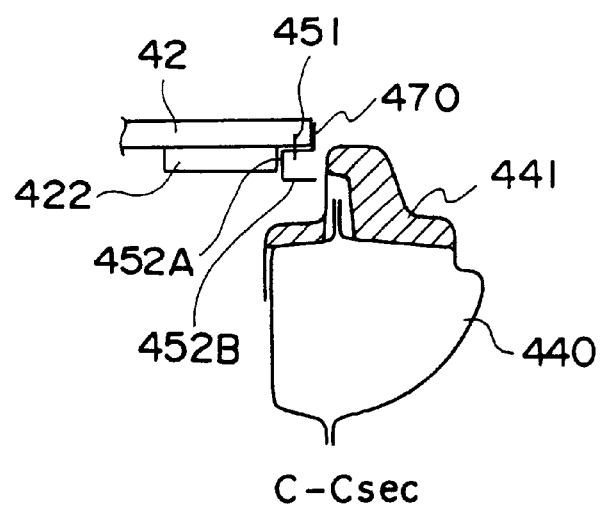
FIG. 31B is a cross-sectional view showing the caution plate when the engaging means in accordance with the sixth embodiment of the present invention is in the disengaged state.
Figure 32A:
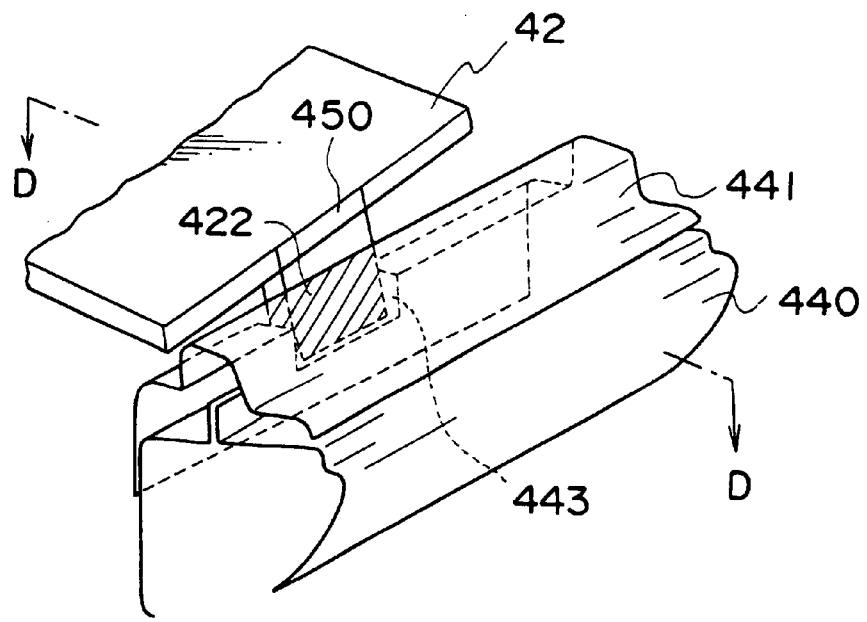
FIG. 32A is a perspective view showing the spacer when the seat in accordance with the sixth embodiment of the present invention is located in a position for storage.
Figure 32B:
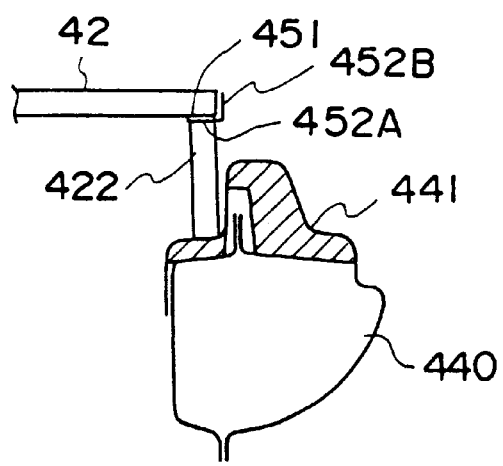
FIG. 32B is a cross-sectional view showing the spacer when the seat in accordance with the sixth embodiment of the present invention is located in the position for storage.

Therefore, as shown in FIG. 31, the floor board 42 is pushed up upward by the projection 480 and the caution plate 470 provided on a side surface of the floor board 42 is located upward from the scuff plate 441 so that the caution plate 470 is visible.

As mentioned above, when the striker 411 and the hook 412 are not engaged with each other, the floor board 42 cannot be set to its position for use so that the disengagement of the striker 411 and the hook 412 can be easily confirmed.

Further, the disengagement of the striker 411 and the hook 412 can be easily confirmed by looking at the caution plate 470.

The seat storing device of the present invention is not limited to the above embodiments. For example, an interference member may be provided on the floor board instead of a leg, and the stored seat is not limited to the rear seat.

With reference to FIGS. 33 to 38, a description of a vehicle body floor structure according to a seventh embodiment of the present invention will be given hereinafter.

Figure 33:
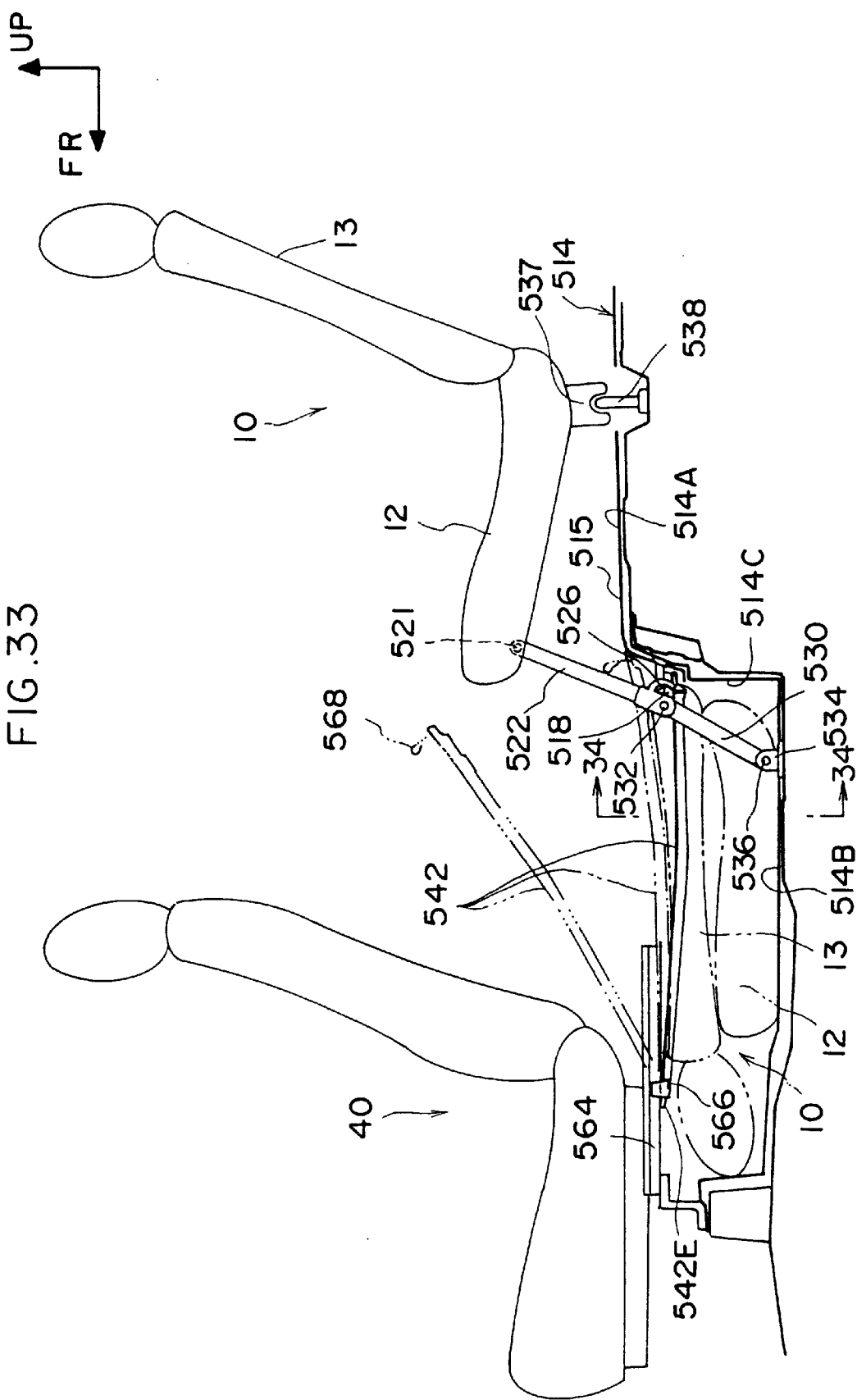
FIG. 33 is a schematic side view illustrating a vehicle body floor structure according to a seventh embodiment of the present invention.

As shown in FIG. 33, in the rear seat 10 of the present seventh embodiment, the seat back 13 is mounted to the rear end portion of the seat cushion 12 so as to be rotatable. The seat back 13 can rotate between a state in which the seat back 13 is used state of use as shown by the solid line in FIG. 33, and a state in which the seat back 13 is rotated onto the seat cushion 12 toward the vehicle front (folded-forward state). Further, in a state of an ordinary use, the seat cushion 12 is disposed on a vehicle-rear-side floor surface 514A which is the portion higher by one step of a stepped floor 514. Further, a vertical wall portion 514C, which extends in a substantially vertical direction of the vehicle, is formed between the vehicle-rear-side floor surface 514A and the vehicle-front-side floor surface 514B. Strikers 518 serving as engaging means are fixed to the upper portion of this vertical wall portion 514. Numeral 515 indicates a floor carpet.

Left- and right-side first links 522, which serve as storing means and which form front leg upper portions of the rear seat 10, are rotatably supported by shafts 521 at the front end lower portion of the rear seat 10. Hooks 526 serving as engaging means are provided at the lower end portions of the first links 522. The hooks 526 are attachable to and detachable from the strikers 518.

The upper end portions of second links 530, which serve as storing means and which form the front leg lower portions of the rear seat 10, are connected to the lower end portions of the first links 522 so as to be able to rotate around shafts 532 which serve as connecting portions. The first links 522 can rotate in the longitudinal direction of the vehicle around the shafts 532 with respect to the second links 530. Left-side and right-side brackets 534 are fixed the floor surface 514B at positions spaced apart from the vertical wall portion 514C toward the vehicle front. The lower end portions of the second links 530 are supported at these brackets 534 so as to be rotatable around shafts 536.

Collapsable left-side and right-side rear legs 537 are disposed at the rear seat 10. An unillustrated well-known interlock mechanism is disposed at the rear legs 537. The rear legs 537 are attachable to and detachable from left and right-side strikers 538, which are disposed on the vehicle rear floor surface 514A, through the interlock mechanism.

Accordingly, in a state in which the rear legs 537 of the rear seat 10 are detached from the strikers 538, when the rear portion of the rear seat 10 is slightly lifted and the entire rear seat 10 is rotated toward the vehicle front, the first links 522 of the rear seat 10 rotate around the shafts 532 toward the vehicle front. When the first links 522 of the rear seat 10 rotate by a predetermined angle toward the vehicle front, the hooks 526 unhook from the strikers 518, and the second links 530 thereby rotate around the shafts 536 toward the vehicle front. Further, since the second links 530 rotate around the shafts 536 toward the vehicle front and the first links 522 of the rear seat 10 can rotate around the shafts 532 in the vehicle longitudinal direction, the rear seat 10 is set in a stored state which is shown by the double-dashed line in FIG. 33, in which the rear seat 10 has been moved onto the vehicle-front-side floor surface 514B.

In the present seventh embodiment, floor boards 542, each of which extends from beneath the rear of a front seat 40 toward the vehicle rear, are disposed above the rear seat when the rear seat 10 is in a stored state.

Figure 36:
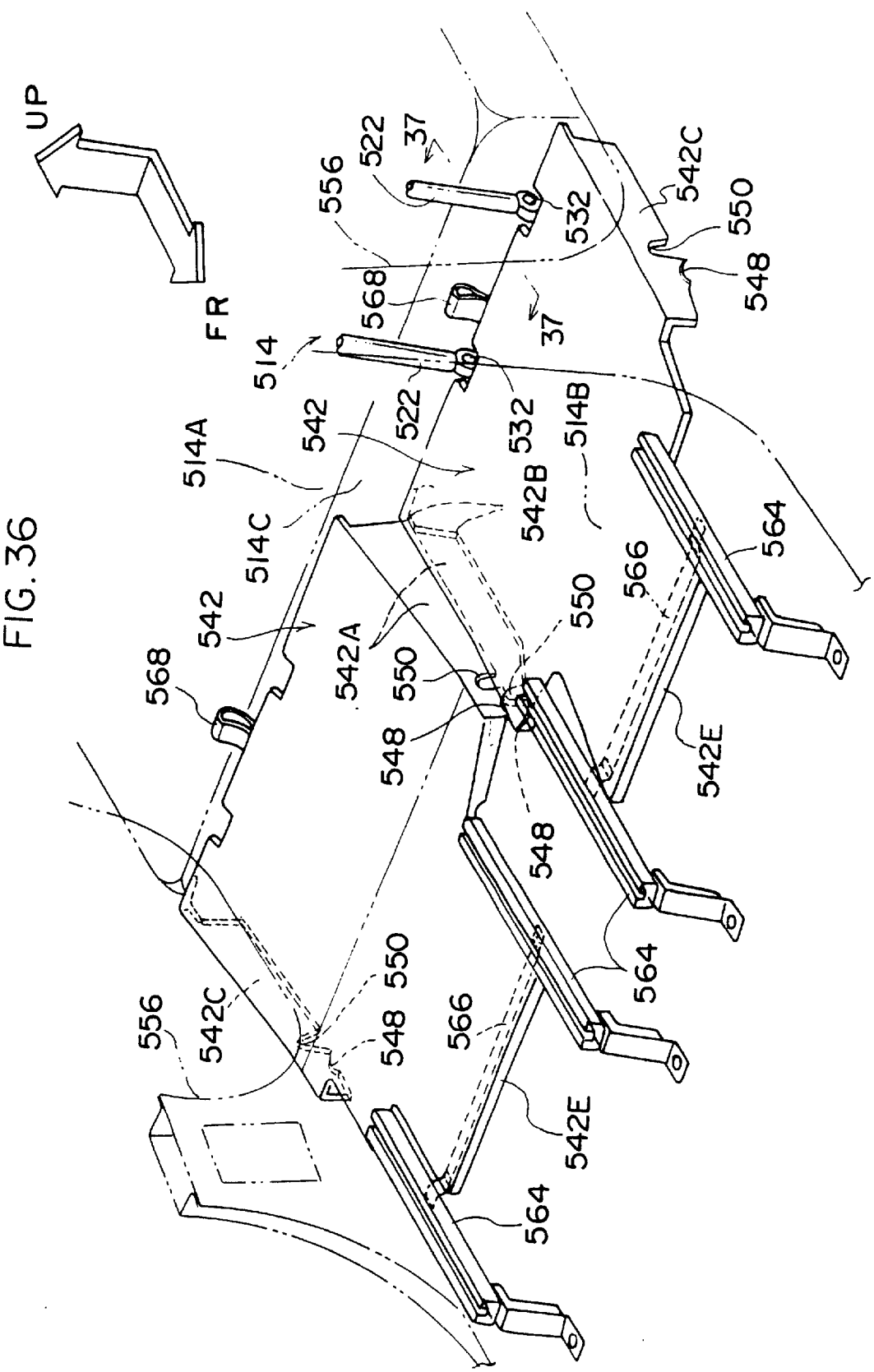
FIG. 36 is a perspective view illustrating a floor board of the vehicle body floor structure according the seventh aspect of the present invention when viewed from a front side of a vehicle at a diagonal.

As shown in FIG. 36, two floor boards 542 are provided so as to correspond to the left-side and right-side rear seats, respectively. Each of the floor boards 542 covers a rear seat storing space which is formed on the vehicle-front-side floor surface 514B of the floor 514 which has a step.

Figure 34:
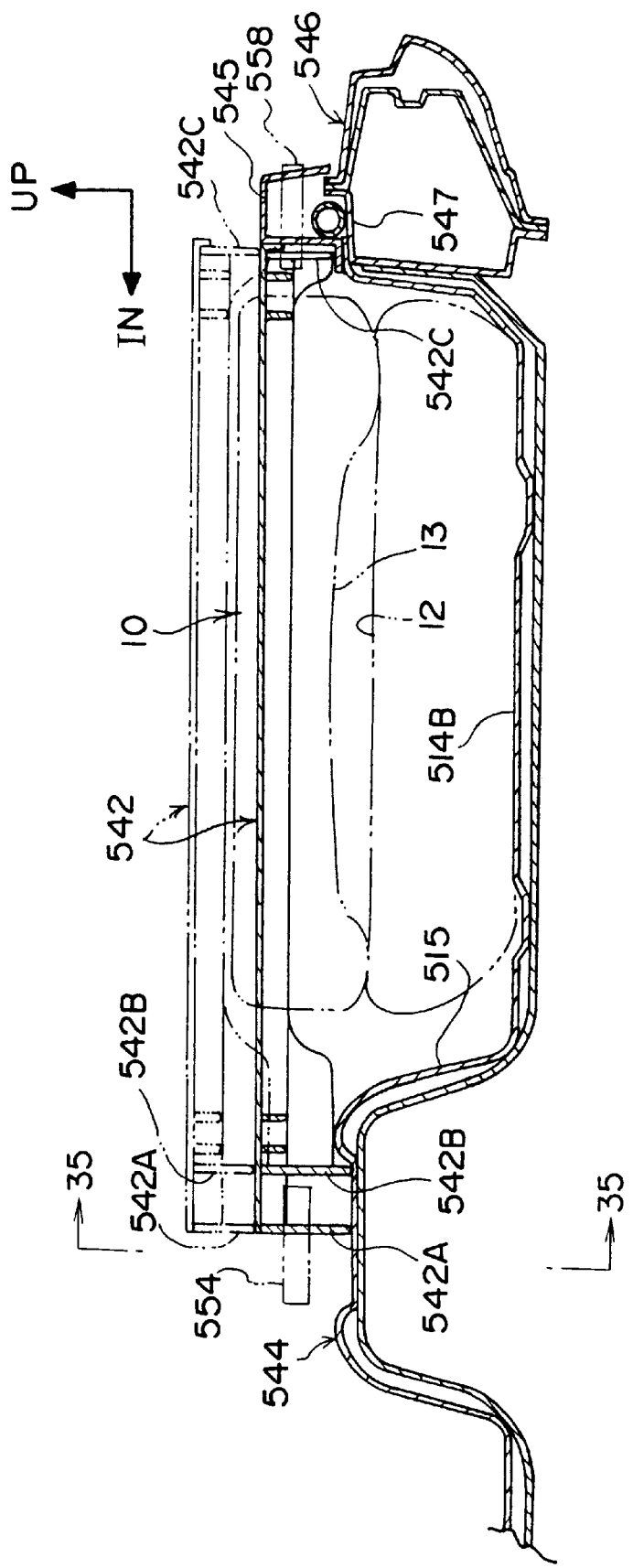
FIG. 34 is an enlarged cross sectional view taken along line 34—34 of FIG. 33.

As shown in FIG. 34, leg portions 542A, 542B, and 542C, which extend in the longitudinal direction of the vehicle, are formed at the undersides of the vehicle transverse direction the surface end portions of the floor board 542. When the floor board 542 is set in its ordinary placement position which is shown by the solid line (the lower position in the figure), the leg portions 542A and 542B and the leg portion 542C abut a tunnel portion 544 and a sill 546 which are vehicle structural members which are provided substantially parallel to each other and extend along the vehicle longitudinal direction. Moreover, reference numeral 545 denotes a scuff plate, and reference numeral 547 denotes a sill inner panel.

As shown in FIG. 36, a concave portion 548 serving as an adjusting mechanism is formed at the front portion of the vehicle transverse direction outer side leg portion 542C in a semi-circular shape from the lower side of the leg portion 542C. A concave portion 550 serving as an adjusting mechanism is formed in a semi-circular shape at the rear side of the concave portion 548 such that the rear end portion thereof is cut deeper than the concave portion 548. Further, in the same manner as described above, the concave portion 548 and the concave portion 550 are also formed at the front portion of the vehicle transverse direction inner side leg portion 542A.

Figure 38:
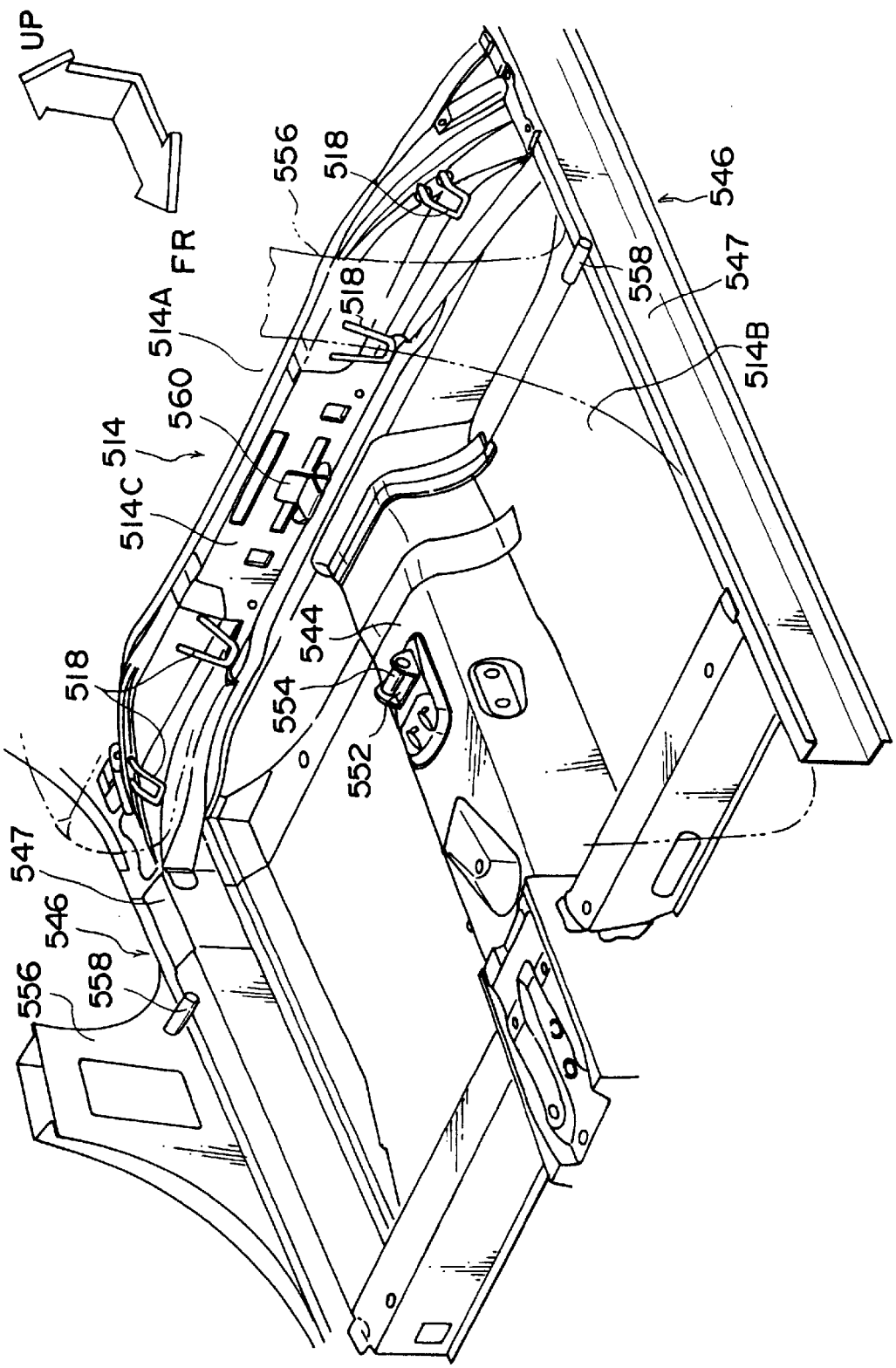
FIG. 38 is a perspective view illustrating a main portion of the vehicle body floor structure according to the seventh embodiment of the present invention when viewed from the front side of the vehicle at a diagonal.

As shown in FIG. 38, a supporting bar 554, which serves as an adjusting mechanism and extends in the vehicle widthwise direction, is disposed via a bracket 552 on the tunnel portion 544. Supporting pins 558 serving as adjusting members protrude inwardly in the vehicle widthwise direction from the lower portions of center pillars 556 which are provided above the sills 546. Further, a supporting bracket 560 serving as an adjusting member is disposed at the vehicle rear side of the supporting bar 554. This supporting bracket 560 is fixed to the vertical wall portion 514C of the floor 514.

Figure 35:
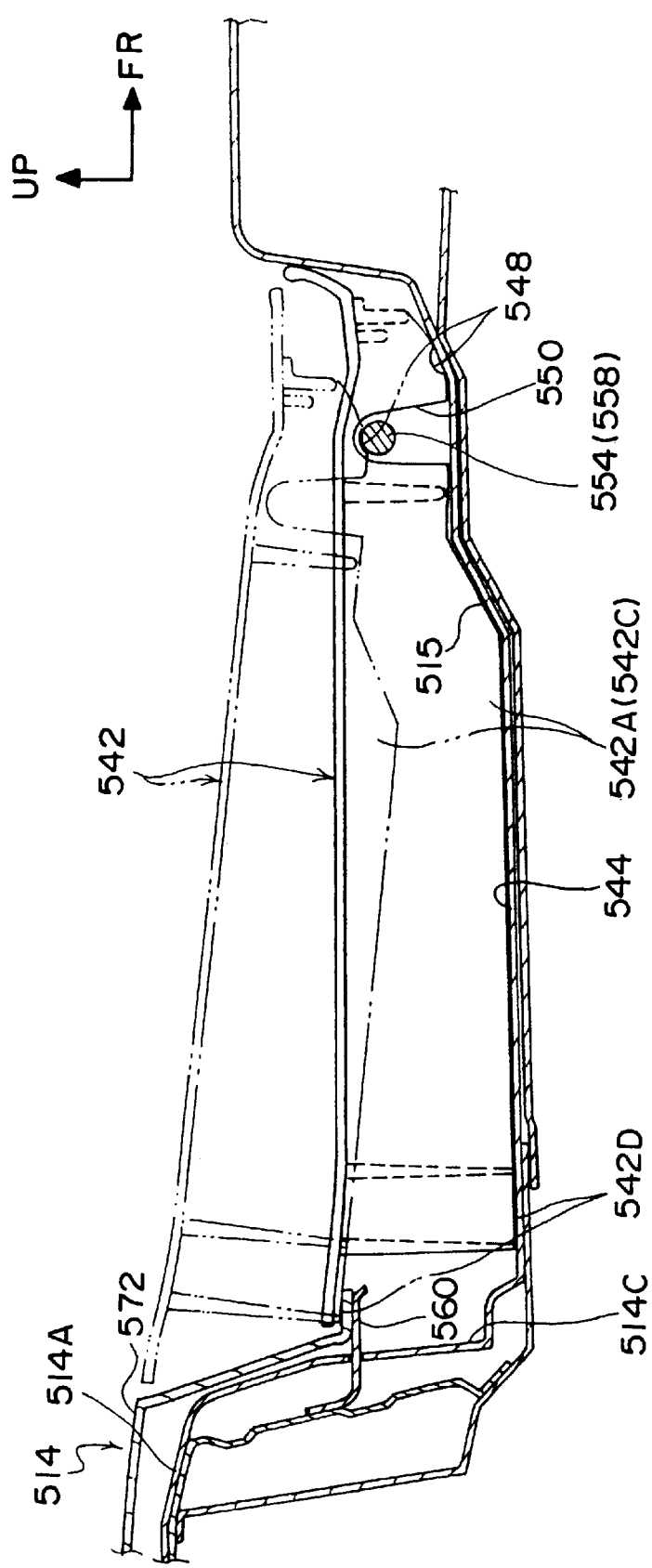
FIG. 35 is an enlarged cross sectional view taken along line 35—35 of FIG. 34.

As shown by a solid line in FIG. 35, when the concave portions 550, which are cut deeper than the concave portions 548 and are formed at the leg portions 542A and 542C of the floor board 542, engage with the supporting bar 554 or the supporting pins 558, the floor board 542 is set in its ordinary placement position which is shown by a solid line in FIG. 35. On the other hand, as shown by a double-dashed line in FIG. 35, when the shallower concave portions 548, which are formed at the leg portions 542A and 542C of the floor board 542, engage with the supporting bar 554 or the supporting pins 558 and a rear end portion 542D of the leg portion 542A of the floor board 542 engages with the supporting bracket 560, the floor board 542 is set at the seat storing position (the upper position in this figure) which is shown by a double-dashed line in FIG. 35.

As shown by a solid line in FIG. 33, when the floor board 542 is located at the ordinary placement position, the shafts 532, which are the connecting portions between the second links 530 and the first links 522, are located above the floor board 542.

As shown in FIG. 36, a front end portion 542E of the floor board 542 is placed on a supporting bar 566 which spans between vehicle longitudinal direction substantially intermediate portions of front seat lower rails 564 provided parallel to each other. A strap 568 is attached to a rear end portion 542F of the floor board 542 at the vehicle widthwise direction central portion of the floor board 542.

Figure 37:
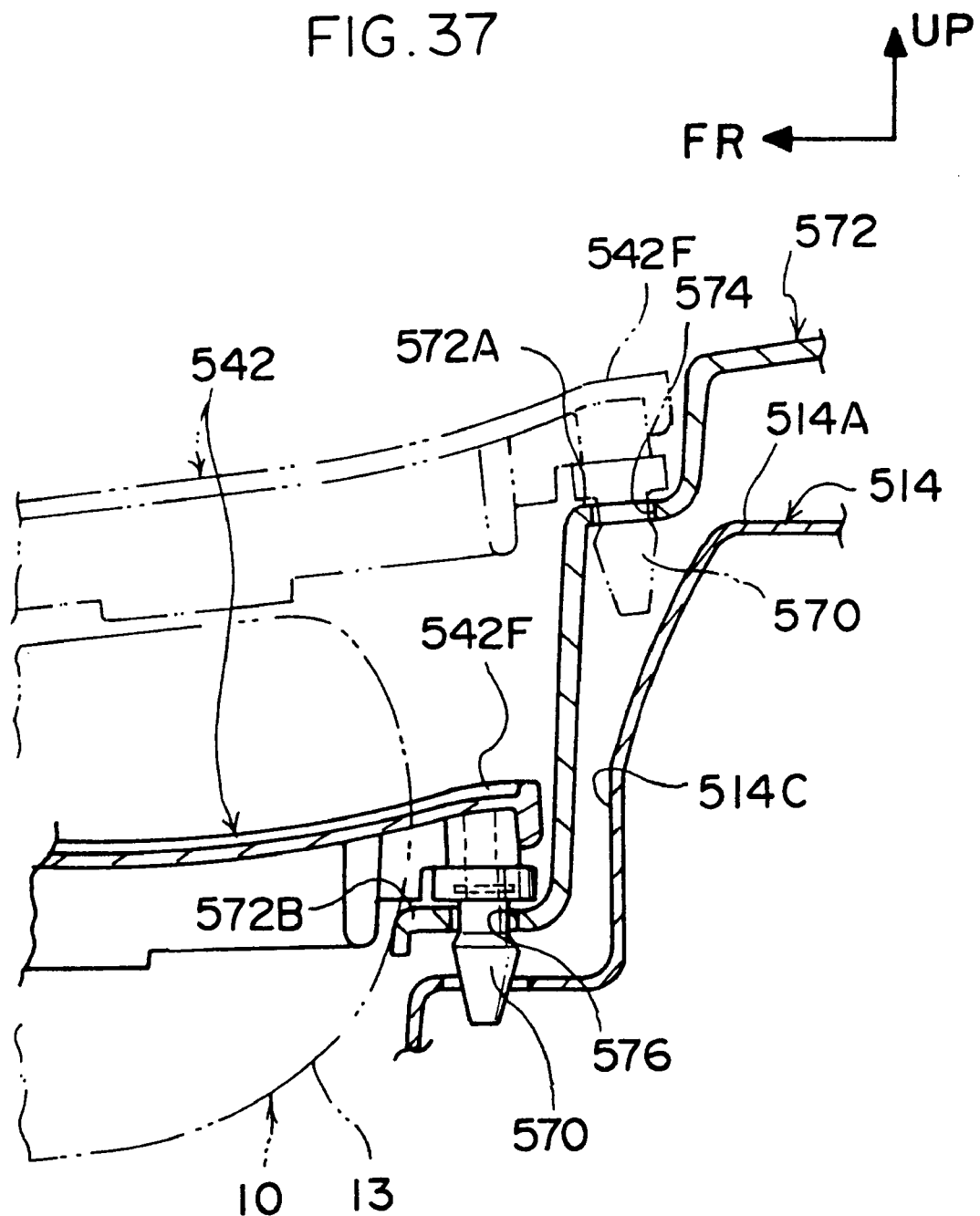
FIG. 37 is an enlarged cross sectional view taken along line 37—37 in FIG. 36.

As shown in FIG. 37, a positioning pin 570 protrudes downwardly from the rear end portion 542F of the floor board 542 at the lower surface thereof. This pin 570 is fitted into mounting holes 574 and 576 which are formed at an upper step portion 572A and a lower step portion 572B which are formed in a floor garnish 572 which covers the vehicle-rear-side floor surface 514A and the vertical wall portion 514C of the floor 514.

Operation of the seventh embodiment of the present invention will be described hereinafter.

In the seventh embodiment of the present invention, at an ordinary placement position where the rear seat 10 is not stored, each of the deep concave portions 550, which are formed at the leg portions 542A and 542C of the floor board 542, engages with the supporting bar 554 or the supporting pins 558. As shown by solid lines in FIG. 34, the leg portions 542A and 542B formed at the floor board 542 are placed at the tunnel portion 544, and the leg portion 542C which is formed at the floor board 542 is placed at the sill 546.

On the other hand, when each of the shallower concave portions 548, which are formed at the leg portions 542A and 542C of the floor board 542, engages with the supporting bar 554 or the supporting pin 558 and the rear end portion 542D of the leg portion 542A of the floor board 542 engages with the supporting bracket 560, the floor board 542 is located at the position which is shown by a double-dashed line in FIG. 35 and in which the rear seat can be stored.

In this way, in the vehicle floor structure according to the seventh embodiment of the present invention, the distance from the floor surface 514B to the floor board 542 can be adjusted. As a result, the height of the floor board 542 can be adjusted such that the floor surface can respond to various needs.

In the vehicle floor structure according to the seventh embodiment of the present invention, in the ordinary placement position where the rear seat is not stored, the leg portions 542A and 542B and the leg portion 542C of the floor board 542 are placed on the tunnel portion 544 and the sill 546 which are vehicle structural members. Thus, the floor board 542 can be held at the vehicle body with a simple structure. Further, at the position where the seat can be stored, the shallower concave portions 548, which are formed in the leg portion 542A and the leg portion 542C of the floor board 542, engage with the supporting bar 554 which is disposed on the tunnel portion 544 and the supporting pin 558 disposed at the center pillar 556 above the sill 546. Thus, a storing space portion can be formed between the tunnel portion 544 and the sill 546 and this storing space portion can be formed so as to be wide. Moreover, when the rear seat 10 is stored, since the rear seat 10 is stored beneath the floor board 542, a space for luggage can be formed above the floor board 542.

In the vehicle floor structure according to the seventh embodiment of the present invention, as shown by a triple dashed line in FIG. 33, while the strap 568 is held, the floor board 542 is pulled up. In a state in which the seat back 13 is collapsed toward the vehicle front onto the seat cushion 12, when the lower end portions 537A of the rear legs 537 are made to separate from the strikers 538 and the rear portion of the rear seat 10 is lifted a little and the entire body of the rear seat 10 is rotated toward the vehicle front, the first links 522 rotate toward the front of the vehicle around the shafts 532. When the first links 522 of the rear seat 10 rotate a predetermined angle toward the vehicle front, the hooks 526 separate from the round bar portions 518B of the strikers 518, and the second links 530 rotate around the shafts 536 toward the vehicle front. Further, since the second links 530 rotate around the shafts 536 toward the vehicle front and the first links 522 of the rear seat 10 can rotate around the shafts 532 in the longitudinal direction of the vehicle, the rear seat 10 is set in the stored state which is shown by a double dashed line in FIG. 33. Namely, the rear seat 10 moves onto the vehicle-front-side floor surface 514B. As a result, it is possible to reliably and easily store the rear seat 10 in the storage space.

In the seventh embodiment of the present invention, a structure in which the rear seat 10 is stored by pulling up the floor board 542 has been described. However, the present invention is not limited to this structure, and instead, a structure in which the floor board 542 is temporarily removed, and then, the rear seat 10 is stored in the storage space is also preferable. For example, the floor board 542 can be formed in a shape such that it can be engaged with the seat back of the front seat 40. Thus, during the operation for storing the seat, the detached floor board 542 may be engaged with the seat back of the front seat 40.

In the seventh embodiment of the present invention, when the rear seat 10 is guided from the position for use shown by a solid line in FIG. 33 to the position for storage shown by a double-dashed line in FIG. 33, the rear seat 10 is moved between the position for use and the position for storage due to the rotation around the first links 522 and the rotation around the second links 530. As a result, the radius of rotation of the seat at the time of storing the seat can be minimized.

In the seventh embodiment of the present invention, when the floor board 542 is placed at its ordinary position, since the positions of the shafts 532, which are portions connecting the second links 530 and the first links 522, are located above the floor board 542, even when the first links 522 move toward the front of the vehicle as the rear seat 10 moves, the first links 522 and the floor board 542 do not interfere with each other, and the floor board 542 can be prevented from being damaged.

Figure 39:
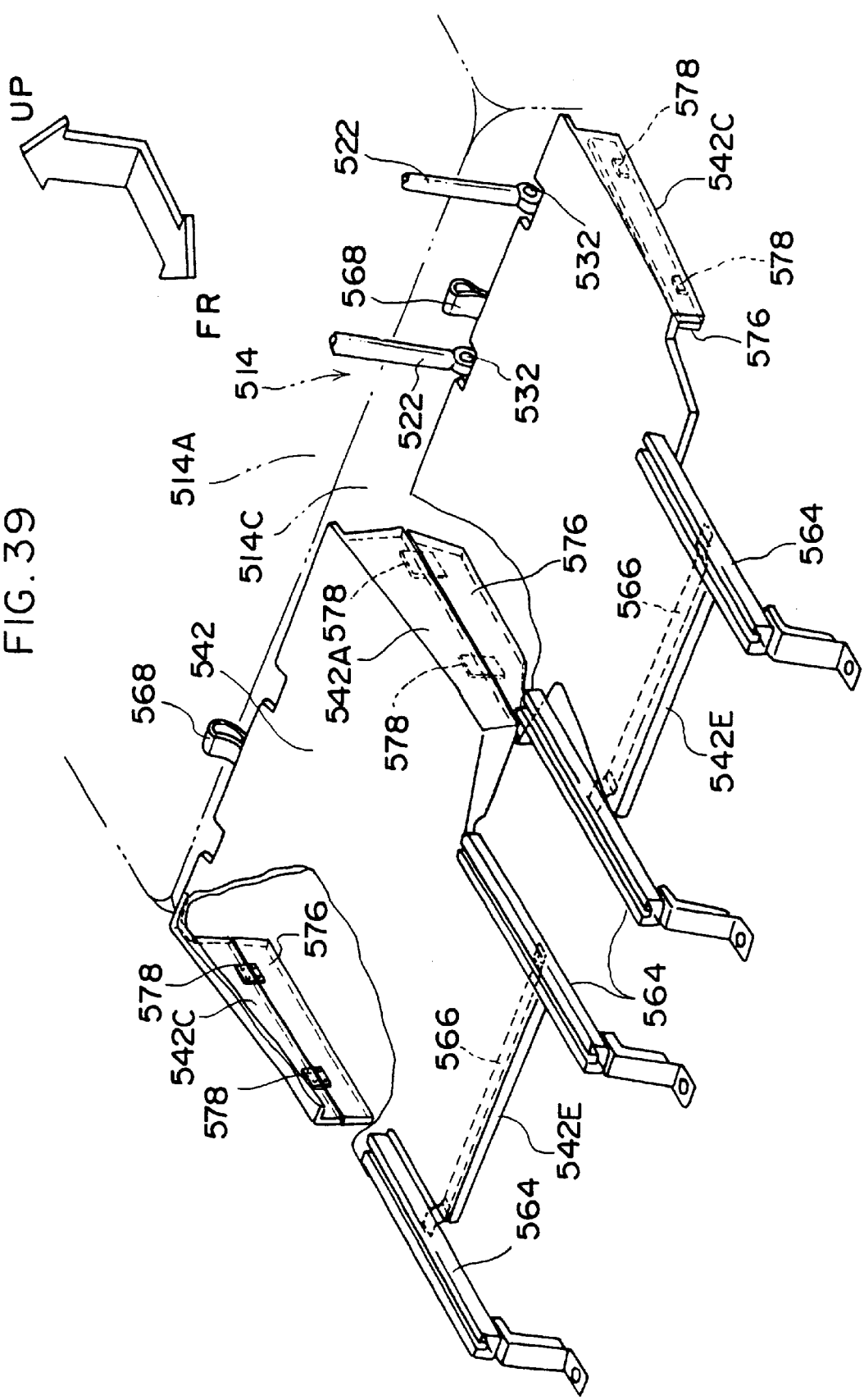
FIG. 39 is a perspective view illustrating a floor board of the vehicle body floor structure according to another example of the seventh embodiment of the present invention when viewed from the front side of the vehicle at a diagonal.
Figure 40:
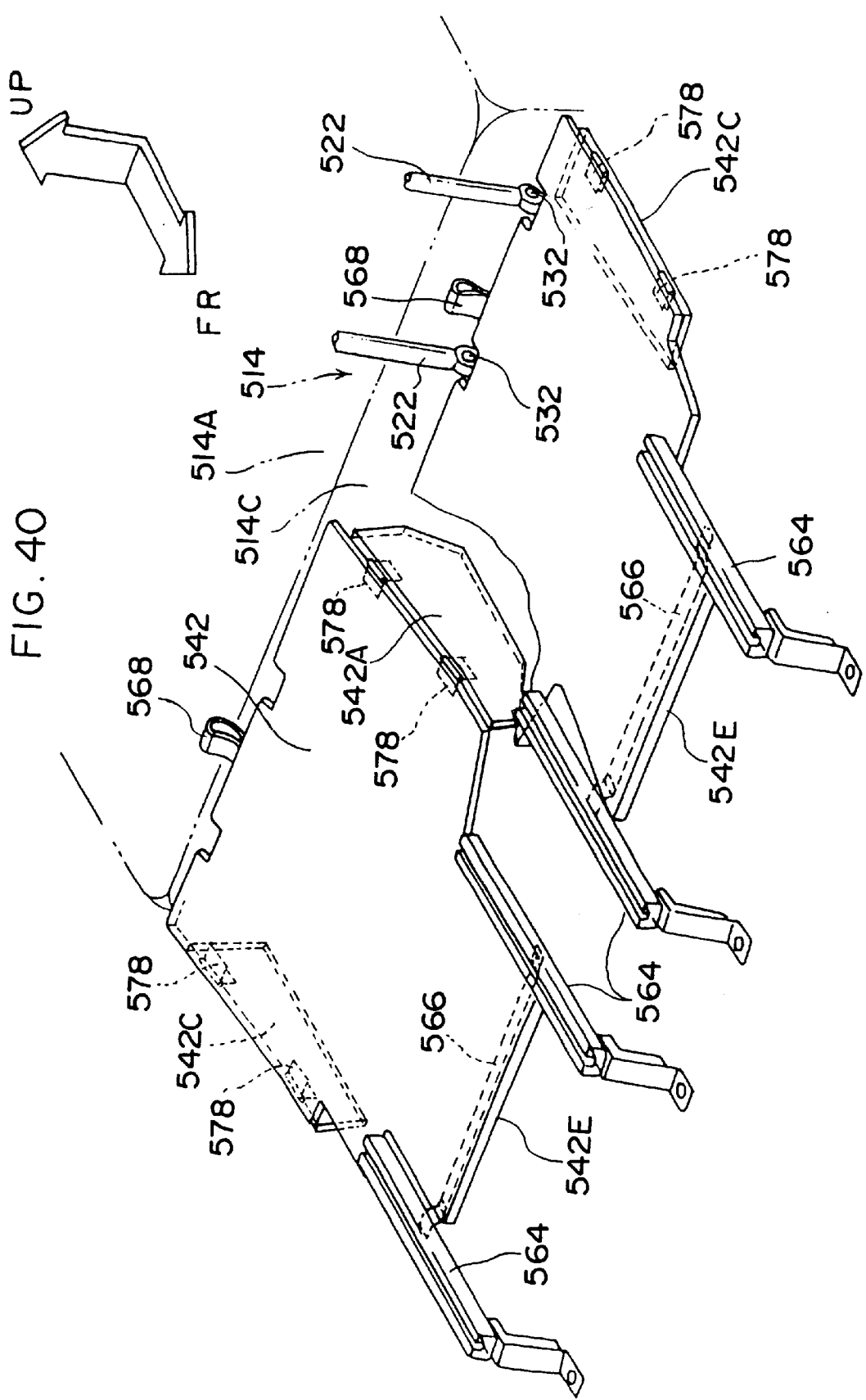
FIG. 40 is a perspective view illustrating a floor board of the vehicle body floor structure according to yet another example of the seventh embodiment of the present invention when viewed from the front side of the vehicle at the diagonal.
Figure 41:
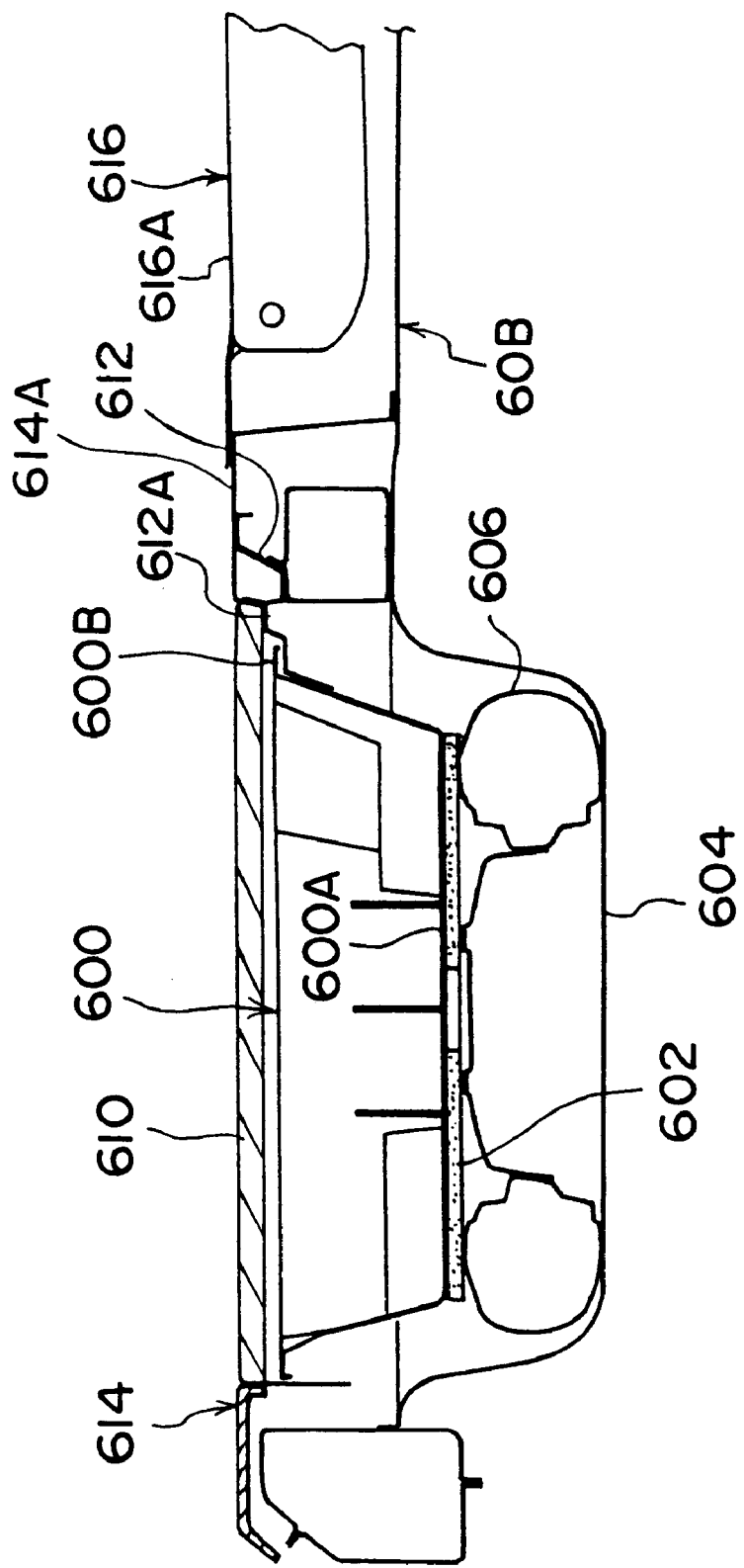
FIG. 41 is a schematic side cross sectional view illustrating a conventional vehicle body floor structure.

In the seventh embodiment of the present invention, as an adjusting mechanism, the concave portions 548 and 550 are formed at the leg portions 542A and 542C of the floor board 542, the concave portions 548 and 550 engage with the supporting bar 554 disposed at the tunnel portion 544 and the supporting pins 558 disposed at the center pillars 556, and the rear end portion 542D of each of the leg portions 542A of the floor board 542 is engaged with the supporting bracket 560 which serves as an adjusting member. However, instead of this, as shown in FIG. 39, auxiliary legs 576 serving as adjusting members may be attached to the leg portions 542A and 542C of the floor board 542 through hinges 578 so that the auxiliary legs 576 can be folded. When the floor board 542 is located at its ordinary placement position, in the same manner as the floor board 542 which is shown on the right-hand side of FIG. 39, the auxiliary legs 576 are folded inwardly. When the floor board 542 is located at the position at which the rear seat can be stored, in the same manner as the floor board 542 which is shown on the left-hand side of FIG. 39, the auxiliary legs 576 are rotated to the lower sides of the leg portions 542A and 542C. Accordingly, the distance between the floor board 542 and the lower floor surface can be adjusted. Further, as shown in FIG. 40, a structure can be adopted in which the leg portions 542A and 542C of the floor board 542 can be folded through the hinges 578 serving as adjusting members.

As described above, the specific embodiments of the present invention have been explained in detail, but the present invention is not limited to such embodiments. The present invention has excellent effects in various kinds of modifications within the scope of the present invention.

What is claimed is:

1. A vehicle seat storing device for moving a seat from a position for use in a vehicle to a position for storage in a vehicle, said vehicle seat storing device comprising: a plurality of guide portions for moving said seat between said position for use and said position for storage, said guide portions comprising:
   a first guide portion swingably attached to a vehicle longitudinal front portion of said seat;
   a second guide portion attached to a vehicle body; and
   a moving portion provided at a location selected from the group consisting of:
      (1) a vehicle transverse side portion of said seat, such that said seat is moved from said position for use to said position for storage by said first guide portion being swung and said moving portion being slid on said second guide portion; and
      (2) said first guide portion, such that said seat is moved from said position for use to said position for storage by said first guide portion being swung and said first guide portion being slid on said second guide portion.

2. A vehicle seat storing device according to claim 1, wherein said seat is moved between said position for use and said position for storage by a composite movement using the plurality of guide portions.

3. A vehicle seat storing device according to claim 1, wherein said composite movement is a movement of only said guide portions.

4. A vehicle seat storing device according to claim 1, wherein said plurality of guide portions comprises a guide rail portion having one end detachably engaged with said seat and another end swingably attached to a vehicle body; and
   a moving portion fixed to said seat which engages with said guide rail portion when said one end of said guide rail portion is detached from said seat, and which moving portion moves said seat to said position for storage along said guide rail portion by being slid on said guide rail portion.

5. A vehicle seat storing device according to claim 1, wherein the first guide portion has a first end connected to a seat lower portion and a second end coupled to the second guide portion, said second guide portion having an element adjacent to one end coupled to the second end of said first guide portion when the first guide portion is guided by a predetermined amount.

6. A vehicle seat storing device according to claim 1, wherein said seat storing device is provided in a vehicle body structure having a step in a substantially horizontal direction;
   said step of said vehicle body is formed by an upper portion, a lower portion and a wall portion which connects said upper and lower portions and extends in a substantially vertical direction;
   a coupling portion formed on said wall portion for detachably coupling a first guide portion to said wall portion; and
   a second guide portion having an end fixed to said wall portion.

7. A vehicle seat storing device according to claim 1, wherein a first guide portion is formed by a swinging portion having one end connected to said seat, and a second guide portion is formed by a guide rail coupled to another end of said swinging portion such that said swinging portion can be slid on said guide rail.

8. A vehicle seat storing device according to claim 1, wherein the seat storing device has seat backside moving means for moving a seat backside downward interlockingly with the folding of the seat back toward a front of the vehicle.

9. A vehicle seat storing device according to claim 1, wherein the seat storing device comprises:
   a seat raising handle for moving said seat to said position for storage; and
   rear leg lock releasing means for releasing a locked state of a rear leg of said seat to a vehicle body in accordance with a rotation of said seat raising handle to said position for use.

10. A vehicle seat storing device according to claim 1, wherein the seat storing device has headrest angle adjusting means capable of changing the angle of a headrest with respect to a seat back by moving said seat to said position for storage.

11. A vehicle seat storing device according to claim 1, wherein the seat storing device has headrest moving means for lowering the height of a headrest from a seat back in accordance with a lowering towards the front of a vehicle of said seat back.

12. A vehicle seat storing device according to claim 1, wherein said seat is moved between said position for use and said position for storage by a continuous movement using at least the first and second guide portions.

13. A vehicle seat storing device according to claim 12, wherein said continuous movement is a movement of only said guide portions.

14. A vehicle seat storing device according to claim 1, wherein said first and second guide portions are connected to each other, one end of the first guide portion is connected to said seat and another end the first guide portion is coupled to said vehicle body.

15. A vehicle seat storing device according to claim 14, wherein said one end of said first guide portion is rotatably attached to said seat.

16. A vehicle seat storing device according to claim 15, wherein, when said first guide portion, in which said one end is connected to a lower portion of said seat and said other end is connected to said second guide portion, is guided by a predetermined amount, said second guide portion, in which a one end thereof is connected to said other end of said first guide portion, can be operated.

17. A vehicle seat storing device according to claim 1, wherein said seat storing device is provided in a vehicle body structure having a step in a substantially horizontal direction;
   said step of said vehicle body is formed by an upper portion, a lower portion and a wall portion which connects said upper and lower portions and extends in a substantially vertical direction; and
   a connecting member connecting said first guide portion with said second guide portion, the connecting member engaged with said wall portion.

18. A vehicle seat storing device according to claim 1, wherein said first guide portion is formed by a swinging member having one end thereof connected to said seat, and said second guide portion is formed by a slide member, in which another end of said swinging member is engaged and said swinging member can be slid.

19. A vehicle seat storing device according to claim 1, wherein said seat storing device has a seat backside moving member for moving a seat backside downward interlockingly with the folding of the seat back toward a front of the vehicle.

20. A vehicle seat storing device according to claim 1, wherein said seat storing device has seat a pan front lower member for moving a front portion of a seat pan downward interlockingly with a folding of the seat back toward a front of the vehicle.

21. A vehicle seat storing device according to claim 1, wherein said first guide portion is a front leg portion of said seat, and said second guide portion is a guide rail fixed to the vehicle body in a substantially longitudinal direction of the vehicle.

22. A vehicle seat storing device according to claim 21, wherein one end of said front leg portion is swingably attached to said seat,
   said moving portion is provided at another end of said front leg portion, and
   the other end of said front leg portion is swingably and slidably attached to said guide rail via said moving portion,
   wherein said seat is moved from said position for use to said position for storage by said first guide portion being swung substantially toward a front of a vehicle around said moving portion and said moving portion being slid on said guide rail substantially toward a front of a vehicle.

23. A vehicle seat storing device according to claim 22, wherein the other end of said front leg portion is detachably coupled to the vehicle body by a coupling portion such that the other end of said front leg portion is separated from the vehicle body when said front leg portion is swung at a predetermined angle.

24. A vehicle seat storing device according to claim 21, wherein
   said moving portion is provided at said seat,
   one end of said front leg portion is swingably attached to said seat, and
   another end of said front leg portion is swingably attached to the vehicle body,
   wherein said seat is moved from said position for use to said position for storage by the front leg portion being swung substantially toward a front of a vehicle around the other end of said front leg portion and said moving portion being slid on said guide rail substantially toward a front of a vehicle.

25. A vehicle seat storing device according to claim 24, wherein the other end of said front leg portion is detachably coupled to the vehicle body by a coupling portion such that the other end of said front leg portion is separated from the vehicle body when said front leg portion is swung at a predetermined angle.

26. A vehicle seat storing device according to claim 1, wherein
   a front leg portion of said seat comprises said first guide portion and said second guide portion,
   said moving portion is provided at said seat,
   one end of said front leg portion is swingably attached to said seat, and
   another end of said front leg portion is swingably attached to the vehicle body,
   wherein said seat is moved from said position for use to said position for storage by the front leg portion being swung substantially toward a front of a vehicle around the other end of said front leg portion and said moving portion being slid along a slit portion, which is provided at the front leg portion, substantially toward a front of a vehicle.

27. A vehicle seat storing device according to claim 26, wherein the one end of said front leg portion is detachably coupled to the seat by a coupling portion such that the one end of said front leg portion is separated from the vehicle body when said front leg portion is swung at a predetermined angle.

28. A vehicle seat storing device according to claim 1, wherein said first and second guide portions are connected to each other, one end of said first guide portion is connected to said seat and another end of said first guide portion is coupled to said vehicle body when said seat is in said position for use.

29. A vehicle seat storing device according to claim 1, wherein said first and second guide portions are connected to each other, one end of said first guide portion is connected to said seat and one end of said second guide portion is coupled to said vehicle body.

30. A vehicle seat storing device for moving a seat from a position for use in a vehicle to a position for storage in a vehicle wherein said seat is moved between said position for use and said position for storage by a composite movement using a plurality of guide portions;

wherein the seat storing device has seat pan front lowering means for moving a front portion of a seat pan downward interlockingly with the folding of the seat back toward a front of the vehicle.

31. A vehicle seat storing device for moving a seat from a position for use in a vehicle to a position for storage in a vehicle, said vehicle seat storing device comprising: a plurality of guide portions for moving said seat between said position for use and said position for storage, said guide portions comprising:

a front leg portion swingably attached to said seat; and a guide rail fixed to a vehicle body, wherein said seat is moved from said position for use to said position for storage by the front leg portion being swung and the front leg portion being slid on the guide rail.

32. A vehicle seat storing device for moving a seat from a position for use in a vehicle to a position for storage in a vehicle, said vehicle seat storing device comprising a plurality of guide portions for moving said seat between said position for use and said position for storage, said guide portions comprising:

a first guide portion swingably attached to a vehicle longitudinal front portion of said seat;

a second guide portion attached to a vehicle body; and a moving portion provided at one of said seat or said first guide portion, wherein said seat is moved from said position for use to said position for storage by said first guide portion being swung and said seat being slid on said second guide portion via said moving portion.

* * * * *